(12) United States Patent
Takemoto et al.

(10) Patent No.: US 7,978,400 B2
(45) Date of Patent: Jul. 12, 2011

(54) ELECTRO-WETTING APPARATUS AND METHOD OF DRIVING ELECTRO-WETTING APPARATUS

(75) Inventors: Yoshihiro Takemoto, Tokyo (JP); Yoshiaki Kato, Gunma (JP); Fumisada Maeda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/610,730

(22) Filed: Nov. 2, 2009

(65) Prior Publication Data

US 2010/0110532 A1 May 6, 2010

(30) Foreign Application Priority Data

Oct. 31, 2008 (JP) ................ P2008-282450

(51) Int. Cl.
*G02F 1/29* (2006.01)
*G11B 7/00* (2006.01)
(52) U.S. Cl. .................... 359/316; 369/112.02
(58) Field of Classification Search .......... 359/316, 359/245, 620, 665, 649–651, 666; 369/112.02, 369/112.03, 112.08, 112.16
See application file for complete search history.

(56) References Cited

U.S. PATENT DOCUMENTS

| | | | |
|---|---|---|---|
| 7,436,598 B2 * | 10/2008 | Kuiper et al. | 359/665 |
| 7,489,448 B2 * | 2/2009 | Hendriks et al. | 359/649 |
| 7,498,648 B2 * | 3/2009 | Richards et al. | 257/436 |
| 7,746,540 B2 * | 6/2010 | Lo et al. | 359/290 |
| 2009/0166543 A1 * | 7/2009 | Vinogradov | 250/370.08 |

FOREIGN PATENT DOCUMENTS

| | | |
|---|---|---|
| JP | 2006285031 | 9/2001 |
| JP | 2001519539 | 10/2001 |
| JP | 2001249261 | 10/2006 |

* cited by examiner

*Primary Examiner* — Ricky L Mack
*Assistant Examiner* — Tuyen Tra
(74) *Attorney, Agent, or Firm* — K&L Gates LLP

(57) ABSTRACT

An electro-wetting apparatus includes a liquid having conductivity or polarity and a first electrode and a second electrode that apply voltage to the liquid. The electro-wetting apparatus also includes a dielectric layer provided between the liquid and the first electrode. The electro-wetting apparatus further includes a voltage-applying unit that applies a voltage signal between the first electrode and the second electrode, where the voltage signal is periodically changed between a first voltage of zero (0) volt or more and a second voltage of larger than the first voltage.

5 Claims, 22 Drawing Sheets

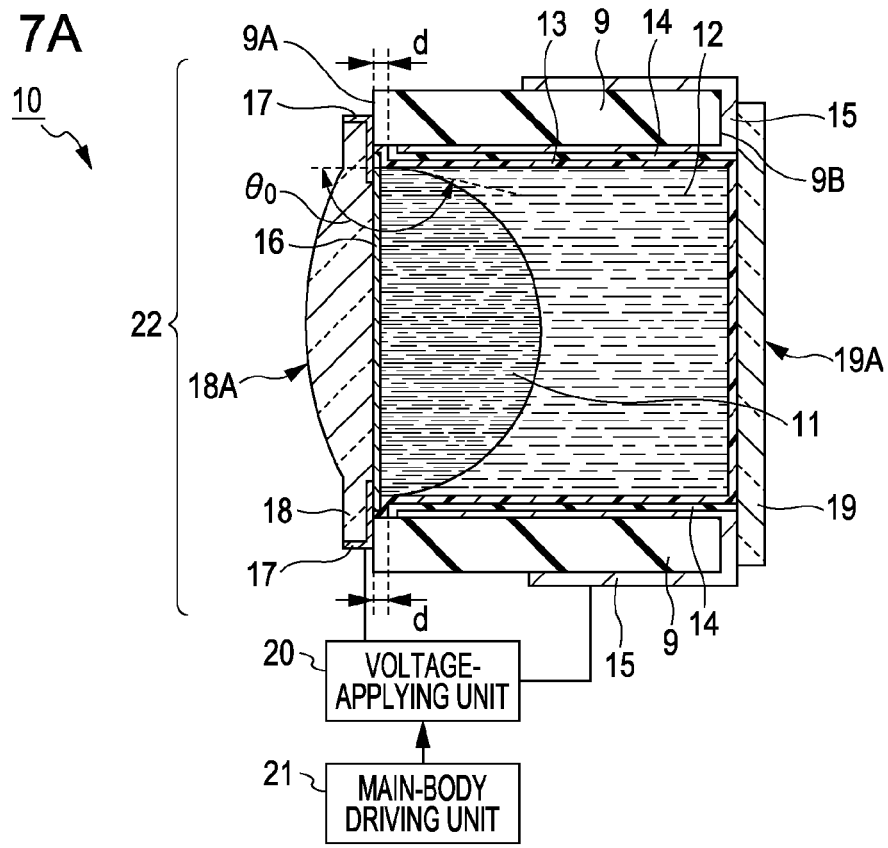
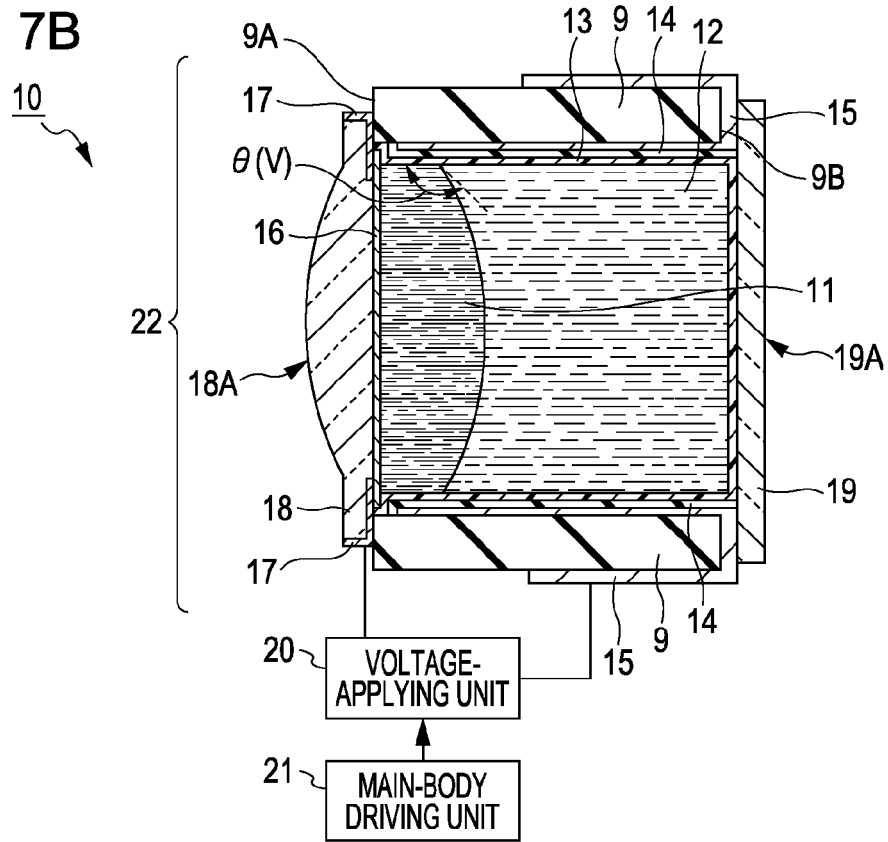

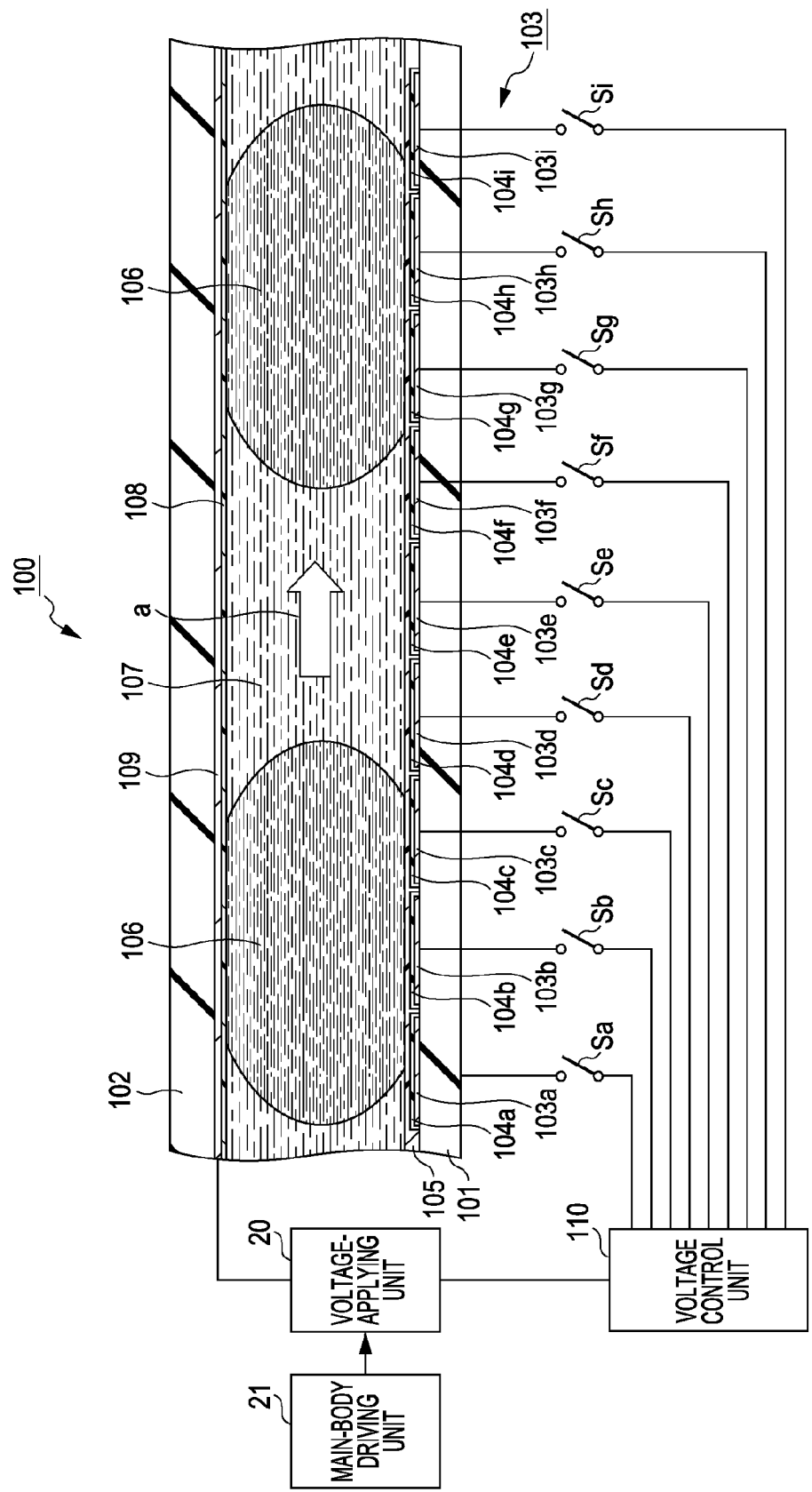

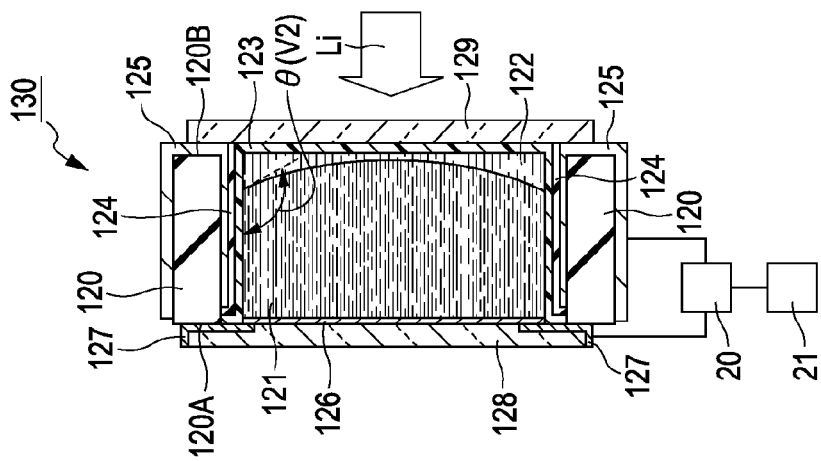
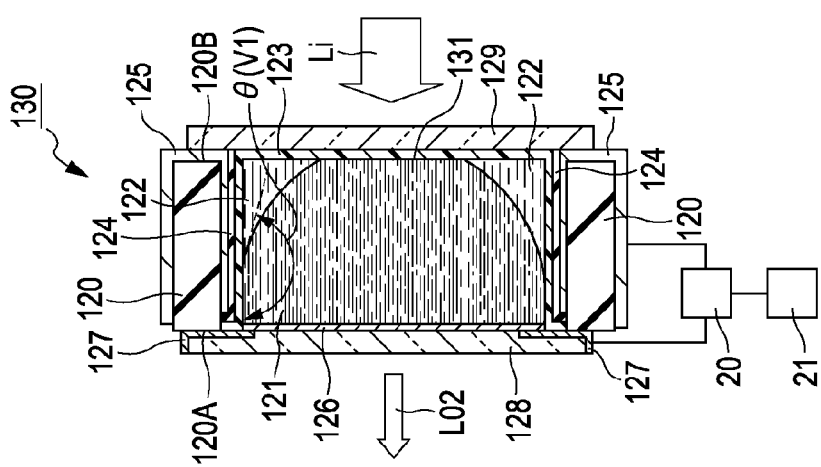
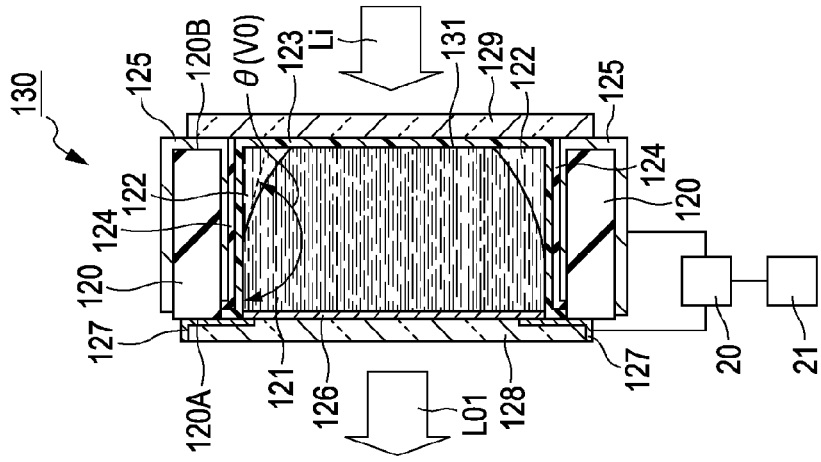

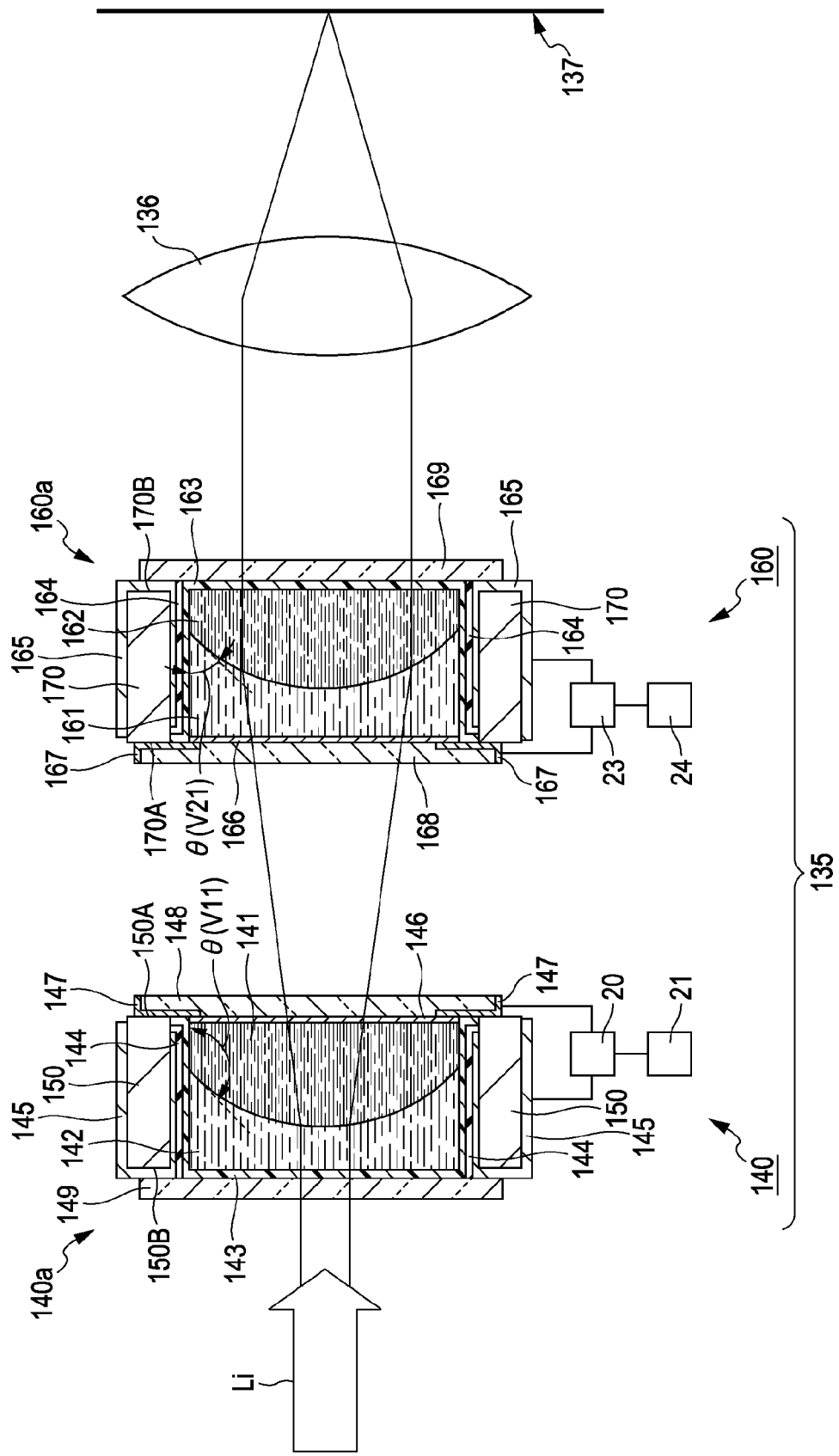

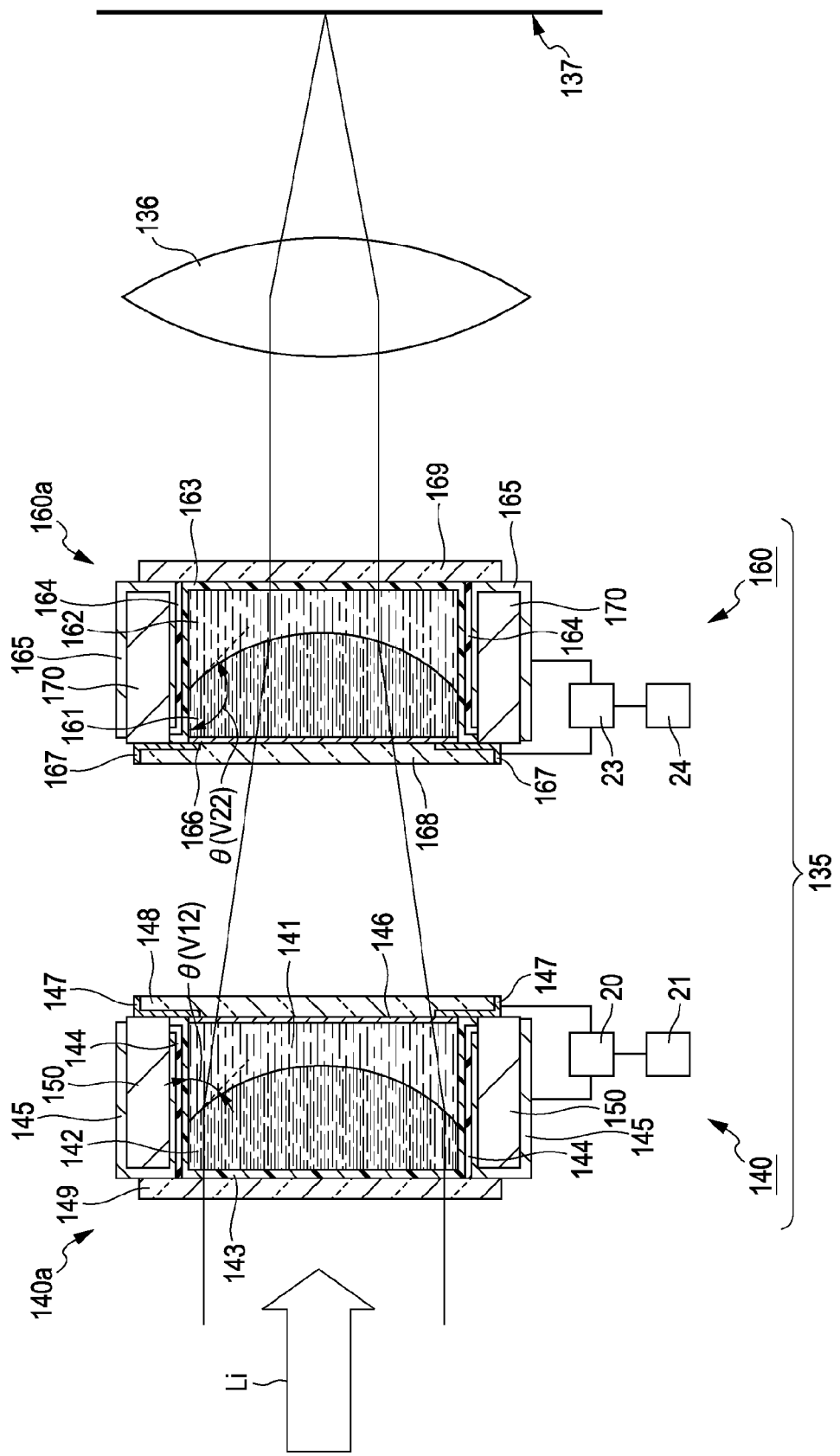

ELECTRO-WETTING APPARATUS AND METHOD OF DRIVING ELECTRO-WETTING APPARATUS

CROSS REFERENCES TO RELATED APPLICATIONS

The present application claims priority to Japanese Priority Patent Application JP 2008-282450 filed in the Japan Patent Office on Oct. 31, 2008, the entire content of which is hereby incorporated by reference.

BACKGROUND

The present application relates to an electro-wetting apparatus using an electro-wetting phenomenon. In addition, the present application relates a varifocal lens, an optical pick-up apparatus, an optical recording/reproducing apparatus, a droplet operating apparatus, an optical device, a zoom lens, an imaging apparatus, a light modulator, a display apparatus, and a strobe apparatus. Furthermore, the present application relates to a method of driving electro-wetting apparatus.

In an optical system of an optical apparatus such as a still camera or a video camera, a mechanism of driving a lens along an optical axis has been adopted to realize focusing operation and zooming operation. However, removal of such a mechanism is considered as effective measures to satisfy a demand of miniaturization of an optical apparatus.

In order to meet the above demands, a varifocal lens using an electro-wetting phenomenon (electric capillary phenomenon) has been proposed (see, for example, Published Japanese translation of a PCT application No. 2001-519539 (JP 2001-519539A)). In addition, an optical apparatus using such a varifocal lens and a driving method thereof have been also proposed (see, for example, Japanese Unexamined Patent Application Publication No. 2001-249261 (JP 2001-249261 A)).

In the varifocal lens proposed in JP 2001-519539 A, a first liquid with conductivity and a second liquid with insulation properties are hermetically sealed. Here, the second liquid has the same specific gravity as that of the first liquid but may not be mixed therewith. Furthermore, the degree of deformation of the interface profile between the first liquid and the second liquid is controlled by adjusting the amplitude of AC voltage applied to the varifocal lens to control a focus distance. Thus, a mechanism for driving a lens when performing focusing and zooming operation is not necessary even though other lenses demand such a mechanism. In other words, the use of a varifocal lens proposed in JP 2001-519539 A allows a user to perform focusing and zooming operation without a mechanism of driving a lens.

However, the varifocal lenses proposed in JP 2001-519539 A and JP 2001-249261 A can be activated by application of AC voltage with an amplitude of about ±100 V. Thus, it is difficult to directly apply any of these technologies to a small-sized optical apparatus which is based on battery operation. Thus, it has been demanded to drive the varifocal lens using an electro-wetting phenomenon by application of lower voltage.

In order to meet the above request, a technology of using a metal anodized film (dielectric film) as an insulating film for electrically separating an electrode and a conductive liquid has been proposed (see, for example, Japanese Unexamined Patent Application Publication No. 2006-285031 (JP 2006-285031 A)). In JP 2006-285031 A, examples of the insulating film for electrically separating the electrode and the conductive film include a tantalum pentoxide obtained by anodization of metallic tantalum. Therefore, the use of such an insulating film allows a user to control a focus distance within a wide range at an AC voltage of about ±10V.

By the way, in the apparatus using an electro-wetting phenomenon, when a DC voltage is applied between an anode and a cathode, electric charges are accumulated on a dielectric body (insulator) arranged between the anode and the cathode. Thus, the effects of electro-wetting phenomenon acting between the anode and the conductive liquid can be cancelled out. Therefore, when a DC current is applied between the anode and the cathode using the electro-wetting phenomenon, the deformed liquid profile due to the electro-wetting phenomenon is hardly kept. For overcoming such a disadvantage, in any of JP 2001-519539 A, JP 2001-249261 A, and JP 2006-285031 A, an AC voltage is used as one to be applied to the varifocal lens to keep the deformed interface profile of the liquid due to the electro-wetting phenomenon.

However, as is proposed in JP 2006-285031 A, the electric insulating characteristic of the varifocal lens can be represented as shown in FIG. 27 when an anodized metal oxide film is used as an insulating film. In FIG. 27, the horizontal axis represents an applied voltage level and the vertical axis represents a current level passing through the varifocal lens (insulating film). The electrical insulating characteristics shown in the figure are similar to those of general tantalum capacitor, aluminum electrolytic capacitor, or the like. Therefore, if the potential of the anode is higher than that of the cathode, then the insulating film of the varifocal lens can act as a capacitor because positive withstand voltage $V_{EW+}$ is too large when a positive voltage is applied.

However, the negative withstand voltage $V_{EW-}$ of the insulating film is extremely very small (for example, several volts) compared with the positive withstand voltage $V_{EW-}$ (for example, about several tens to a hundred and several tens of voltages). Thus, when a negative (reverse) voltage is applied to the insulating film, dielectric breakdown of the insulating film can be occurred by the application of only a comparatively small voltage value, resulting in electric conduction. In this case, the varifocal lens does not act as a device using an electro-wetting phenomenon. Therefore, the variable range of the voltage can be restricted by negative withstand voltage $V_{EW-}$. Thus, there is a problem in that the variable voltage range can be narrowed.

The present invention has been made in consideration of the aforementioned problem and it is desired to provide an electro-wetting apparatus which can be operated at a low voltage within a wider variable voltage range, and various apparatuses provided with such an electro-wetting device, and a driving method thereof.

SUMMARY

An electro-wetting apparatus of an embodiment includes the following structural components: First, the electro-wetting apparatus includes a liquid having conductivity or polarity, a first electrode and a second electrode which apply voltage to the liquid, and a dielectric layer provided between the liquid and the first electrode. In addition, this embodiment further includes a voltage-applying unit that applies a voltage signal between the first electrode and the second electrode, where the voltage signal is periodically changed between a first voltage of zero (0) volt or more and a second voltage of larger than the first voltage.

A varifocal lens according to an embodiment includes the following structural components. First, the varifocal lens includes a pair of optically transparent members and a first liquid having optical transparency in addition to conductivity or polarity while being held between the pair of optically transparent members. In addition, the varifocal lens also includes a second liquid having optical transparency in addition to insulation properties or non-polarity, where the refractive index of the second liquid is different from the refractive index of the first liquid, while being held between the pair of optically transparent members without mixing with the first liquid. Further, the varifocal lens includes a first electrode and a second electrode that apply voltage to the first liquid while being held between the pair of optically transparent members. In this varifocal lens, a dielectric layer is formed by oxidation of the surface of the first electrode on the side of the liquid and a voltage-applying unit is provided for applying a voltage signal between the first electrode and the second electrode, where the voltage signal is periodically changed between a first voltage of zero (0) volt or more and a second voltage of larger than the first voltage.

An optical pick-up apparatus according to an embodiment includes the following structural components: First, the optical pick-up apparatus includes a light source unit, a light-receiving unit, and an objective lens facing an optical recording medium. The optical pick-up apparatus also includes an optical system having a function leading output light from the light source unit to the objective lens and a function of condensing light reflected from the optical recording medium to the light-receiving unit. In addition, the optical system includes the varifocal lens of the above embodiment.

An optical recording/reproducing apparatus of an embodiment includes the optical pick-up apparatus of the above embodiment, a driving section that drives the varifocal lens in the optical pick-up apparatus, and a rotation driving unit that rotationally drives an optical recording medium.

A droplet dropping apparatus according to an embodiment includes the following structural components: First, the droplet dropping apparatus includes a substrate, a plurality of first electrode arranged in parallel with a predetermined distance on the substrate, a plurality of dielectric layers formed by oxidation of the surface of the plurality of the first electrodes, and a liquid droplet having conductivity or polarity and being arranged on the plurality of dielectric layers. The droplet dropping apparatus also includes a second electrode facing the plurality of the first electrodes via the liquid droplet and electrically connected to the liquid droplet. The droplet dropping apparatus further includes a voltage-applying unit that applies a voltage signal between the first electrode and the second electrode, where the voltage signal is periodically changed between a first voltage of zero (0) volt or more and a second voltage of larger than the first voltage.

An optical device according to an embodiment includes the following structural components. First, the optical devices includes a pair of optically transparent member and a first liquid having optical transparency in addition to conductivity or polarity while being held between the pair of optically transparent members. Also, the optical device includes a second liquid which is held between the pair of optically transparent members without being mixed with the first liquid. The second liquid has optical transparency lower than that of the first liquid in addition to insulation properties or nonpolarity. The optical device further includes a first electrode and a second electrode that apply voltage to the first liquid while being held between the pair of optically transparent members. In the optical device of the embodiment, a dielectric layer is formed by oxidation of the surface of the first electrode on the side of the liquid. In addition, the optical device of the embodiment includes a voltage-applying unit that applies a voltage signal between the first electrode and the second electrode, where the voltage signal is periodically changed between a first voltage of zero (0) volt or more and a second voltage of larger than the first voltage.

A zoom lens according to an embodiment includes a first varifocal lens and a second varifocal lens. The first varifocal lens includes the following structural components: First, first varifocal lens includes a first optically transparent member and a second optically transparent member. The first varifocal lens also includes a first liquid having optical transparency in addition to conductivity or polarity while being held between the first optically transparent member and the second optically transparent member. The first varifocal lens includes further includes a second liquid having optical transparency in addition to insulation properties or non-polarity, where the refractive index of the second liquid is different from the refractive index of the first liquid, while being held between the pair of optically transparent members without mixing with the first liquid. The first varifocal lens of the present embodiment further includes a first electrode and a second electrode that apply voltage to the first liquid while being held between the first optically transparent member and the second optically transparent member. The first varifocal lens of the zoom lens further includes first dielectric layer formed by oxidation of the surface of the first electrode on the side of the liquid. The first varifocal lens of the present embodiment further includes a first voltage-applying unit that applies a voltage signal between the first electrode and the second electrode. In this case, the voltage signal is periodically changed between a first voltage of zero (0) volt or more and a second voltage of larger than the first voltage. Next, the second vertical lens of the zoom lens includes a third optically transparent member and a fourth optically transparent member. In addition, the second varifocal lens also includes a third liquid having optical transparency in addition to conductivity or polarity while being held between the third optically transparent member and the fourth optically transparent member. The second varifocal lens further includes a fourth liquid having optical transparency in addition to insulation properties or non-polarity, where the refractive index of the fourth liquid is different from the refractive index of the third liquid, while being held between the pair of optically transparent members without mixing with the third liquid. The second varifocal lens further includes a third electrode and a fourth electrode. The electrodes apply voltage to the third liquid while being held between the third optically transparent member and the fourth optically transparent member. The second varifocal lens further includes a second dielectric layer formed by oxidation of the surface of the third electrode on the side of the liquid. The second varifocal lens further includes a second voltage-applying unit that applies a voltage signal between the third electrode and the fourth electrode, where the voltage signal is periodically changed between a first voltage of zero (0) volt or more and a fourth voltage of larger than the third voltage.

An image pick-up apparatus according to an embodiment includes the following structural components: First, the image pick-up apparatus includes an optical system, an imaging device that converts incident light entered through the optical system into an electric signal, and a control section for controlling the optical system. In the image pick-up apparatus, the optical system includes a zoom lens, a varifocal lens, and an optical device having an aperture or shutter mechanism. Here, at least one of the zoom lens, the varifocal lens, and the optical device includes a pair of optically transparent members and a first liquid having optical transparency in addition to conductivity or polarity while being held between the pair of optically transparent members. In addition, at least one of the zoom lens, the varifocal lens, and the optical device also includes a second liquid having optical transparency in addition to insulation properties or non-polarity while being held between the pair of optically transparent members without mixing with the first liquid, where the refractive index of the second liquid is different from the refractive index of the first liquid. At least one of the zoom lens, the varifocal lens, and the optical device further includes a first electrode and a second electrode that apply voltage to the first liquid while being held between the pair of optically transparent members. At least one of the zoom lens, the varifocal lens, and the optical device further includes a dielectric layer formed by oxidation of the surface of the first electrode on the side of the liquid. At least one of the zoom lens, the varifocal lens, and the optical device further includes a voltage-applying unit that applies a voltage signal between the first electrode and the second electrode, where the voltage signal is periodically changed between a first voltage of zero (0) volt or more and a second voltage of larger than the first voltage.

A light modulator of an embodiment includes the following components: First, the light modulator of the embodiment includes a plurality of light modulating devices and a driving unit that drives the light modulating device. In the light modulator of the present embodiment, each light modulating device includes a pair of optically transparent members. In addition, the light modulating device includes a first liquid having optical transparency in addition to conductivity or polarity while being held between the pair of optically transparent members. The light modulating device further includes a second liquid having optical transparency in addition to insulation properties or non-polarity while being held between the pair of optically transparent members without mixing with the first liquid, where the refractive index of the second liquid is different from the refractive index of the first liquid. The light modulating device further includes a first electrode and a second electrode that apply voltage to the first liquid while being held between the pair of optically transparent members. The light modulating device further includes a dielectric layer formed by oxidation of the surface of the first electrode on the side of the liquid. The light modulating device further includes a voltage-applying unit that applies a voltage signal between the first electrode and the second electrode, where the voltage signal is periodically changed between a first voltage of zero (0) volt or more and a second voltage of larger than the first voltage.

A display apparatus according to an embodiment includes a light modulator with a plurality of light modulating devices. Each light modulating device is the light modulating device of the above embodiment.

A strobe apparatus according to an embodiment includes the following structural components: First, the strobe apparatus includes a light diffusing device containing a plurality of optical devices, a light source from which light is incident on the light diffusing device, and an optical prism placed in the middle of an optical path between the light diffusion layer and the light source. The strobe apparatus also includes a strobe circuit by which the light source performs light emission and a control section for controlling the light diffusing device ad the strobe circuit. In the strobe apparatus, each optical device in the light diffusing device is the optical dive of the above embodiment.

Furthermore, for solving the aforementioned problem, a method of driving an electro-wetting apparatus according to an embodiment of the present invention includes the following steps. That is, in the method, a first voltage of zero (0) volts or more for a predetermined period is applied between a first electrode and a second electrode in the aforementioned electro-wetting apparatus. After applying the first voltage for the predetermined time period, a second voltage lager than the first voltage for the predetermined time period is applied between the first electrode and the second electrode. Subsequently, after applying the second voltage for the predetermined time period, the step of applying the first voltage for the predetermined time period and the step of applying the second voltage of the predetermined time period are repeated.

As described above, in the electro-wetting apparatus and various kinds of apparatuses using such an electro-wetting apparatus and a method of driving the electro-wetting apparatus, each of these apparatuses can be driven by an AC voltage that varies within a positive voltage range at a predetermined cycle.

According to embodiments, the electro-wetting apparatus and various kinds of apparatuses using such an electro-wetting apparatus can be driven by an AC voltage that varies within a positive voltage range at a predetermined cycle. The positive withstand voltage of the dielectric layer is sufficiently higher than the negative (reverse) withstand voltage thereof. Thus, any of the embodiments of the present invention allows the apparatus or device to be operated at a low voltage within a wider variable voltage range.

Additional features and advantages are described herein, and will be apparent from the following Detailed Description and the figures.

BRIEF DESCRIPTION OF THE FIGURES

FIG. 6 is a diagram illustrating the operation of a related-art voltage-applying unit, where

FIG. 7 is a diagram illustrating the configuration and operation of a varifocal lens according to a first embodiment of the present invention, where FIG. 7A and FIG. 7B illustrate different states of the varifocal lens;

FIG. 15 is a schematic cross-sectional view of a drop operating apparatus according to a third embodiment;

FIG. 16 is a diagram illustrating the operation of the drop operating apparatus, where

FIG. 17 is a diagram illustrating the operation of the drop operating apparatus, where

FIG. 18 is a diagram illustrating the operation of the drop operating apparatus, where

FIG. 19 is a diagram illustrating the configuration and operation of an optical device having an aperture or shutter function in accordance with a fourth embodiment, where FIGS. 19A to 19C are cross-sectional views of the optical device and illustrate different states thereof;

FIG. 20 is a schematic cross-sectional diagram illustrating the configuration and the operation of a zoom lens according to a fifth embodiment;

FIG. 21 is schematic cross-sectional diagram illustrating the configuration and the operation of a zoom lens according to the fifth embodiment;

DETAILED DESCRIPTION

The present application will be described with reference to accompanying drawings, but not limited to the illustrative examples thereof described below, in the following order according to an embodiment:

1. Exemplary configuration of electro-wetting apparatus,
2. First embodiment: Exemplary configuration of variable-focus lens,
3. Second embodiment: Exemplary configuration of optical pick-up apparatus,
4. Third embodiment: Exemplary configuration of drop-operating apparatus,
5. Fourth embodiment: Exemplary configuration of optical device having an aperture or shutter function,
6. Fifth embodiment: Exemplary configuration of zoom lens,
7. Sixth embodiment: Exemplary configuration of imaging apparatus,
8. Seventh embodiment: Exemplary configuration of light modulator,
9. Eighth embodiment: Exemplary configuration of display apparatus, and
10. Ninth embodiment: Exemplary configuration of a flashing apparatus.

1. EXEMPLARY CONFIGURATION OF ELECTRO-WETTING APPARATUS

[Configuration of Electro-Wetting Apparatus]

Figure 1:
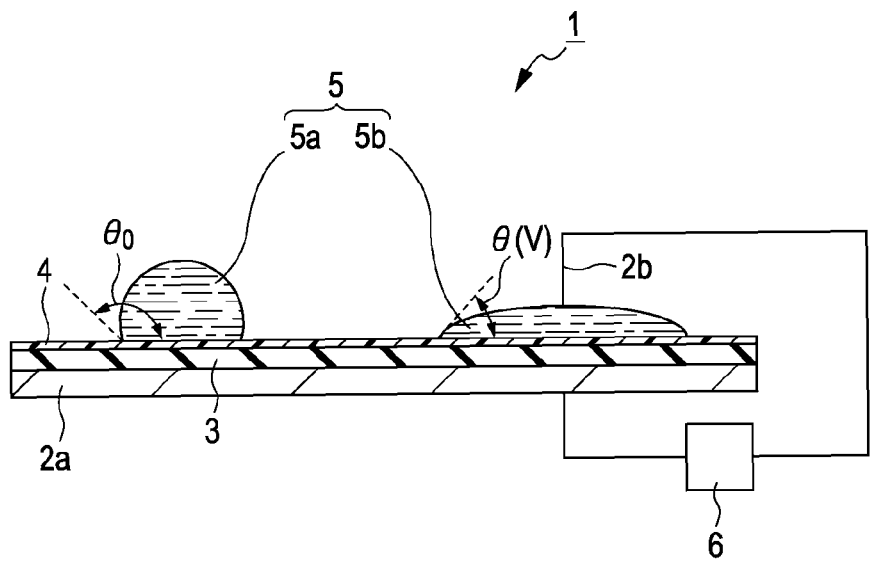
FIG. 1 is a schematic diagram illustrating the configuration of an electro-wetting apparatus according to an embodiment.

FIG. 1 illustrates the schematic configuration and operation principle of an electro-wetting apparatus in accordance with an embodiment. An electro-wetting apparatus 1 includes a first electrode 2a, a second electrode 2b, a dielectric layer 3 formed on one surface of the first electrode 2a, a water-repellent film 4 (liquid-repellent film), and a conductive liquid 5 dropped on the water-repellent film 4. In addition, the electro-wetting apparatus 1 is provided with a voltage-applying unit 6 between the first electrode 2a and the second electrode 2b. One end terminal of the voltage-applying unit 6 is connected to the first electrode 2a and the other end terminal thereof is connected to the second electrode 2b. The second electrode 2b is formed so that it can touch a conductive liquid 5 may be touched. Alternatively, the other end terminal of the voltage-applying unit 6 may be used as a second electrode 2b to directly touch the conductive liquid 5. The conductive liquid 5a in FIG. 1 represents that the conductive liquid 5 is in a state of touching the water-repellent film 4 while the voltage is not applied between the two electrodes 2a, 2b. In contrast, the conductive liquid 5b represents that the conductive liquid 5 is in a state of touching the water-repellent film 4 while the voltage is applied between the two electrodes 2a, 2b.

The first electrode 2a may be a plate-shaped metal member made of tantalum, aluminum, or the like. The dielectric layer 3 may be formed by oxidation treatment (e.g., anodization) on the surface the first electrode 2a on the side of the conductive liquid 5. Thus, for example, the dielectric layer 3 may be formed of a tantalum pentoxide film when the first electrode 2a is made of tantalum. Therefore, a drive voltage can be reduced remarkably when the dielectric layer is formed of a metallic oxide film because the film thickness thereof can be extremely thinned easily and a comparatively high dielectric can be obtained. Since the film thickness of the dielectric layer 3 can be also easily made uniform, the control accuracy of applied voltage can be prevented from being varied.

The water-repellent film 4 is made of a material with a low affinity (i.e., high water repellency) to the conductive liquid 5. For example, the water-repellent film 4 may be made of fluorine resin or the like when water is used as conductive liquid 5. The material of the water-repellent film 4 may be any of materials with low affinity to the conductive liquid 5.

The conductive liquid 5 (polar liquid) is a liquid with conductivity or polarity and may be any liquid as long as it has such a property. Examples of the conductive liquid 5 include: water; a mixture liquid of water and ethanol; a mixture liquid of water, ethanol, and ethylene glycol; and a mixture liquid of water and ethanol added with salt.

In addition, between the first electrode 2a and the second electrode 2b, the voltage-applying unit 6 applies alternating voltage (AC voltage) varying within a predetermined positive voltage range (not less than zero (0) [V]) as described later. The configuration of the voltage-applying unit 6 will be also described later.

Here, an electro-wetting phenomenon (electro capillarity) will be described briefly. First, the contact angle of conductive liquid 5a with no voltage from the voltage-applying unit 6 is defined as a contact angle of $\theta_0$. When voltage is applied between the first electrode 2a and the second electrode 2b by the voltage-applying unit 6, one surface of the dielectric layer 3 is positively charged and the other surface thereof is negatively charged. These electric charges cause static electricity on cationic or anionic molecules in the conductive liquid 5, so that the conductive liquid 5 can be drawn to the water-repellent film 4. Therefore, comparing with the conductive liquid 5a with no applied voltage (i.e., the state of conductive liquid 5a), the conductive liquid 5 adheres on the water-repellent film 4 more extensively (i.e., the state of conductive liquid 5b). Under such a state, the contact angle θ of the conductive liquid 5 at this time becomes smaller than the contact angle $\theta_0$ with no applied voltage. In other words, the application of voltage causes an increase in wettability of conductive liquid 5 to the water-repellent film 4 and deforms the surface profile of the conductive liquid 5. Such a phenomenon is referred to as an electro-wetting phenomenon.

[Configuration of Voltage-Applying Unit]

Figure 2:
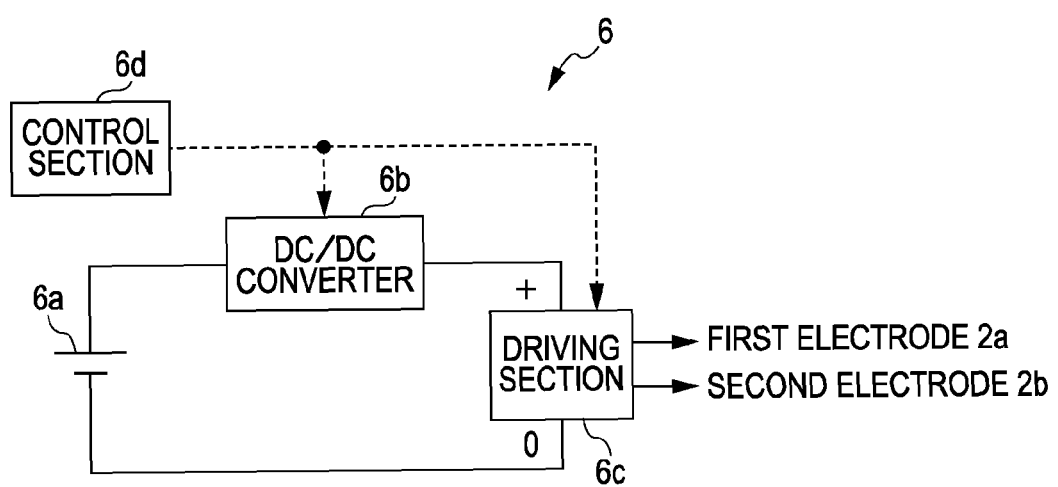
FIG. 2 is a block diagram illustrating the internal configuration of a voltage-applying unit of the electro-wetting apparatus.
Figure 3:
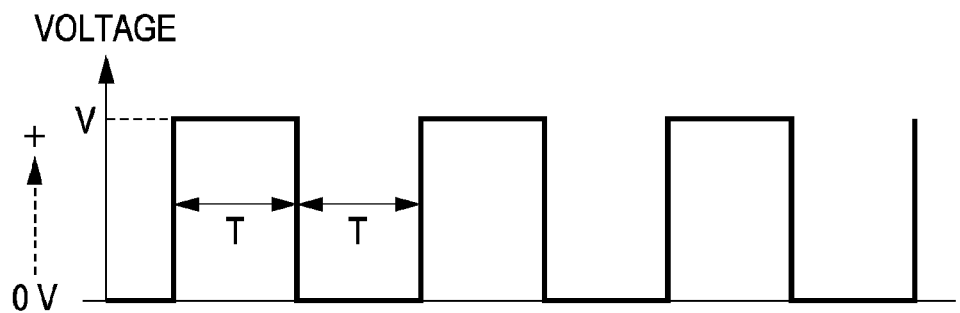
FIG. 3 is a diagram illustrating an example of signal waveform of a drive voltage in the electro-wetting apparatus according to the embodiment.

FIG. 2 illustrates the internal configuration of voltage-applying unit 6 in the electro-wetting apparatus according to the embodiment of the present invention. In addition, FIG. 3 illustrates an exemplary signal waveform of driving voltage output from the voltage-applying unit 6. The voltage-applying unit 6 mainly includes a power supply 6a, a DC/DC converter 6b, a driving section 6c, and a control section 6d. The present invention is not limited to such a configuration of the apparatus. As will be described later, if the electro-wetting apparatus 1 of the present embodiment is used in any appliance for any of various applications, the electro-wetting apparatus 1 of the present embodiment may be driven using a power source and a control section of the applicable appliance. In this case, both the power supply 6a and the control section 6d in the voltage-applying unit 6 are arranged on the outside of the electro-wetting apparatus 1.

The power supply 6a is a direct-current (DC) power supply, such as a dry cell or a rechargeable battery, and the positive terminal thereof is connected to the DC/DC converter 6b and the negative terminal thereof is connected to the driving section 6c.

The DC/DC converter 6b increases an input voltage level from the power source 6b to a predetermined voltage level on the basis of a control signal from the control section 6d. In addition, the DC/DC converter 6b is connected to the driving section 6c. Furthermore, a voltage signal of voltage level increased by the DC/DC converter 6b is output to the driving section 6c.

The driving section 6c carries out on/off control of output signals at a predetermined cycle on the basis of control signals from the control section 6d. As a result, as shown in FIG. 3, an AC voltage signal is output from the driving section 6c as shown. Here, the voltage varies rectangularly at a predetermined frequency (2T) between zero (0) [V] (first voltage) and a predetermined positive voltage V [V] (second voltage)

In addition, the control section 6d mainly includes a central processing unit (CPU) and controls the movements of the respective structural components as described above.

Figure 4:
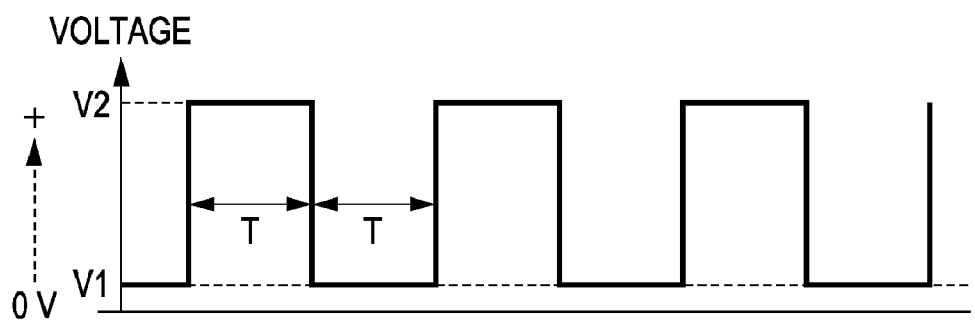
FIG. 4 is a diagram illustrating another example of signal waveform of a drive voltage in the electro-wetting apparatus according to the embodiment.

The embodiment illustrated in FIG. 3 has been described such that the driving voltage output from the voltage-applying unit 6 varies between zero (0) [V] and the predetermined positive voltage V [V] at a predetermined cycle. However, the present invention is not limited to such an example. Alternatively, another embodiment of the driving voltage signal is illustrated in FIG. 4. In this embodiment, as shown in FIG. 4, a drive voltage output from the voltage-applying unit 6 may be an AC voltage signal varying between a predetermined positive voltage V1 [V] (>0 [V]; first voltage) and a voltage V2 [V] higher than the voltage V1 (V2>V1; second voltage) at a predetermined cycle.

Figure 5:
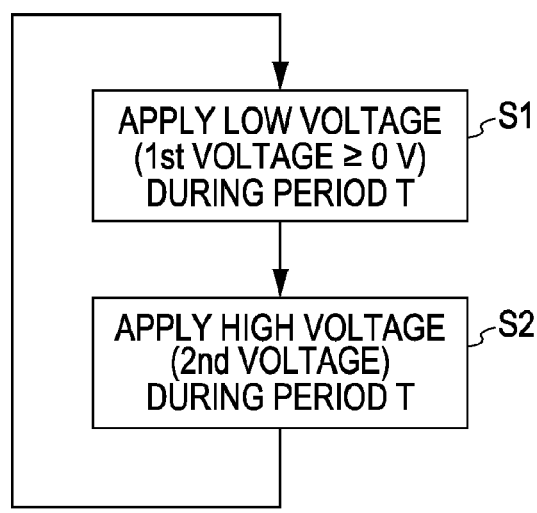
FIG. 5 is a flow chart that represents procedures of drive control of the electro-wetting apparatus according to the embodiment.

In addition, FIG. 5 is a flow chart illustrating a process of controlling the driving operation of the electro-wetting apparatus 1 of the above embodiment using AC voltage such as one shown in FIG. 3 or FIG. 4. In this embodiment, first, a comparatively low positive voltage (first voltage: for example, V=0 [V] in FIG. 3 or V=$V_1$ in FIG. 4) is applied during a predetermined period T (Step S1). Next, a voltage higher than the first voltage (second voltage: for example, V in FIG. 3 or $V_2$ in FIG. 4) is applied during a predetermined period T (Step S2). After that, steps S1 and S2 are repeated. Here, the process has been described such that the driving operation starts from step S1. However, the present embodiment is not limited to such an order of the steps. Alternatively, the process may start from step S2.

The electro-wetting apparatus 1 of the present invention is driven by AC voltage at a predetermined cycle, where the AC voltage varies within a positive voltage range as shown in FIG. 3 or FIG. 4. Therefore, the deformed surface profile of the conductive liquid 5 due to an electro-wetting phenomenon can be continuously kept.

In the present invention, a drive voltage is changed in the voltage range of 0 or more [V], so that limitation in variable range of voltage by the negative (reversed polar) withstand voltage $V_{EW-}$ of the dielectric layer occurred in the technology of Patent Document will be avoided. Furthermore, for example, the use of a metallic oxide film (anodized film) as a dielectric layer 3 like the present embodiment may lead to a positive withstand voltage $V_{EW+}$ of several tens to a hundred and several tens volts. Therefore, the electro-wetting apparatus 1 of the present embodiment can be driven at a low voltage within a wider variable range of voltages.

Comparative Example 1

Figure 6A:
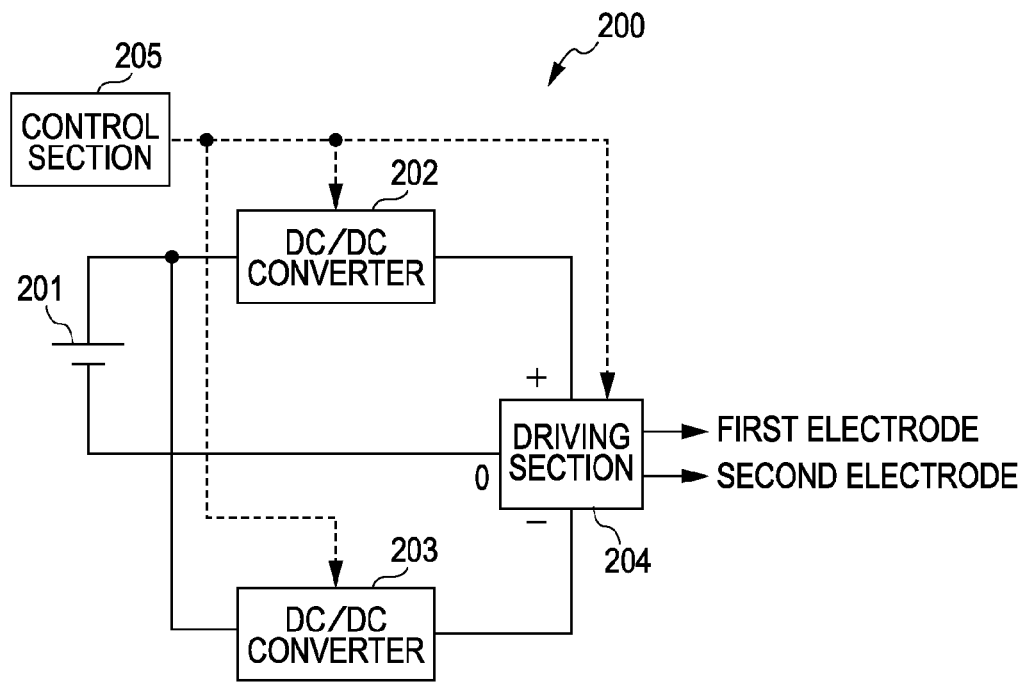
FIG. 6A is a diagram illustrating the internal configuration of the voltage-applying unit and FIG. 6B is a diagram illustrating an example of signal waveform of a drive voltage output from the voltage-applying unit.
Figure 6B:
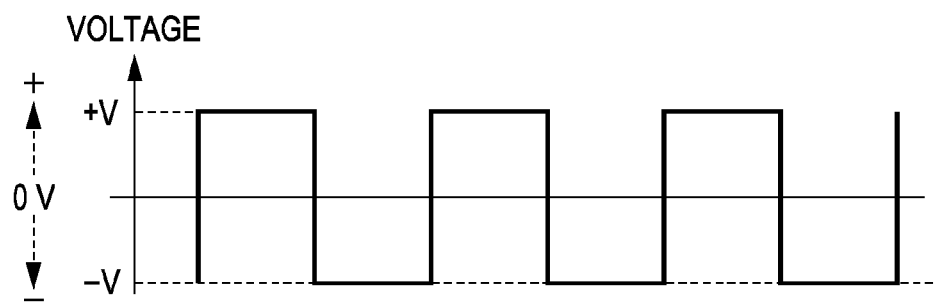

Here, a difference between the configuration of a typical voltage-applying unit (comparative example) and the configuration of the voltage-applying unit of the present embodiment will be described more specifically. FIG. 6A and FIG. 6B illustrate the configuration and operation of a voltage-applying unit of Comparative Example 1, respectively. FIG. 6A is a schematic diagram illustrating the configuration of the voltage-applying unit 200 of Comparative Example 1. FIG. 6B is a waveform of drive voltage output from the voltage-applying unit 200 of Comparative Example 1.

The voltage-applying unit 200 of Comparative Example 1 mainly includes a power supply 201, a positive-terminal side DC/DC converter 202, a negative-terminal side DC/DC converter 203 (reversal converter), a driving section 204, and a control section 205. The power supply 202 is a direct-current (DC) power supply, such as a dry cell or a rechargeable battery, and the positive terminal thereof is connected to the DC/DC converters 202 and 203 and the negative terminal thereof is connected to the driving section 204.

The positive-terminal side DC/DC converter 202 increases an input voltage level from the power source 201 to a predetermined voltage level on the basis of a control signal from the control section 205. The negative-terminal side DC/DC converter 203 reverses the polarity of an input voltage level from the power source 201 and increases the input voltage level to a predetermined one on the basis of a control signal from the control section 205.

Subsequently, the driving section 204 carries out phase adjustment of an output voltage signal from the positive-terminal side DC/DC converter 202 and an output voltage signal from the negative-terminal side DC/DC converter 203 and then sums up these signals. As a result, as shown in FIG. 6B, an AC voltage signal with a given cycle of rectangular variation in voltage between −V [V] and V [V] is output from the driving section 204.

As is evident from the comparison between the configuration of the voltage-applying unit shown in FIG. 2 (present embodiment) and the configuration of the voltage-applying unit shown in FIG. 6A (Comparative Example 1), the number of structural components in the present one is lower than that of Comparative Example 1. Therefore, the voltage-applying unit of the present embodiment can be produced at low cost.

Comparative Example 2

Next, another exemplary configuration of the electro-wetting apparatus will be described as Comparative Example 2 to solve a program of the varifocal lens in JP 2006-285031 A. In other words, the problem is a narrowed variable voltage range. That is, a variable range of voltage is restricted due to negative withstand voltage $V_{EW-}$ in the dielectric layer. In order to solve this problem, there is an idea that a varifocal lens and a capacitor are connected in series and the ends of the resulting series structure (Comparative Example 2) are then connected to the respective terminals of a drive circuit for applying AC voltage. In the configuration of Comparative Example 2, both positive and negative power sources are indispensable for a power circuit part of the drive circuit for applying voltage to the varifocal lens.

In contrast, because of a high priority on portability, a single power source is requested for the desirable operation of an electric circuit for driving a varifocal lens in a small-sized image pick-up apparatus, such as a camera or a cellular phone designed to be operated using a rechargeable battery or the like. In such a viewpoint, therefore, the electro-wetting apparatus of the embodiment of the present invention includes a single power source as described above while having a reduced number of structural components and an advantage in voltage conversion efficiency compared with those of Comparative Example 2.

In addition, an equivalent circuit, which is constructed of structural components, i.e., a conductive liquid, an anodized film, and an anode (electrode), in the varifocal lens, may be represented as a capacitor. Here, in the configuration of Comparative Example 2, the capacitance of the structure constructed of the conductive liquid, the anodized film, and the anode (electrode) is defined as $C_{EW}$ and the capacitance of a capacitor connected in series with the varifocal lens is defined as $C_{EXT}$. In the configuration of Comparative Example 2, furthermore, if voltage applied to the entire varifocal lens is defined as V, then voltage $V_{EW}$ applied to the structure constructed of the conductive liquid, the anodized film, and the anode (electrode) is represented by the following equation:

$$V_{EW} = \frac{C_{EXT}}{C_{EXT} + C_{EW}} V \quad \text{[Equation 1]}$$

Here, if a capacitor having a sufficient capacitance $C_{EXT}$ is used so that $C_{EXT}$ is extremely larger than $C_{EW}$ ($C_{EXT} \gg C_{EW}$), then the voltage $V_{EW}$ applied to the structure constructed of the conductive liquid, the anodized film, and the anode (electrode) is substantially equal to the voltage V applied to the entire varifocal lens ($V_{EW} \approx V$). In this case, a variable range of voltage of the varifocal lens is restricted by the negative withstand voltage $V_{EW-}$ of the anodized film, resulting in narrowed variable voltage range. In other words, the configuration of Comparative Example 2 has a disadvantage in that the capacitance $C_{EXT}$ of the capacitor connected in series with the varifocal lens is within in a smaller range of selection. In contrast, the configuration of the electro-wetting apparatus of the embodiment of the present invention uses AC voltage as a driving voltage, where the AC voltage varies within a positive voltage range. Thus, such a disadvantage will be overcome.

2. FIRST EMBODIMENT

Next, an example of a varifocal lens that employs the electro-wetting apparatus described above will be described with reference to the attached drawings. Each of FIG. 7A and FIG. 7B is a schematic cross sectional diagram illustrating an exemplary configuration of a varifocal lens in accordance with an embodiment of the present invention.

In each of FIG. 7A and FIG. 7B, there is shown the inside of a varifocal lens 10 applied with AC voltage from a voltage-applying unit 20, where the AC voltage varies within a positive voltage range at a predetermined cycle, for example, as shown in FIG. 3 or 4. FIG. 7A is a diagram illustrating the state of the varifocal lens 10 applied with a voltage of zero (0) [V] or a comparatively small voltage level (for example, $V_1$ shown in FIG. 4). FIG. 7B is a diagram illustrating the state of the varifocal lens 10 applied with a voltage level higher than that of FIG. 7A (for example, applied with V shown in FIG. 3 or $V_2$ shown in FIG. 4).

[Configuration of Varifocal Lens]

The varifocal lens 10 of this embodiment includes a voltage-applying unit 20 and a lens main body 22. A voltage-applying unit 20 is connected to a first electrode 15 and a second electrode 17, which will be described later, on the lens main body 22. Then, AC voltage where voltage varies within a positive voltage range at a predetermined cycle is output from the voltage-applying unit 20 to these electrodes 15 and 17. In addition, the voltage-applying unit 20 is connected to a main-body driving unit 21, such as an image pick-up apparatus, on which the varifocal lens 10 is mounted. The main-body driving unit 21 supplies electric current to the voltage-applying unit 20 and controls the operation of the voltage-applying unit 20. Here, the main-body driving unit 21 may be installed in the varifocal lens 10.

Figure 8:
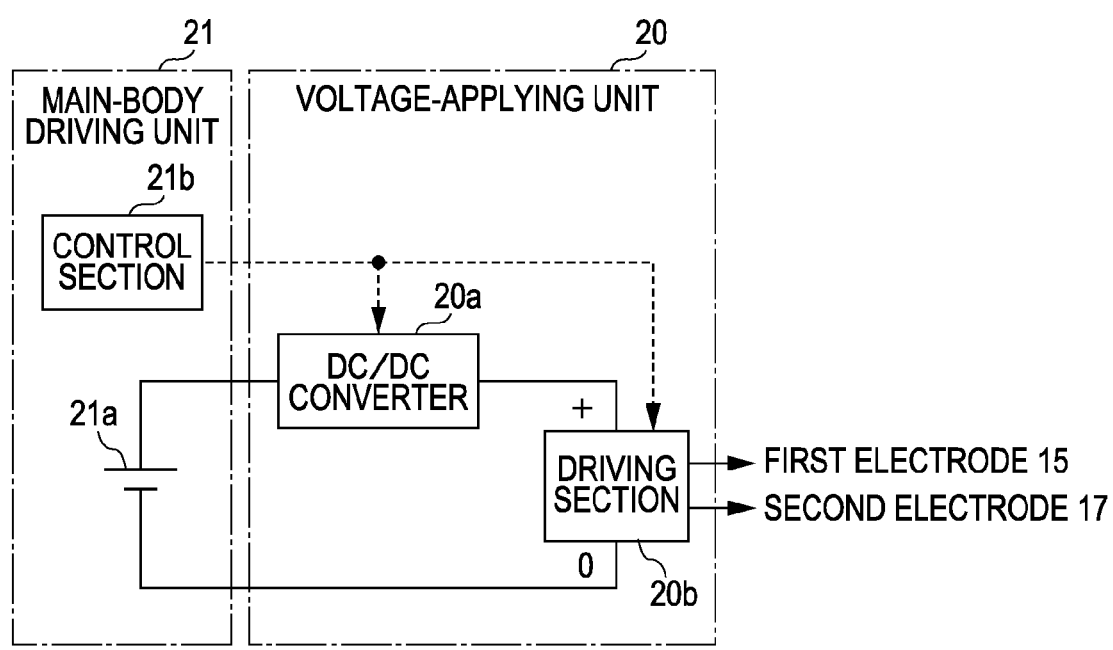
FIG. 8 is a block diagram illustrating a voltage-applying unit of the varifocal lens of the first embodiment and a main-body driving unit for driving the voltage-applying unit.

FIG. 8 is a diagram schematically illustrating both the configuration of the voltage-applying unit 20 and the configuration of the main-body driving unit 21. The voltage-applying unit 20 mainly includes a DC/DC converter 20a and a driving section 20b. In addition, the main-body driving unit 21 mainly includes a power supply 21a and a control section 21b. As is evident from comparison between the entire configurations of the voltage-applying unit 20 and the main-body driving unit 21 shown in FIG. 8 and the configuration of the voltage-applying unit 6 shown in FIG. 2 and described in the above description of the electro-wetting apparatus 1, these configurations are identical with each other. In the present embodiment, the power supply 21a and the control section 21b may be those of an image pick-up apparatus or the like on which the varifocal lens 10 is mounted.

Furthermore, the lens main body 22 includes a container 9 made of an insulating material in the form of a cylindrical tube or the like in which a first liquid 11 with conductivity or polarity and a second liquid 12 with insulation properties are stored. The container 9 is not limited to a cylindrical shape. Alternatively, it may be in the form of a rectangular shape, a truncated conical shape (so-called mortar bowl shape), or the like. Hereafter, each of structural components of the lens main body 22 will be described.

The first liquid 11 and the second liquid 12 are prepared using their respective materials which are optically transparent and have different refractive indexes while being incompatible with each other. The first liquid 11 may be any liquid with conductivity or polarity. For example, the first liquid 11 may be an electrolyte solution or an ionic liquid, such as salt water or an aqueous sodium sulfate ($Na_2SO_4$). Furthermore, the second liquid 12 may be any liquid with insulation properties or nonpolarity.

For example, the second liquid 12 may be silicone oil.

In the case of forming a varifocal lens on the interface between the first liquid 11 and the second liquid 12, it is desirable that a difference in specific gravity between the first liquid and the second liquid is as small as possible. If the specific gravity is small, a change in profile of the interface between the first liquid 11 and the second liquid 12 due to oscillation and gravity can be prevented. However, it is not applicable if such oscillation and gravity are negligible when the size of the container 9 is as very small as about less than 1 mm or for any of other reasons.

A first optically transparent member 19 and a second optically transparent member 18 are liquid-tightly bonded to open ends 9A and 9B of the container 9 by epoxy resin or the like, respectively. Here, for example, these members 18 and 19 may be disk-shaped members made of glass or optically transparent resin. Therefore, the inside of the container 9 is hermetically-closed. In other words, the first liquid 11 and the second liquid 12 are placed between the first optically transparent member 19 and the second optically transparent member 18.

Furthermore, in the present embodiment, the outer surface of the second optically transparent member 18, which is on the opposite side from the liquid, has a curved profile for allowing incident light to be refracted. According to the present embodiment, however, it is not limited to such a profile and alternatively the outer surface of the second optically transparent member 18 may have a flat profile. In this embodiment, on the other hand, the illustrated first optically transparent member 19 has a flat outer surface. Alternatively, however, the outer surface of the first optically transparent member 19 may have a curved profile just as in the case of the second optically transparent member 18.

Furthermore, in the present embodiment, the inner surface of each of the first and second optically transparent members 19 and 18, which is on the liquid's side, has a flat profile. Alternatively, however, the surface of at least one of these members 19 and/or 18 may have a curved profile. Furthermore, if necessary, the outer surface of the first optically transparent member 19 and/or the outer surface of the second optically transparent member 18 may be provided with a structure or a thin film that will diffract or polarize the incident light. The incident light may enter either the second optically transparent member 18 (first liquid 11) or the first optically transparent member 19 (second liquid 12). The incident side may be suitably selected according to the purpose of uses.

The varifocal lens 10 of the present embodiment is provided with a first electrode 15 on an area that extends over the inner wall surface, the second open end 9B, and part of the outer wall surface of the container 9. An electrode region where the first electrode 15 is formed on the part of the outer wall surface of the container 9 is provided as an electrode-exposing region. Furthermore, the first electrode 15 may be made of a metal, a so-called valve metal, such as aluminum or tantalum from which a metal oxide can be formed by anodization. Alternatively, the first electrode 15 may be made of any of various other valve metals including niobium, hafnium, and titanium from which a metal oxide with high dielectric constant can be formed by anodization.

In the present embodiment, for example a dielectric layer (anodized film) 14 may be formed on the electrode region where the first electrode 15 is formed on the inner wall surface of the container 9. The dielectric layer 14 is made of a metal oxide with a predetermined dielectric constant. The dielectric layer 14 is formed by anodization of the region of the first electrode 15 on the inner wall surface of the container 9. When the first electrode 15 is made of aluminum, tantalum, or the like, for example, the dielectric layer may be made of alumina ($Al_2O_3$), tantalum pentoxide ($Ta_2O_5$), or the like. Therefore, the dielectric layer 14 with high dielectric constant can be formed and besides, the resulting dielectric layer 14 can be an extremely thin film with high insulation properties. Furthermore, the end of the first electrode 15 and the end of the dielectric layer 14, which face the second electrode 17, are formed such that each of these ends is displaced from the first open end 9A of the container 9 at a predetermined distance "d" from each other (see FIG. 7A).

In the first embodiment, furthermore, a water-repellent film 13 (liquid-repellent film) with higher affinity to the second liquid 12 than the first liquid 11 so that it will cover the surface of each of the dielectric layer 14, the first electrode 15, and the first optically transparent member 19 on the liquid's side. Thus, the water-repellent film 13 may be also referred to as a water-repellent coat.

On the other hand, in the present embodiment, for example, a second electrode 17 in ring shape or the like is formed such that it extends over the outer peripheral end of the second optically transparent member 18 and the near-periphery part of the side wall thereof on the liquid's side.

In other words, the second electrode 17 is arranged between the second optically transparent member 18 and the first open end 9 of the container 9.

Furthermore, when the second electrode 17 is made of an optically transparent conductive material, the shape of the second electrode 17 may not be a ring but a disk to allow the second electrode 17 to extend over the whole surface of the second optically transparent member 18 on the liquid's side.

In this embodiment, furthermore, a hydrophilic film 16 with high affinity to the first liquid 11 than the second liquid 12 so that it will cover the surface of each of the second optically transparent member 18 and the second electrode 17 on the liquid's side. Thus, the hydrophilic layer may be also referred to as a hydrophilic coat.

Furthermore, when the second optically transparent member 18 is made of glass and the surface thereof on the liquid's side is cleaned to retain its hydrophobicity, the hydrophilic film 16 may not be formed thereon.

As described above, in this embodiment, the hydrophilic film 16 is formed on the liquid's side of the second optically transparent member 18 and the water-repellent film 13 is formed on the liquid's side of each of the first optically transparent member 19 and the container 9. In addition, the first liquid 11 and the second liquid 12 are isolated from each other to avoid mixing together. Thus, according to the embodiment, as shown in FIG. 7A for example, the first liquid 11 is placed in the container 9 while facing the second optically transparent member 18 in the container 9. In contrast, the second liquid 12 is placed in the container 9 while facing the first optically transparent member 19.

[Method of Manufacturing Varifocal Lens]

Here, an exemplary method of manufacturing a varifocal lens 10 using tantalum as a material of a first electrode 15 will be described.

First, a container 9 in cylindrical shape is prepared. Then, sputtering or the like is performed to form a tantalum thin film on the inner wall surface, the second open end 9B, part of the outer wall surface of the container 9, thereby forming the first electrode 15. In this process, the tantalum film is formed so that the thickness thereof will be enough to prevent the generation of a pin hole in the film. Alternatively, the container 9 may be made of tantalum.

Subsequently, only the inner wall surface of the container 9 is immersed in an electrolytic solution such as phosphoric acid to anodize the first electrode 15. Then, using an adhesive agent such as epoxy resin, the first optically transparent member 19 is liquid-tightly placed on the second open end 9B of the container 9 where the first electrode is formed 15. After that, a water-repellent film 13 is formed so that it will cover the dielectric layer 14 and the first electrode 15 of the container 9 and also cover the liquid's side surface of the first optically transparent member 19.

Furthermore, a second liquid 12 with insulation properties and a first liquid 11 with conductivity are poured in this order into a reservoir space formed by the water-repellent film 13.

Furthermore, following the aforementioned steps or in parallel therewith, sputtering or the like is performed to form a ring-shaped second electrode 17 on the second optically transparent member 18. Subsequently, a hydrophilic film 16 is formed on the second optically transparent member 18 and the second electrode 17.

The second optically transparent member 18 is liquid-tightly placed on the first open end 9A of the container 9 using an adhesive agent or the like so that the hydrophilic layer 16 and the water-repellent film 13 can be faced to each other. Consequently, the varifocal lens 10 of the present embodiment is obtained.

[Operation of Varifocal Lens]

Next, the operation of the varifocal lens 10 of the present embodiment will be described. Here, the following description will consider a case in which the surface tension of the first liquid material 11 is higher than that of the second liquid 12. In this case, it is considered that the contact angle of the first liquid 11 to the water-repellent film 13 is defined as $\theta_0$ when the voltage-applying unit 20 applies a voltage of 0 (zero) [V] or comparatively small voltage (for example, $V_1$ in FIG. 4) between the first electrode 15 and the second electrode 17 by the voltage-applying unit 20 (in the state shown in FIG. 7A).

Therefore, if voltage applied between the first electrode 15 and the second electrode 17 is higher than that of the state shown in FIG. 7A (for example, V in FIG. 3 or V2 in FIG. 4), the wettability of the first liquid 11 to the water-repellent film 13 by the electro-wetting phenomenon can be improved. As a result, as shown in the state of FIG. 7B, the profile of the interface between the first liquid 11 and the second liquid 12 is changed to cause an increase in contact area between the first liquid 11 and the water-repellent film 13 and an increase in contact angle θ of the first liquid 11 to the water-repellent film 13. Furthermore, the contact angle θ of the first liquid 11 to the water-repellent film 13 can be controlled by the level of voltage applied.

In the present embodiment, furthermore, the curvature of the interface between the first liquid 11 and the second liquid 12 can be controlled by the level of voltage applied, so that the focal distance of the varifocal lens 10 can be changed. For example, the materials of the first liquid 11 and the second liquid 12 may be selected to increase the refractive indexes thereof. In this case, an increase in voltage applied leads to reduce the contact angle of the first liquid 11 from one shown in FIG. 7A to the other shown in FIG. 7B. As a result, the focal distance of the varifocal lens 10 can be increased.

Since the varifocal lens 10 of the present embodiment is driven by AC voltage that varies within a positive voltage range at a predetermined cycle, the deformed profile of the interface between the first liquid 11 and the second liquid 12 due to an electro-wetting phenomenon is being held.

In this embodiment, furthermore, drive voltage is changed within in a positive voltage range. Thus, the variable voltage range can solve the problem in that the dielectric layer 14 can be prevented from restriction with negative withstand voltage $V_{EW-}$.

Furthermore, when a metallic oxide film is used as a dielectric film 14 just as in the case of the present embodiment, the positive withstand voltage $V_{EW+}$ may be, for example, several tens of volts to a hundred and several tens volts. In the present embodiment, therefore, the varifocal lens 10 can be driven at a low voltage within a wider variable range of voltages. In other words, it is possible to control the focal distance of the varifocal lens 10 within a wider range at a low voltage.

In this embodiment, a capacitor between the apparatus and the voltage-applying unit in series connection like the one of Comparative Example 2 as described above is not necessary. Thus, it is possible to overcome the above disadvantage in Comparative Example 2. Specifically, in the present embodiment, the variable range of voltage is not restricted by the negative withstand voltage $V_{EW-}$ of the dielectric layer 14. In addition, the number of parts of the apparatus can be reduced. Therefore, an improvement in voltage conversion efficiency can be also attained.

[Advantageous Effects Obtained by Anodization]

Here, as described above, advantages (effects) of forming the dielectric layer (anodized film) 14 by anodization will be described below.

In the past, the formation of a dielectric layer 14 on an electrode of an apparatus using an electro-wetting phenomenon, such as a varifocal lens, has been performed by vapor deposition, such as sputtering or chemical vapor deposition (CVD), or spin coating. In this case, if there is a defect such as a pinhole in the dielectric layer 14, a dielectric breakdown may occur. Thus, the formation of the dielectric layer 14 without causing such a defect is indispensable. However, depending on the surface state of an electrode, the formation of a pinhole may be facilitated. To prevent the pinhole formation, the dielectric layer 14, and in order to prevent this, it is desirable to increase the thickness of the dielectric layer 14.

In this case, for example, a drive voltage of about 100 V or more is desired.

Furthermore, it is desirable to form the dielectric layer 14 on the inner wall surface of the container 9 while having a uniform thickness. However, the formation of the dielectric layer 14 on a nonplanner surface such as the inner wall surface of the cylinder, by the aforementioned procedures which have been employed in the past may lead to the uneven thickness of the dielectric layer 14. In this case, the interface between the first liquid 11 and the second liquid 12 is not spherically shaped and a good curvature thereof as a lens is hardly obtained. As a result, the optical quality of the apparatus may be decreased.

In the present embodiment, the surface of the metallic thin film to be provided as an electrode is anodized to form a metallic oxide film on the surface of the electrode. The resulting metallic oxide film is then provided as a dielectric layer. Therefore, the dielectric layer 14 of the present embodiment does not cause any pinhole in principle, so that it will have the advantage of resistance to dielectric breakdown. Furthermore, in the present embodiment, the metallic thin film to be provided as an electrode is not anodized completely and part of the metallic thin film is then remained as a metal. Thus, the remaining metallic region can be directly used as an electrode.

Furthermore, in the case of forming the dielectric layer 14 by anodization as described above, the volume of the electrode's metal may increase during the process of converting the metal into a metal oxide. Thus, the dielectric layer 14 thus obtained can be a dense film and the generation of any pinhole can be thus prevented. Furthermore, when the inner wall surface of the container 9 is coated with a metallic material such as tantalum, an dielectric breakdown will not occur even if a small number of pinhole defects is formed in the metallic film of tantalum or the like as long as the material of the container 9, which is provided as a substrate, is an insulating material. Such a defect will be no problem. Furthermore, the metal oxide generated by anodization does not cause dielectric breakdown until being held at the formation voltage. Thus, the dielectric breakdown strength of the resulting dielectric layer 14 is sufficiently high.

Furthermore, the film thickness of the dielectric layer 14 formed by anodization depends on the formation voltage. For example, when tantalum is used as an electrode material, the rate of an increase in film thickness of the dielectric layer 14 is theoretically about 1.8 nm per formation voltage. Furthermore, when the dielectric layer 14 is anodized by liquid immersion as described above, the film thickness of the dielectric layer 14 becomes uniform. In other words, even if the metal film of tantalum or the like formed fast has an uneven film thickness, the dielectric layer 14 (anodized film) formed on the surface of such a metal film has a uniform film thickness. Therefore, the profile of the interface between the first liquid 11 and the second liquid 12, or the curvature of the lens can be properly kept in spherical shape. As a result, an optical apparatus such as a varifocal lens with good optical characteristics can be obtained as the lens can be prevented from generating aberration while being operated with high precision. Examples of the optical apparatus include an optical device having an aperture mechanism or a shutter mechanism, a zoom lens, a light modulator, and a display apparatus. Furthermore, such advantageous effects can be similarly obtained by any of various other optical apparatuses using an electro-wetting phenomenon.

Furthermore, the manufacturing method using the anodization as described above has been widely used for tantalum capacitors or the like. In addition, the configuration of a manufacturing apparatus used in such a method is comparatively simple and the manufacturing technology used in such a method has been also established. Thus, the manufacture is very easy. Therefore, in the present embodiment, the apparatus and method for manufacturing a dielectric layer are simple and are able to manufacture a large number of optical apparatuses such as varifocal lenses each having such a dielectric layer, compared with the manufacture of a dielectric layer by a vacuum film formation method, spin coating, or the like, which has been commonly employed in the art.

[Relationship Between Dielectric Layer and Water-Repellent Film]

By the way, one of the characteristic features of the dielectric layer 14 obtained by anodizing the above valve metal is to be formed in comparatively thin film thickness in the order of sub-microns and to have a high dielectric constant of about 10 to 50. However, the dielectric layer 14 has a comparatively high surface energy, so that a high water-repellent effect can be hardly obtained using only the divalent layer 14. For this reason, when the dielectric layer 14 obtained by anodizing the valve metal is used in an electro-wetting apparatus, a process of imparting water repellency to the surface of the dielectric layer 14 is performed. In other words, it is desirable to form a water-repellent film 13 on the dielectric layer 14 in a manner similar to the present embodiment. However, since the dielectric layer 14 is a comparatively thin film with a high dielectric constant, a large part of drive voltage is applied to the water-repellent film 13 at the time of voltage application and the dielectric breakdown of the water-repellent film 13 may tend to be occurred. Therefore, it is preferable to form the water-repellent film 13 to be prevented from causing dielectric breakdown. This point will be described in detail below.

When the water-repellent film 13 is formed on the dielectric layer 14, the equivalent circuit thereof can be considered as capacitors in series connection, which respectively correspond to the dielectric layer 14 and the water-repellent film 13. In general, furthermore, the material of the water-repellent film 13 has a low dielectric constant. In particular, even though a fluoride compound has a dielectric constant of about 2, it is suitably used as a water-repellent film 13. Therefore, for example, when the dielectric layer 14 is formed as a film of parylene (para-xylene resin) with a film thickness of 3 μm and the water-repellent film 13 is formed as a film of AF1600 (trade name, manufactured by E. I. du Pont de Nemours and Company) with a film thickness of 10 nm, a voltage applied to the water-repellent film 13 is about 0.5% of the total.

In contrast, like the present embodiment, for example, if the dielectric layer 14 is formed by anodizing the electrode made of tantalum or the like at 100 V, the resulting dielectric layer 14 may have a film thickness about 180 nm and a relative dielectric constant of about 27. Furthermore, if the above material (AF1600 (trade name, manufactured by E. I. du Pont de Nemours and Company) is used as a water-repellent film 13, a voltage applied to the water-repellent film 13 is about 50% of the total. Therefore, in this case, the water-repellent film 13 subjected to the application of high voltage may tend to cause dielectric breakdown. In this case, furthermore, an apparent relative dielectric constant of a combination of the dielectric layer 14 and the water-repellent film 13 becomes about 15. An advantage of using the dielectric layer 14 as a material with a high dielectric constant will be spoiled. In order to improve the aforementioned point, the material of the water-repellent film 13 is preferably one that allows the water-repellent film 13 to have a film thickness in the order of nanometers. To provide the water-repellent film 13 with a film thickness in the order of nanometers (less than one micrometers), a fluorine-based silane-coupling agent which is a reactive water-repellent coating material is preferable. For example, OPTOOL DSX (trade name, manufactured by Daikin Industries, Ltd.) may be used. A reactive water-repellent coating material such as OPTOOL DSX (trade name, manufactured by Daikin Industries, Ltd.) can be formed in a film thickness of less than about less than 10 nm, for example 5 nm or less, depending on a processing method, or in a film thickness almost equal to a monomolecular film.

If the water-repellent film 13 is extremely thinned in this way, an increase in leakage current occurs and the insulation properties of the water-repellent film 13 can be negligible. In other words, the generation of heat from the water-repellent film 13 becomes small and it can be prevented from causing dielectric breakdown. In addition, the water-repellent film 13 is hardly functional as a capacitor. Therefore, both the dielectric layer 14 and the water-repellent film 13 are not considered as capacitors in series connection but only the dielectric layer 14 can be considered as a capacitor. Therefore, the total dielectric constant of the dielectric layer 14 and the water-repellent film 13 corresponds to only the dielectric constant of the dielectric layer 14. As a result, the above effect of lowering drive voltage can be prevented from decreasing.

Modified Example 1

Figure 9:
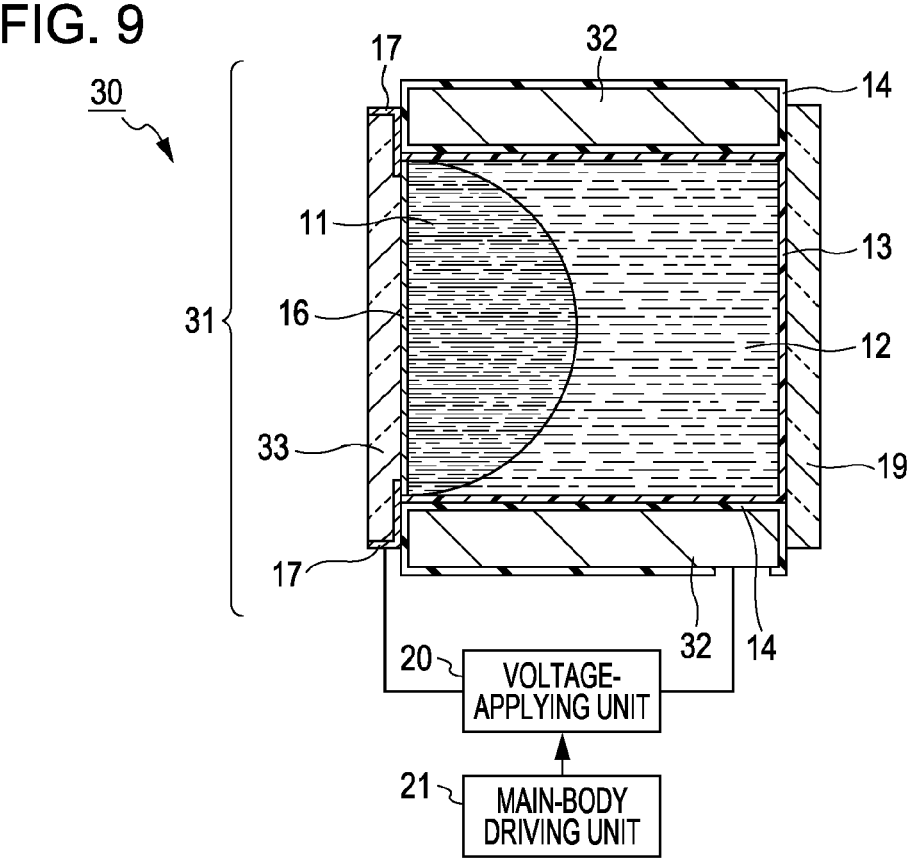
FIG. 9 is a schematic cross-sectional view of a varifocal lens of Modified Example 1.

If the electro-wetting apparatus according to the embodiment is applied to a varifocal lens, the configuration of the varifocal lens is not limited to one of the first embodiment illustrated in FIG. 7A and FIG. 7B. FIG. 9 illustrates another example of the configuration of the varifocal lens where the electro-wetting apparatus of the embodiment is employed (Modified Example 1). Here, the structural components of the varifocal lens shown in FIG. 9 are represented by the same reference numerals as those of the structural components of the varifocal lens shown in FIG. 7.

A varifocal lens 30 of Modified Example 1 includes a container 32 made of a metallic material that connects to a first optically transparent member 19 and a second optically transparent member 33. Here, the container is used as a first electrode (hereinafter, the container 32 is also referred to as a first electrode 32). In other words, the first electrode 32 of Modified Example 1 is designed to serve as both the container 9 and the first electrode 15 of the varifocal lens 10 shown in FIG. 7A and FIG. 7B.

In this example, the whole surface of the first electrode 32 is anodized to form a dielectric layer 14. However, the metal surface of a portion connecting to a voltage-applying unit 20 of the first electrode 32 (connection region) is exposed. For example, the connection region may be formed by forming the dielectric layer 14 on the whole surface of the first electrode 32 and then removing the part of the dielectric layer 14 connecting to the voltage-applying unit 20. Alternatively, the connection region of the voltage-applying unit 20 may be formed by forming a protrusion on part of the first electrode 32, anodizing the first electrode 32 while preventing such a protruded portion from being immersed in an anodization liquid, and removing the protruded portion.

Furthermore, in Modified Example 1, the second optically transparent member 33 has a flat surface on the side opposite to the liquid. Other structural components of the lens main body 31 are similar to those of the lens main body 22 of the varifocal lens 10 shown in FIG. 7A and FIG. 7B.

In addition, the voltage-applying unit 20 is connected to the first electrode 32 and the second electrode 17 on the lens main body 31. Then, AC voltage where voltage varies within a positive voltage range at a predetermined cycle, such as one shown in FIG. 3 or FIG. 4, is output from the voltage-applying unit 20 to these electrodes 32 and 17. In addition, the voltage-applying unit 20 is connected to a main-body driving unit 21, such as an image pick-up apparatus, on which the varifocal lens 30 is mounted. Furthermore, each of the voltage-applying unit 20 and the main-body driving unit 21 has the same configuration as that of one illustrated in FIG. 8. In addition, the main-body driving unit 21 may be included in the varifocal lens 30.

In Modified Example 1, just as in the case of the first embodiment, since the varifocal lens 30 is driven by AC voltage that varies within a positive voltage range at a predetermined cycle, the varifocal lens 30 can be driven at a low voltage within a wider variable range of voltages. In other words, in Modified Example 1, it is also possible to control the focal distance of the varifocal lens 30 within a wider range at a low voltage. Furthermore, in the configuration of the varifocal lens of Modified Example 1, there is no necessity for forming a second electrode as the surface of the container 32 in cylindrical form or the like may be partially sputtered. Thus, comparing with the first embodiment, it is advantageous in manufacture.

Modified Example 2

Figure 10:
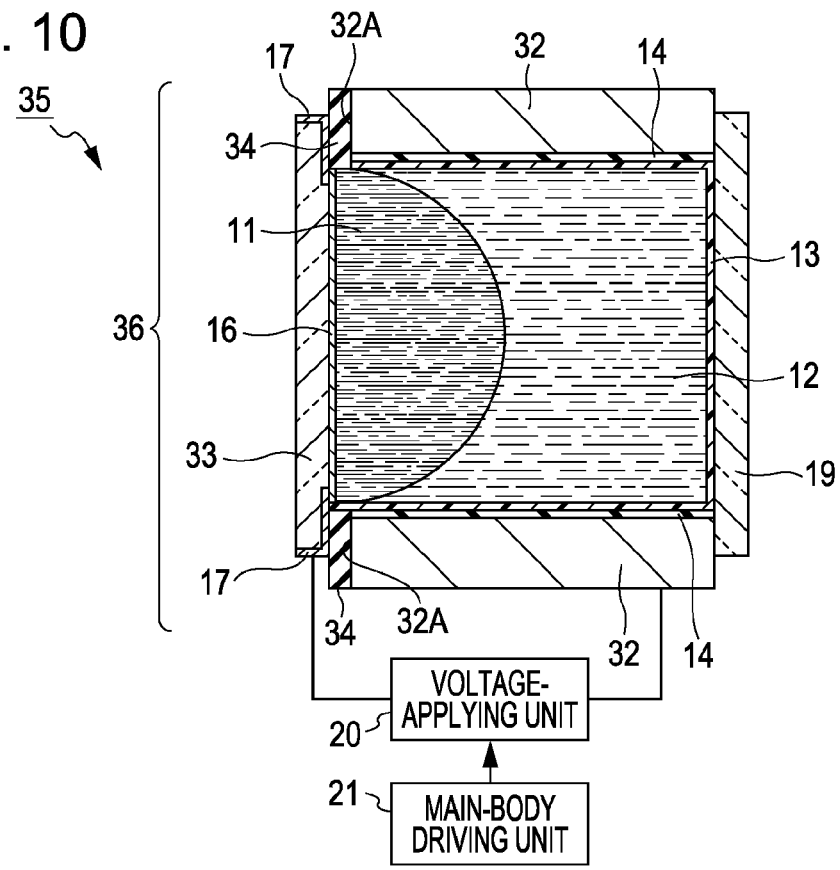
FIG. 10 is a schematic cross-sectional view of a varifocal lens of Modified Example 2.

FIG. 10 illustrates another example of the configuration of the varifocal lens where the electro-wetting apparatus of the embodiment is employed (Modified Example 2). Here, the structural components of the varifocal lens 35 shown in FIG. 10 are represented by the same reference numerals as those of the structural components of the varifocal lens 30 shown in FIG. 9.

The varifocal lens 35 of Modified Example 2 includes a container which is made of a metallic material and used as a first electrode 32. In Modified Example 2, the inner wall surface of the first electrode 32 is anodized to form a dielectric layer 14. Furthermore, in Modified Example 2, an insulating member 34, such as a ring-shaped member made of an insulating material, is placed between the first electrode 32 and a second electrode 17 to ensure electronic isolation between the first electrode 32 and the second electrode 17. Other structural components of the lens main body 36 are similar to those of the lens main body 31 of the varifocal lens 30 of Modified Example 1 (see FIG. 9).

In addition, the voltage-applying unit 20 is connected to a first electrode 32 and a second electrode 17 on the lens main body 36. Then, AC voltage where voltage varies within a positive voltage range at a predetermined cycle as shown in FIG. 3 or FIG. 4 is output from the voltage-applying unit 20 to these electrodes 32 and 17. In addition, the voltage-applying unit 20 is connected to a main-body driving unit 21, such as an image pick-up apparatus, on which the varifocal lens 35 is mounted. Furthermore, each of the voltage-applying unit 20 and the main-body driving unit 21 has the same configuration as that of one illustrated in FIG. 8. In addition, the main-body driving unit 21 may be included in the varifocal lens 35.

In Modified Example 2, just as in the case of the first embodiment, since the varifocal lens 35 is driven by AC voltage that varies within a positive voltage range at a predetermined cycle, the varifocal lens 35 can be driven at a low voltage within a wider variable range of voltages. In other words, in Modified Example 2, it is also possible to control the focal distance of the varifocal lens 35 within a wider range at a low voltage. In the configuration of the varifocal lens 35 in Modified Example 2, just as in the case of Modified Example 1, there is no necessity for forming the second electrode on the surface of the container in cylindrical shape or the like by partial sputtering or the like. Thus, comparing with the first embodiment, it is advantageous in manufacture.

Modified Example 3

Figure 11:
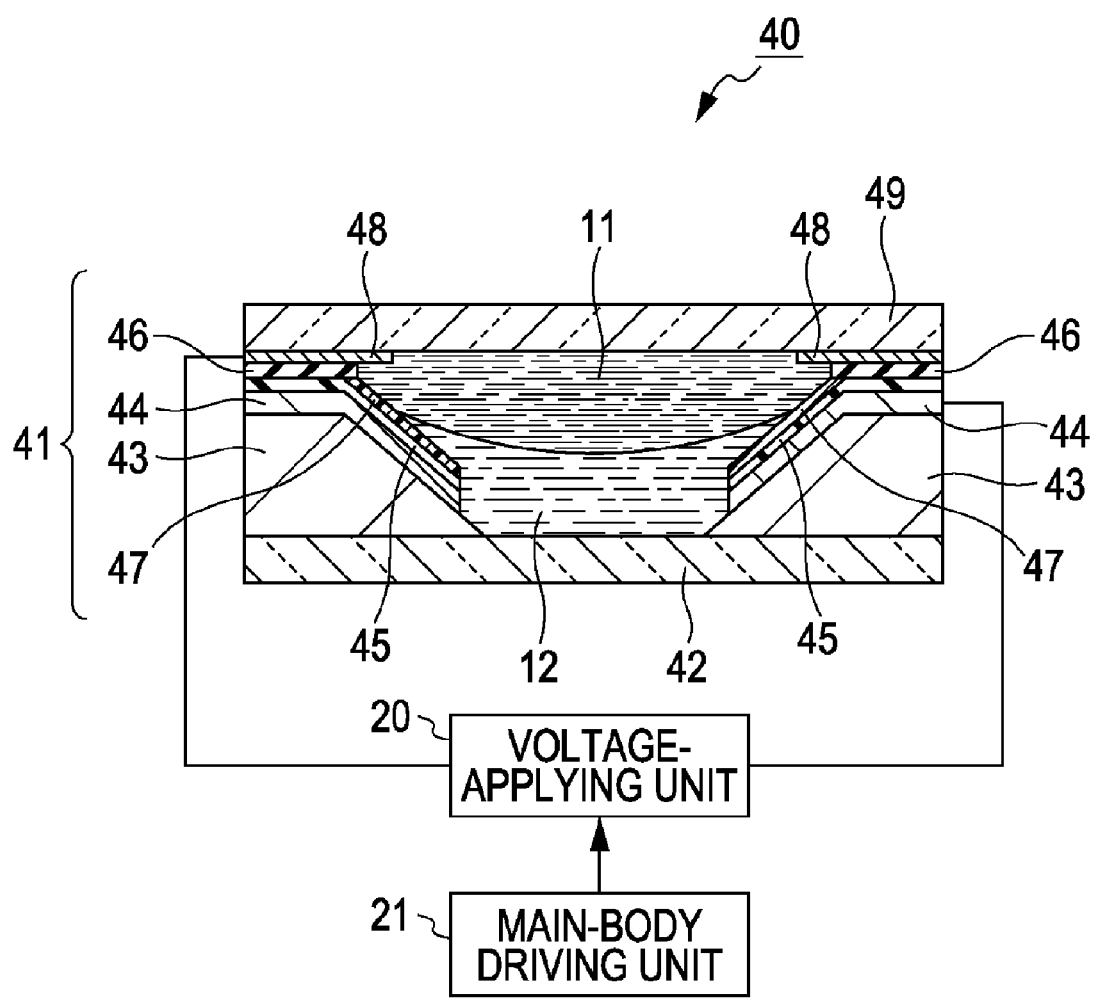
FIG. 11 is a schematic cross-sectional view of a varifocal lens of Modified Example 3.

FIG. 11 illustrates another example of the configuration of the varifocal lens where the electro-wetting apparatus of the embodiment is employed (Modified Example 3). A varifocal lens 40 of Modified Example 3 includes a container 43 having an inner wall surface in mortar bowl shape (truncated conical shape) and holding both a first liquid 11 with conductivity and a second liquid 12 with insulation properties. The container 43 includes an opening having two end faces opposite to each other, an end face with a larger opening area (hereinafter, also referred to as an upper end face) and an end face with a smaller opening area (hereinafter, also referred to as a lower end face). The upper end face is provided with a second optically transparent member 49 and the lower end face is provided with a first optically transparent member 42. The first optically transparent member 42 and the second optically transparent member 49 are liquid-tightly placed on the opposite end faces of the container 43 using an adhesive agent or the like, respectively.

A first electrode 44 is formed extending from the upper end of the second opening of the container 43 along the inner wall surface thereof. The surface of the first electrode 44 is anodized to form a dielectric layer 45. In addition, a water-repellent film 47 is formed on a region where the dielectric layer 14 is formed on the inner wall surface of the opening.

On the other hand, a second electrode 48 is formed on the liquid's side surface of the second optically transparent member 49 and formed in ring shape or the like. Furthermore, the upper end face of the container 43 is provided with an insulating member 46 between the dielectric layer 45 and the second electrode 48 to ensure electronic isolation between the first electrode 44 and the second electrode 48. Furthermore, in Modified Example 3, the liquid's side surface of the second optically transparent member 49 is cleaned to retain its hydrophobicity. Furthermore, in Modified Example 3, the second optically transparent member 49 has a flat surface on the side opposite to the liquid.

In addition, the voltage-applying unit 20 is connected to the first electrode 44 and the second electrode 48 on the lens main body 41. Then, AC voltage where voltage varies within a positive voltage range at a predetermined cycle, such as one shown in FIG. 3 or FIG. 4, is output from the voltage-applying unit 20 to these electrodes 44 and 48. In addition, the voltage-applying unit 20 is connected to a main-body driving unit 21, such as an image pick-up apparatus, on which the varifocal lens 40 is mounted. Furthermore, each of the voltage-applying unit 20 and the main-body driving unit 21 has the same configuration as that of one illustrated in FIG. 8. In addition, the main-body driving unit 21 may be included in the varifocal lens 35.

In Modified Example 3, just as in the case of the first embodiment, since the varifocal lens 40 is driven by AC voltage that varies within a positive voltage range at a predetermined cycle, the varifocal lens 40 can be driven at a low voltage within a wider variable range of voltages. In other words, in Modified Example 3, it is also possible to control the focal distance of the varifocal lens 40 within a wider range at a low voltage.

Modified Example 4

Figure 12:
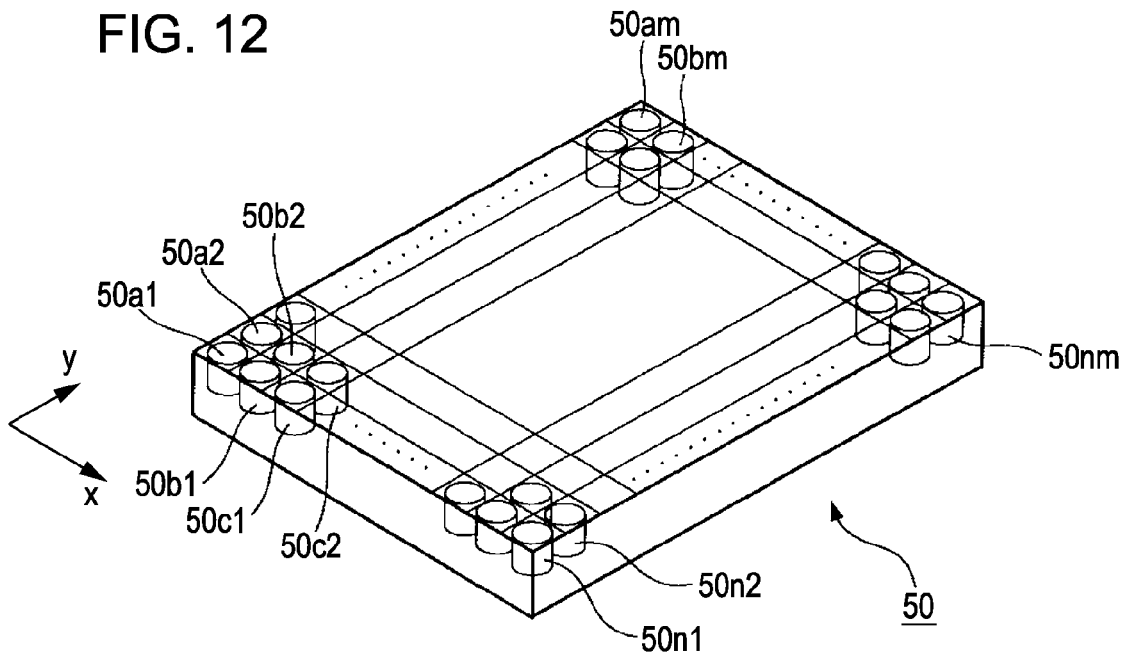
FIG. 12 is a schematic perspective view of a lens array of Modified Example 4.

A plurality of varifocal lenses of the above embodiment may be arranged in parallel with one another in two-dimensional arrangement (parallel arrangement). FIG. 12 is a diagram illustrating an exemplary configuration of the lens array (Modified Example 4). The example shown in FIG. 12 only illustrates the first and second liquid portions in the respective varifocal lenses (the insides of the respective containers thereof). Their other structural components, voltage-applying units, and main-body driving units are omitted from the drawing.

The lens array 50 includes "n" varifocal lenses ("n" is a positive integer), for example, varifocal lenses $50a1$ to $50n1$, in a first direction (x direction in FIG. 12). In addition, the lens array 50 also includes "m" varifocal lenses ("m" is a positive integer), for example, varifocal lenses $50a1$ to $50am$ in the direction (y direction in FIG. 12), which is substantially perpendicular to the first direction. In other words, the lens array 50 of this example includes "n×m" varifocal lenses in total. Furthermore, each of the varifocal lenses may be one shown in any of FIGS. 7 to 11 (the first embodiment and Modified Examples 1 to 3 thereof). Furthermore, when the configuration of the varifocal lens of the embodiment is applied to the lens array 50 of Modified Example 4, the lens array 50 can be driven at a low voltage within a wider variable range of voltages. Here, with respect to the number of the varifocal lenses, "n" may not be equal to "m" (n≠m) or may be equal to "m" (n=m).

Modified Example 5

Although the first embodiment and Modified Examples 1 to 4 thereof have described the configurations of signal or plural varifocal lenses in which the container or one functioned as an electrode is formed in a cylindrical shape, the shape of the container of any embodiment or modified examples thereof is not limited to such a cylindrical shape. The container or one functioned as an electrode of the varifocal lens may be formed in any of various shapes as long as it allows the anodization of a first electrode. For example, the container may be formed in a rectangular shape.

Figure 13:
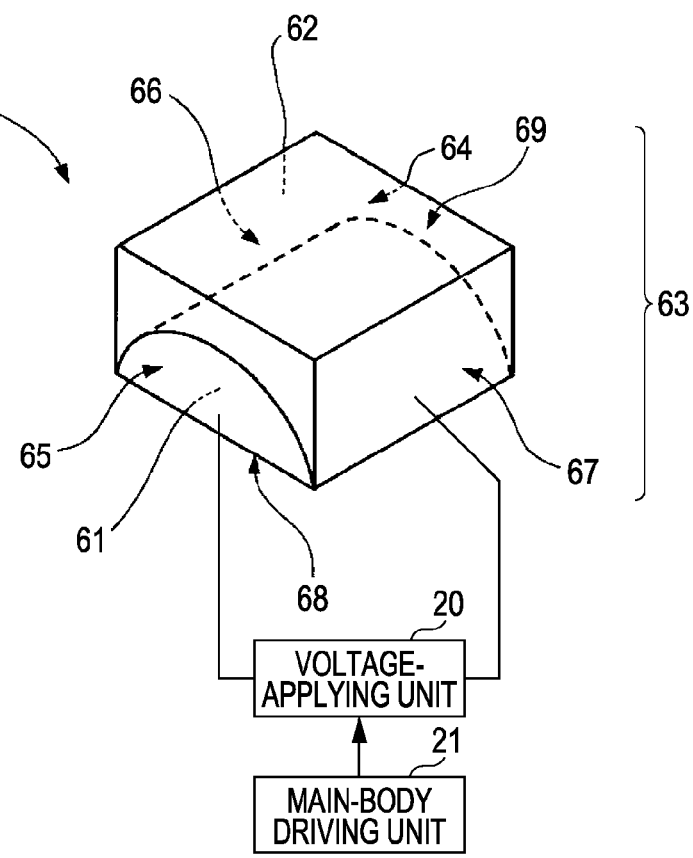
FIG. 13 is a schematic perspective view of a varifocal lens of Modified Example 5.

FIG. 13 is a diagram illustrating an exemplary varifocal lens in rectangular shape (Modified Example 5). Here, a lens main body 63 shown in FIG. 13 includes a first liquid 61 with conductivity, a second liquid 62 with insulation properties, and wall surfaces that define a rectangular space for housing these structural components. In FIG. 13, the details of these wall surfaces are omitted. In this example, a varifocal lens 60 in which the interface between the first liquid 61 and the second liquid 62 is formed in a semi-cylindrical shape will be described.

In the example shown in FIG. 13, among the side wall surfaces 64, 65, 66, and 67, for example, each of the opposite side wall surfaces 64 and 65 is provided with a generally semi-circular shaped region with high adsorption affinity to the first liquid 61.

In addition, but not shown in the figure, a water-repellent film, a dielectric layer (anodized film), and a first electrode in the order from the liquid's side are arranged on other opposite side wall surfaces 66 and 67. In addition, a second electrode is formed on the bottom surface 68. Furthermore, the first electrode and the second electrode are electrically isolated from each other. If necessary, any hydrophilic film may be placed between the second electrode and the first liquid 61. Therefore, such a configuration of the varifocal lens 60 is provided as a cylindrical type varifocal lens in which the contact angles of the first liquid 61 to the side wall surfaces 66 and 67 are only changed.

The voltage-applying unit 20 is connected to both the second electrode formed on the bottom surface 68 of the lens main body 63 and the first electrode formed on the side wall surfaces 66 and 67. Then, these electrodes receive AC voltage where voltage varies within a positive voltage range at a predetermined cycle as shown in FIG. 3 or FIG. 4 from the voltage-applying unit 20. In addition, the voltage-applying unit 20 is connected to a main-body driving unit 21, such as an image pick-up apparatus, on which the varifocal lens 60 is mounted. Furthermore, the voltage-applying unit 20 and the main-body driving unit 21 have the same configurations as those illustrated in FIG. 8, respectively. In addition, the main-body driving unit 21 may be included in the varifocal lens 35.

In Modified Example 5, just as in the case of the first embodiment, since the varifocal lens 60 is driven by AC voltage that varies within a positive voltage range at a predetermined cycle, the varifocal lens 60 can be driven at a low voltage within a wider variable range of voltages. In other words, in Modified Example 6, it is also possible to control the focal distance of the varifocal lens 60 within a wider range at a low voltage.

Cylindrical type varifocal lenses 60 of Modified Example 5 are arranged in parallel to constitute a lenticular type lens array. If the lenticular type lens array is formed, it is possible to use a display apparatus capable of displaying a three-dimensional image under voltage control. Therefore, a small-sized three-dimensional display apparatus to be driven by a practically allowable drive voltage can be provided.

3. SECOND EMBODIMENT

As descried above, the varifocal lens of the first embodiment can be driven at a low voltage, so that it will be applied to any of various optical apparatuses using small-sized varifocal lenses even though such small-sized varifocal lenses have not been provided in the past. For example, the varifocal lens of the first embodiment can be applied to any of various optical recording/reproducing apparatuses and optical pick-up apparatus thereof, such as those typified by compact discs (CDs), digital versatile discs (DVDs), and Blue-ray Discs (BD; registered trade mark).

In any of the optical recording/reproducing apparatuses and the optical pick-up devices thereof may use the varifocal lens of the first embodiment as an aberration corrector or a collimator lens with variable magnification. In particular, a collimator lens with variable focal distance is typically installed in an optical recording/reproducing apparatus using a multi-wavelength light source that allows the apparatus to be compatible with various optical discs. Thus, the varifocal lens of the lens can be suitable for a collimator lens.

[Configuration of Optical Pick-Up Apparatus]

Figure 14:
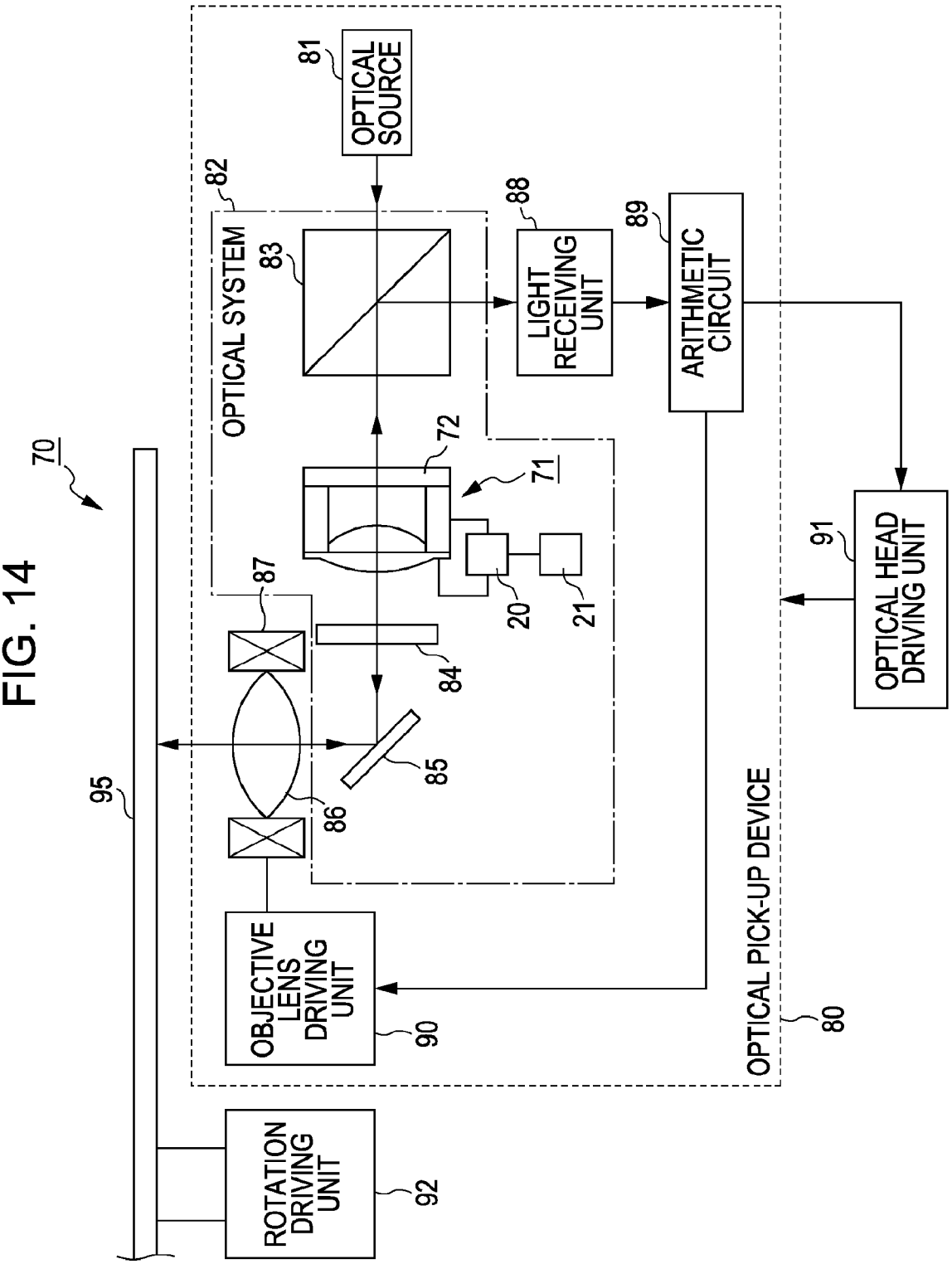
FIG. 14 is a block diagram schematically illustrating an optical pick-up apparatus according to a second embodiment.

FIG. 14 is a diagram illustrating an exemplary configuration of an optical recording/reproducing apparatus applied with the first embodiment of the present invention. The optical recording/reproducing apparatus 70 includes a rotation driving unit 92 provided with a spindle motor or the like to rotate an optical recording medium 95 (such as an optical disc), an optical pick-up apparatus 80 (corresponding to a region surrounded by an undulating line in FIG. 14), and an optical head driving unit 91 that drives the optical pick-up apparatus 80. The optical recording medium 95 is mounted and fixed on the rotation driving unit 92 and rotated at a predetermined rotation rate at the time of recording or reproduction.

The optical pick-up apparatus 80 mainly includes a light source 81 (light source unit), an optical system 82 (a region surrounded by a dashed line in FIG. 14), a light receiving unit 88, an arithmetic circuit 89, an objective lens 86, an actuator 87 which is provided for driving the objective lens 86, and an objective lens driving unit 90. The light source 81 may include a double-wavelength semiconductor laser that emits laser beams at two different wavelengths. In addition, the actuator 87 may include a biaxial actuator or the like which can be operated under the control of the objective lens driving unit 90.

In the optical pick-up apparatus 80, light output from the light source 81 enters the optical system 82 and is then incident on the optical recording medium 95 through the objective lens 86. In addition, light reflected from the optical recording medium is led to the light receiving unit 88 via the optical lens 86 and the optical system 82.

The optical system 82 mainly include a polarization beam splitter 83, a varifocal lens 71, a ¼ wavelength plate 84, and a mirror 85.

Among optical devices that constitute the optical system 82, devices other than the varifocal lens 71 may be those which have been used in the past.

The varifocal lens 71 may be one using an electro-wetting phenomenon which has been described in any of the above first embodiment and Modified Examples 1 to 3 and 5 thereof. The varifocal lens 71 includes a lens main body 72 and a voltage-applying unit 20 that applies voltage to the lens main body 72.

Furthermore, the structural components of the lens main body 72 illustrated in FIG. 14 includes first and second optically transparent members, a container, and first and second liquids held in the inside of the lens main body 72, while electrodes, a dielectric layer, a water-repellent film, and so on are not shown in FIG. 14 for simplified illustration.

The configuration of the lens main body 72 may be any of those shown in FIGS. 7, 9, 10, 11, and 13. In addition, the voltage-applying unit 20 may have the same configuration as that of the first embodiment (see FIG. 8). In other words, in the present embodiment, the varifocal lens 71 is driven by AC voltage (for example, a voltage signal shown in FIG. 3 or FIG. 4) that varies within a positive voltage range at a predetermined cycle. There, the focal distance of the lens with respect to the incident light can be controlled by changing the profile (curvature) of interface between the first liquid and the second liquid held in the lens main body 72.

In FIG. 14, by the way, the main-body driving unit 21 for driving the voltage-applying unit 20 is illustrated in the optical pick-up apparatus 180 to clarify the configuration of the varifocal lens 71 of the present embodiment. Actually, in the present embodiment, the main-body driving unit 21 is a structural component installed in the optical recording/reproducing apparatus 70. Thus, for example, it may be typically included in an optical head driving unit 91 shown in FIG. 14. However, the present embodiment is not limited to such a configuration. Alternatively, the main-body driving unit 21 may be included in the varifocal lens 71.

[Operation of Optical Pick-Up Apparatus]

Next, an exemplary operation of the optical pick-up apparatus 80 of the present embodiment will be described. For example, a laser beam emitted from the light source 81 is incident on a polarization beam splitter 83 and passes through the polarization plane thereof, followed by entering into the varifocal lens 71. The varifocal lens 71 is driven by AC voltage at a predetermined cycle, where the AC voltage varies within a positive voltage range, supplied from the voltage-applying unit 20. Therefore, the incident light is collimated and the varifocal distance of the lens with respect to the incident light is then controlled.

Subsequently, the light passed through the varifocal lens 71 passes through the ¼ wavelength plate 84 and is then reflected on the mirror 85, followed by being incident on the recording track of the optical recording medium 95 through the objective lens 86.

On the other hand, the light reflected from the optical recording medium 95 passes through the objective lens 36, the mirror 85, the ¼ wavelength plate 84, and the varifocal lens 71 and is then incident on the polarization beam splitter 83. At this time, since the reflected light passes through the ¼ wavelength plate two times, so that the polarization direction of the light can be converted. Therefore, the reflected light, which is incident on the polarization beam splitter 83, is reflected on the polarization plane of the polarization beam splitter 83 and then incident on the light-receptive surface of the light receiving unit 88. Subsequently, an optical output detected by the light receiving unit 88 is output to the arithmetic circuit 89.

Subsequently, the arithmetic circuit 89 calculates a radio frequency (RF) signal, a tracking error (TE) signal, and a focus error (FF) signal on the basis of input signals from the light receiving unit 88, respectively. The RF signal is subjected to processing, such as analog-to-digital conversion and error correction, followed by being outputted as a recording/reproduction signal from the arithmetic circuit 89. The TE signal is output to the optical head driving unit 91 and/or the objective lens driving unit 90. In addition, the FE signal is output to the objective lens driving unit 90. Subsequently, the objective lens driving unit 90 performs focus servo and tracking servo in response to input signals.

As described above, the application of the varifocal lens 71 of the present embodiment using an electro-wetting phenomenon to any of various optical apparatuses such as an optical pick-up apparatus 80 leads to the advantageous effects as described below.

Since the varifocal lens 71 of the present embodiment is driven by AC voltage that varies within a positive voltage range at a predetermined cycle, the varifocal lens 71 can be driven within a wide variable voltage range. Therefore, the recording/reproducing apparatus 70 and the optical pick-up apparatus 80 of the present embodiment make it possible to control recording and reproduction at high precision and prevent or avoid the degradation of optical recording/reproducing characteristics.

Since the varifocal lens 71 of the present embodiment uses an electro-wetting phenomenon, the flow of current inherently does not occur except at the time of discharging. Thus, the power consumption of the varifocal lens 71 is very small. Furthermore, each of the recording/reproducing apparatus 70 and the optical pick-up apparatus 80 of the present embodiment has a longer product life than that of any of related-art apparatuses having motor-driven varifocal lenses because there is no necessity for mounting mechanically movable lens parts on the apparatuses of the present embodiment. Furthermore, the apparatus of the present embodiment can be reduced in size while being provided with an auto focusing mechanism with a simpler configuration because of no mechanically movable part such as a motor installed therein.

The related-art apparatus has a high drive voltage and is typically provided with a booster circuit in practice. In contrast, the apparatus of the present embodiment can reduce a drive voltage for attaining a desired change in focal distance because of using the varifocal lens 71 of the embodiment. For example, the drive voltage can be set to 10 V or less.

In a related-art optical recording/reproducing apparatus which is capable of recording/reproducing two kinds of an optical recording medium 95 (with compatibility) or a related-art optical recording/reproducing apparatus which performs recording/reproduction on a multi-layered recording medium, a two-group lens or the like is used and the relative positions of the lens are mechanically changed to control the focal distance thereof. In contrast, in the present embodiment, the focal lens of the aforementioned embodiment can be used in place of the two-group lens or the like. Therefore, the apparatus of the present embodiment does not use any booster circuit and any mechanically driving unit. The optical pick-up apparatus 80 and the optical recording/reproducing apparatus 70 which are manufactured in small size and with long service lives can be provided.

4. THIRD EMBODIMENT

The electro-wetting apparatus of the present embodiment is not limited to any of optical apparatuses having optical transmission functions, such as the aforementioned varifocal lens but also applicable to any of various apparatuses using a geometric change in conductive liquid. In this embodiment, as an example of such an application of the electro-wetting apparatus of the present embodiment, a droplet operating apparatus using such an electro-wetting apparatus of the aforementioned embodiment will be described.

Nowadays, the development of microfluid systems for processing continuous micro-sized fluid flows has been advanced. Particularly, there is a necessity for developing a microfluid device that realizes a sensor or an analyzer called as a "chemistry-on-a-chip". These microfluid systems have been also known as "Labs-On-a-Chips" (LoCs) and micro-total analysis systems (μ-TASs). A chip-type device which is automated using such a microfluid system can be operated at high speed and excellent in portability. In addition, an inexpensive chemical (or biochemical) labware with high reliability can be provided. Furthermore, the microfluid systems can be applicable to various fields including medical diagnoses, environmental monitoring, basic science researches, and so on. Furthermore, micromixer devices, such as those using vibration by piezoelectric elements or the like and using electrophoresis, have been proposed. Alternatively, the use of an electro-wetting phenomenon will allow such devices to control the movement of fine droplets with high precision.

[Configuration of Droplet Operating Apparatus]

FIG. 15 is diagram illustrating an exemplary configuration of a droplet operating apparatus that realizes the above microfluid device. In other words, FIG. 15 illustrates only a schematic cross-sectional diagram of the main part of the droplet operating apparatus.

The droplet operating apparatus 100 includes a first substrate 101 made of an insulating material and an electrode array 103 constructed of a plurality of electrodes 103a, 103b, 103c, ..., 103i, and so on (first electrodes) arranged on the substrate 101. Each electrode is made of an anodizable valve metal, such as aluminum, tantalum, niobium, hafnium, or titanium. In addition, the droplet operating apparatus 100 includes a plurality of dielectric layers (anodized films) 104a, 104b, 104c, ..., 104i, and so on, which are made of metallic oxides obtained by anodization of the respective electrodes 103a, 103b, 103c, ..., 103i, and so on. Furthermore, the droplet operating apparatus 100 includes a water-repellent film (liquid-repellent film) 15 laminated on the substrate 101 so as to cover the dielectric layers 104a, 104b, 104c, ..., 104i, and so on.

In addition, the droplet operating apparatus 100 includes a second substrate 102 made of an insulating material, a common electrode 109 (second electrode) formed on the substrate 102, and a conductive water-repellent film 108 formed on the common electrode 109.

In the present embodiment, just as in the case of the aforementioned varifocal lens, it is preferable that the water-repellent film 105 facing the electrode array 104 may have a sufficiently small film thickness, for example about 5 nm but not more than 10 nm. In addition, the conductive water-repellent film 108 formed on the common electrode 109 may have a sufficiently small film thickness, for example about 5 nm but not more than 10 nm just as in the case of the water-repellent film 10 to make the layer 108 conductive. Furthermore, to make the water-repellent films 105 and 108 thinner, the materials of these layers 105 and 108 may be preferably prepared using a reactive water-repellent coating material such as a fluorine-based silane coupling agent.

In the droplet operating apparatus 100, the substrates 101 and 102 are arranged such that the surface of the substrate 101 near the electrode array 103 and the surface of the substrate 102 near the common electrode 109 face to each other. A liquid droplet 106 having conductivity or polarity is arranged between the substrates 101 and 102 so that it can touch the water-repellent film 105 on the substrate 101 and the water-repellent film 108 on the substrate 102.

The liquid droplet 106 may be, for example, an electrolyte solution, such as a salt solution, an aqueous sodium sulfate ($Na_2SO_4$) solution, or an ionic liquid. A space around the liquid droplet 106 may be filled with an insulating liquid 107 such as silicon oil. Alternatively, the space around the liquid droplet 106 may be filled with gas, such as air.

Furthermore, a voltage-applying unit 20 and a voltage control unit 110 are connected between the respective electrodes 103a, 103b, 103c, ..., 103i, and so on of the electrode array 103 and the common electrode 109 on the substrate 102.

Furthermore, the voltage-applying unit 20 is connected to the main-body driving unit 21 in the droplet operating apparatus 100.

In addition, the voltage-applying unit 20 and the main-body driving unit 21 may have the same configurations as those of the first embodiment (see FIG. 8), respectively. In other words, in the present embodiment, the droplet operating apparatus 100 is driven by AC voltage (for example, a signal shown in FIG. 3 or FIG. 4) that varies within a positive voltage range at a predetermined cycle.

In addition, in the present embodiment, switches Sa, Sb, Sc, . . . Si, and so on are arranged between the voltage control unit 110 and the respective electrodes 103a, 103b, 103c, . . . , 103i, and so on. In addition, the switches Sa, Sb, Sc, . . . Si, and so on may be controlled by the voltage control unit 110 or may be incorporated in the voltage control unit 110. Furthermore, the arrow "a" in FIG. 15 represents the direction along which the liquid droplet 106 moves.

Here, the droplet operating apparatus 100 in which the electrode array 103 is arranged in one direction will be described as an example of the present embodiment. Thus, as shown in FIG. 16B (a top view of the droplet operating apparatus 100) which will be described later, the droplet operating apparatus 100 of the present embodiment includes cells (Ca, Cb, and so on in FIG. 16B) constructed of the respective electrodes and the respective dielectric layers and arranged in one direction. Here, the present embodiment is not limited to such an arrangement. Alternatively, the electrode array 103 (cells) may be arranged in two dimension.

[Operation of Droplet Operating Apparatus]

Next, an exemplary operation of the droplet operating apparatus 100 of the present embodiment will be described with reference to FIGS. 16 to 18. Here, in the following description about the operation, for example, a state in which one liquid droplet 106 is present almost above the electrode 103b as shown in FIG. 16A will e described first.

First, for example, the switch Sb is turned on to apply a predetermined voltage between the electrode 103b and the common electrode 109. Here, the common electrode 109 may be earth potential. In FIG. 16A and FIG. 16B, the state of the liquid droplet 106 under such conditions are illustrated.

Figure 16A:
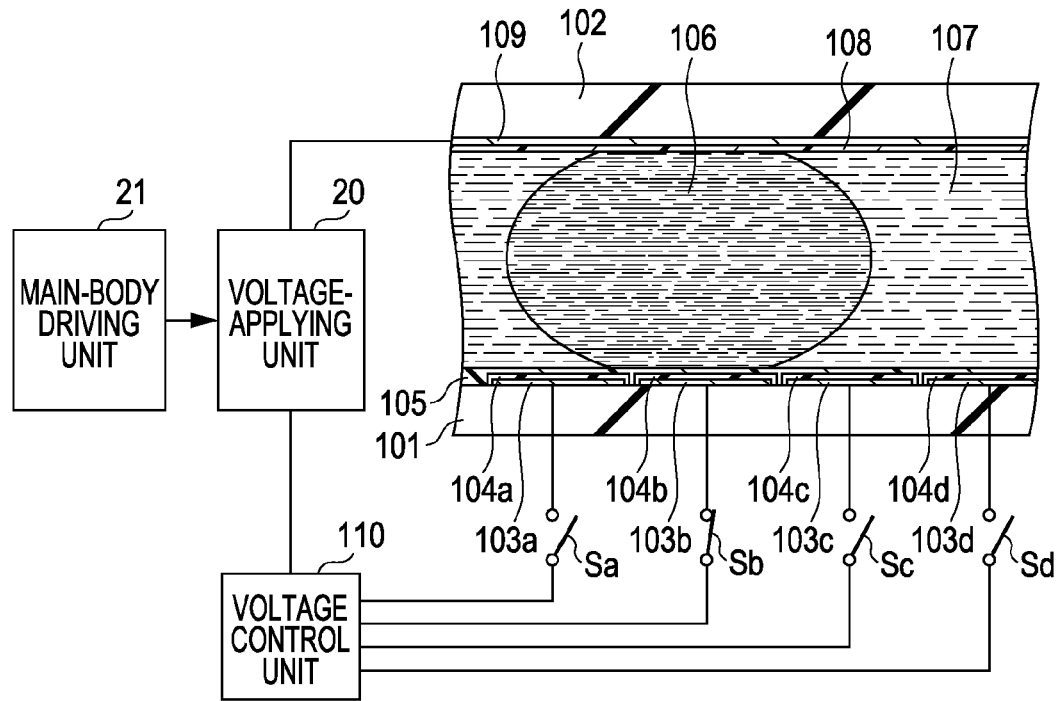
FIG. 16A is a cross-sectional view of the drop operating apparatus and FIG. 16B is a schematic top view of the drop operating apparatus.
Figure 16B:
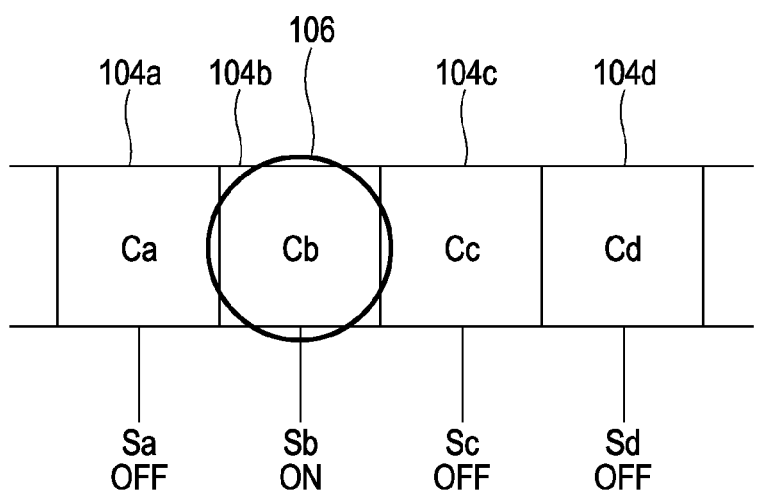

Here, FIG. 16A is a schematic cross-sectional view of the droplet operating apparatus 100 when the switch Sb is turned on. FIG. 16B is a schematic top view of the droplet operating apparatus 100 when the switch Sb is turned on. In FIG. 16B, a region surrounded by the solid line represents the liquid droplet 106 and also illustrates a contact area between the liquid droplet 106 and the water-repellent film 105.

When the switch Sb is turned on, the liquid droplet 106 is drawn onto the dielectric layer 104b (electrode 103b) by an electro-wetting phenomenon. In this case, therefore, as shown in FIG. 16A and FIG. 16B, the liquid droplet 106 is placed on the dielectric layer 104b (electrode 103b), or on the cell Cb. Here, in this embodiment, each of the cells Ca, Cb, Cc, Cd, and so on is formed in a square shape. However, the present embodiment is not limited to such a shape. Alternatively, it may be formed in an arbitrary shape. In addition, the size of each cell may be several millimeters or less per side.

Figure 17A:
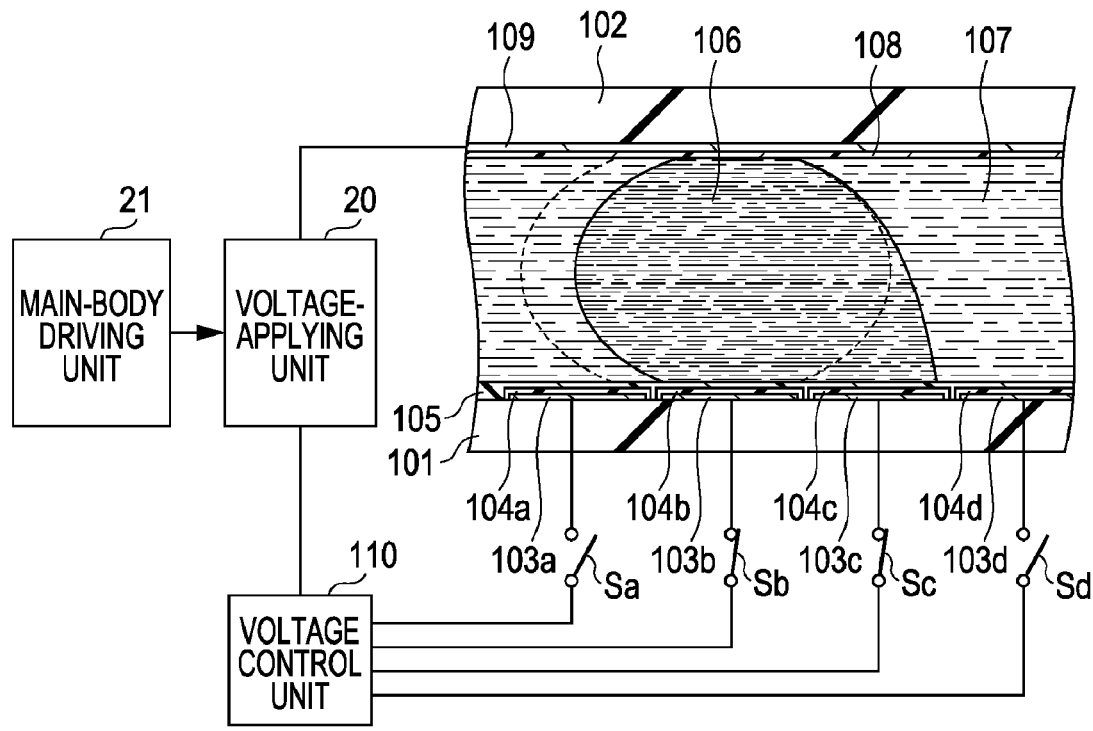
FIG. 17A is a cross-sectional view of the drop operating apparatus and FIG. 17B is a schematic top view of the drop operating apparatus.
Figure 17B:
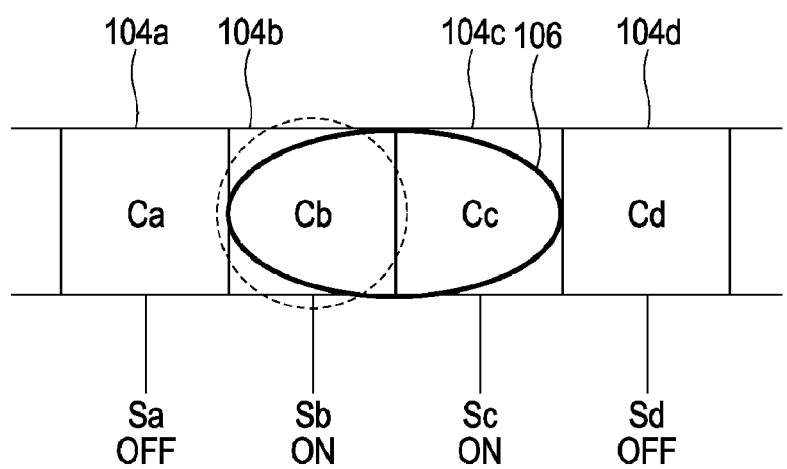

Subsequently, the switch Sc is also turned on in addition to turn the switch Sb on to apply a predetermined voltage to the electrode 103c which is adjacent to the electrode 103b. The state of the liquid droplet 106 under such conditions is illustrated in FIG. 17A and FIG. 17B. Here, FIG. 17A is a schematic cross-sectional view of the droplet operating apparatus 100 when the switches Sb and Sc are turned on. FIG. 17B is a schematic top view of the droplet operating apparatus 100 when the switch Sb is turned on. In FIG. 17B, a region surrounded by the solid line represents the liquid droplet 106 and also illustrates a contact area between the liquid droplet 106 and the water-repellent film 105 in such an operation state. In addition, a region surrounded by the broken line illustrates the contact area between the liquid droplet 106 and the water-repellent film 105 in the operation state shown in FIG. 16.

When the switches Sb and Sc are turned off, the liquid droplet 106 is drawn to the electrodes (in this case, the electrodes 103b and 103c) on which voltage is applied by an electro-wetting phenomenon and the contact area between the water-repellent film 105 near the electrode array 103 and the liquid droplet 106 can be extended. As a result, as shown in FIG. 17A and FIG. 17B, the droplet 106 is deformed so that the contact region between the liquid droplet 106 and the water-repellent film 105 extends not only over the electrode 103b but also over the electrode 103c. In other words, the droplet 106 is deformed so that the contact region extends not only over the cell Cb but also over the cell Cc.

Figure 18A:
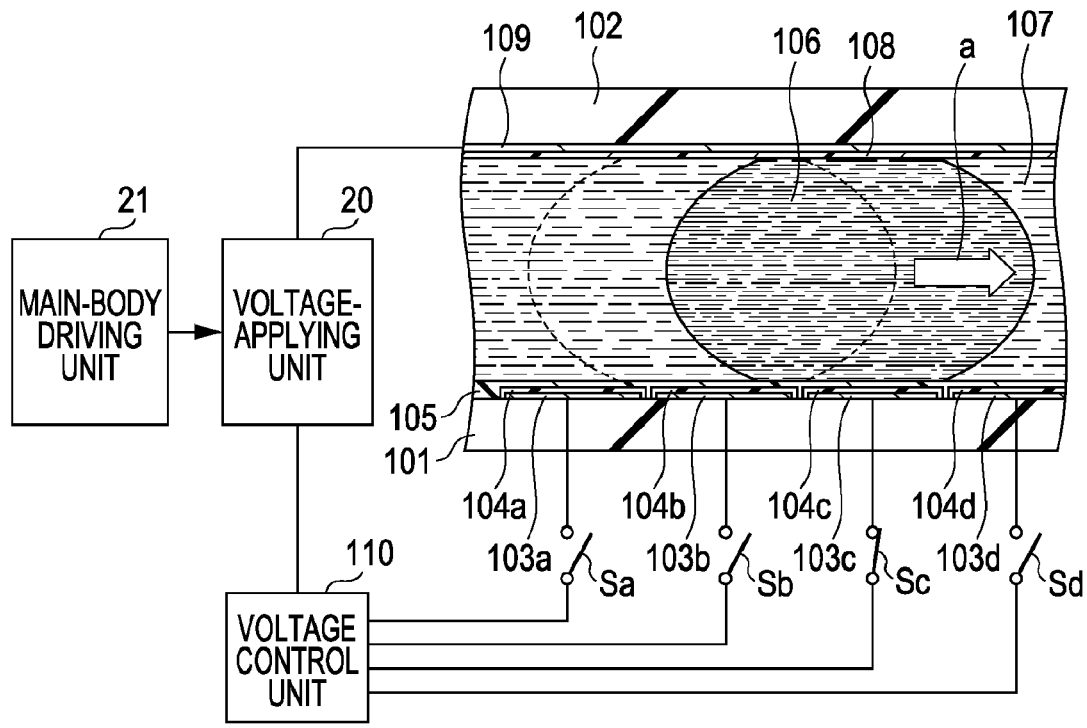
FIG. 18A is a cross-sectional view of the drop operating apparatus and FIG. 18B is a schematic top view of the drop operating apparatus.
Figure 18B:
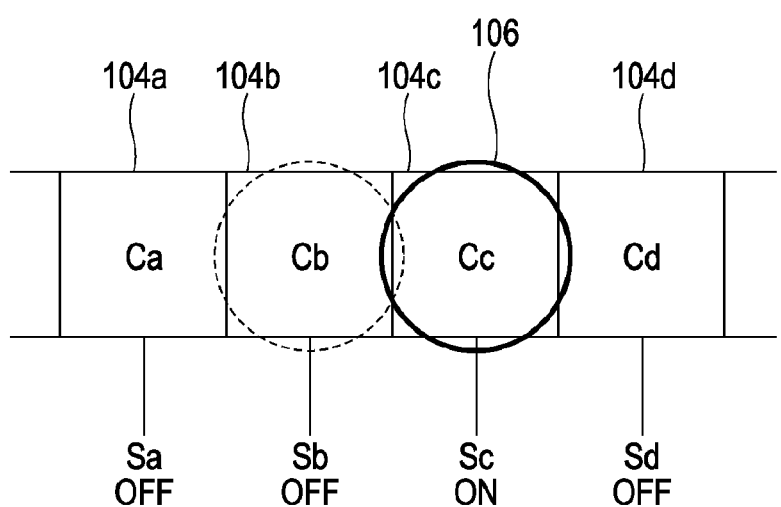

Subsequently, the voltage of the electrode 103b is lowered. For example, the switch Sb is turned off to place the electrode 103b at a voltage of zero (0). The state of the liquid droplet 106 under such conditions is illustrated in FIG. 18A and FIG. 18B. Here, FIG. 18A is a schematic cross-sectional view of the droplet operating apparatus 100 when the switch Sb is turned off. FIG. 18B is a schematic top view of the droplet operating apparatus 100 when the switch Sb is turned on. In FIG. 18B, a region surrounded by the solid line represents the liquid droplet 106 and also illustrates a contact area between the liquid droplet 106 and the water-repellent film 105 in such an operation state. In addition, a region surrounded by the broken line illustrates the contact area between the liquid droplet 106 and the water-repellent film 105 in the operation state shown in FIG. 16.

If the switch Sb is turned off, the electro-wetting phenomenon caused on the liquid droplet 106 on the electrode 103b (cell Cb) is lowered. As a result, as indicated by the solid lines in FIG. 18A and FIG. 18B, the liquid droplet 106 moves onto the electrode 103c (cell Cc) on which voltage is being applied.

In this embodiment, the liquid droplet 106 can be moved by sequentially changing a voltage to be applied to each of the electrodes 103a, 103b, 103c, . . . , 103i, and so on of the electrode array 103 by the voltage control unit 110 as described above. Here, in order to move the liquid droplet 106 smoothly from one electrode to the adjacent electrode by sequential application of voltage, the liquid 106 is in stable condition while part of the bottom of the liquid droplet 106 is in contact with the adjacent electrode. In other words, the width of the bottom of the liquid droplet 106 in the direction along which the liquid droplet 106 moves (the direction along the arrow "a" in FIG. 15) is larger than the length of each electrode of the electrode array 103 in such a moving direction. Therefore, in consideration of such a circumstance, the droplet operating apparatus 100 can suitably define the volume of the liquid droplet 106, the distance between the substrates 101 and 102, the length of each electrode of the electrode array 103 in the moving direction, respectively.

As described above, the droplet operating apparatus 100 in which the electro-wetting apparatus of the aforementioned embodiment is employed will exert the advantageous effects described below.

The droplet operating apparatus 100 of the present embodiment is driven by AC voltage from the voltage-applying unit 20, where the voltage varies within a positive voltage range at a predetermined cycle. Thus, the variable range of voltage applied to the droplet operating apparatus 100 is not restricted by the negative withstand voltage (reverse polarity) of the dielectric layer formed on the electrode, so that the drop operating device 100 can be driven within a wide variable voltage range.

In this embodiment, the dielectric layer on the electrode is formed by anodizing the electrode. Therefore, just as in the case of the varifocal lens of the aforementioned embodiment, the droplet operating apparatus 100 can be manufactured by a simplified method. In addition, the dielectric layer can be formed thinner than one obtained by a method of forming a thin film under vacuum. In addition, the film thickness of the dielectric layer can be further reduced and a material with higher dielectric constant can be easily used. Therefore, a drive voltage for obtaining a desired change in shape of a liquid droplet (conductive liquid), or a drive voltage for moving a liquid droplet can be remarkably lowered more than before.

In this embodiment, the dielectric layer with a uniform film thickness can be formed with a degree of precision that has not been achieved to date. Thus, variation in deformation of a liquid droplet due to variation in film thickness can be prevented. Therefore, it becomes possible to control the movement of a liquid droplet with high precision. In the present embodiment, furthermore, even if there are a small number of pinhole defects in the electrode, dielectric breakdown does not occur as long as the substrate 101 is made of an insulating material. Such pinhole defects will be no problem. In addition, if the dielectric layer is formed by anodization in a manner similar to that of the present embodiment, the dielectric layer does not cause dielectric breakdown until being held at the formation voltage. Thus, the dielectric breakdown strength of the resulting dielectric layer can be increased sufficiently.

5. FOURTH EMBODIMENT

The electro-wetting apparatus of the present embodiment is applicable to various kinds of optical pick-up apparatus and optical recording/reproducing apparatuses as described above and also to various kinds of optical apparatuses, such as a cellular phone with a camera function and a miniature camera. In addition, when the electro-wetting apparatus of the present embodiment is applied to an imaging apparatus, for example, it is applicable to an optical device with an aperture or shutter function in addition to the aforementioned varifocal lens. In this embodiment, an example in which the present embodiment is applied to such an application will be described.

[Configuration of Optical Device]

FIGS. 19A to 19C are diagrams illustrating the exemplary configuration of an optical device having an aperture or shutter function where the electro-wetting apparatus of the present invention is applied and the exemplary operation thereof.

The optical device 130 includes a cylindrical container 120 made of an insulating material or the like and having opposite open ends 120A and 120B, a second optically transparent member 128 formed on the open end 120A, and a first optically transparent member 129 formed on the open end 120B. In addition, the second optically transparent member 128 and the first optically transparent member 129 are liquid-tightly placed on the opposite open ends 120A and 120B, respectively.

Furthermore, both a first liquid 121 with conductivity or polarity and a second liquid 122 with insulation properties are placed in the container 120, mainly the inner space defined by the second optically transparent member 128 and the first optically transparent member 129. The first liquid 121 may be, for example, an electrolyte solution, such as a salt solution, an aqueous sodium sulfate ($Na_2SO_4$) solution, or an ionic liquid. On the other hand, for example, the second liquid 122 may be silicone oil.

However, one of the first liquid 121 and the second liquid 122 may be a liquid having lower optical transparency than that of the other. In the present embodiment, for example, the optical transmittance of the second liquid 122 is lower than that of the first liquid 121. In other words, an example in which the optical absorbance or optical reflectance of the second liquid 122 at a wavelength range of incident light Li is higher than those of the first liquid 121 will be described. For example, it may be realized by mixing the second liquid 122 with a predetermined colorant.

In the present embodiment, the first electrode 125 is formed on an area that extends over the inner wall surface, the second open end 120B, and the outer wall surface of the container 120. In addition, the first electrode 125 may be made of an anodizable valve metal, such as aluminum, tantalum, niobium, hafnium, or titanium. In this case, furthermore, the first electrode 125 is formed such that the end of the first electrode 125 facing the open end 120A of the container 120 can be separately placed from the open end 120A.

Here, the first electrode 125 is formed on the inner wall surface of the container 120. In other words, the dielectric layer (anodized film) 124 is formed on the surface of the electrode portion of the first electrode 125. The water-repellent film 123 (liquid-repellent film) is laminated on the liquid's side surface of the first optically transparent member 129 and the dielectric layer 124 formed on the inner wall surface of the container 120. In the present embodiment, just as in the case of the aforementioned varifocal lens, it is preferable that the water-repellent film 123 may have a sufficiently small film thickness, for example about 5 nm but not more than 10 nm. Furthermore, the water-repellent film 123 may be preferably prepared using a reactive water-repellent coating material such as a fluorine-based silane coupling agent.

On the other hand, in the present embodiment, for example, a second electrode 127 in ring shape or the like is formed on the outer peripheral portion of the second optically transparent member 128 facing to the second open end 120A of the container 120. For example, it may be provided with a ring-shaped second electrode 127. In other words, the second electrode 127 is arranged between the second optically transparent member 128 and the second open end 120A of the container 120. For example, the second electrode 127 is formed such that it extends over the outer peripheral end of the second optically transparent member 128 and the near-periphery part of the side wall thereof on the liquid's side. However, when the second electrode 127 is made of an optically transparent conductive material, the shape of the second electrode 127 may not be a ring but a disk to allow the second electrode 127 to extend over the whole surface of the second optically transparent member 128 on the liquid's side.

In this embodiment, furthermore, the second electrode 127 and the second optically transparent member 128 on the liquid's side are covered and attached with a hydrophilic film 126, a so-called hydrophilic coat. Furthermore, when the second optically transparent member 128 is made of glass and the surface thereof on the liquid's side is cleaned to retain its hydrophobicity, the hydrophilic film 126 may not be formed thereon.

Furthermore, the first electrode 125 exposed to the external side wall surface of the container 120 and the second electrode 127 formed around the outer periphery of the second optically transparent member 128 are connected to the voltage-applying unit 20. In addition, the voltage-applying unit 20 is connected to the main-body driving unit 21 installed in an optical apparatus such as an imaging apparatus provided with an optical element 130. In addition, the voltage-applying unit 20 and the main-body driving unit 21 may have the same configurations as those of the first embodiment (see FIG. 8), respectively. Thus, the optical device 130 is driven by AC voltage (for example, a voltage signal shown in FIG. 3 or FIG. 4) that varies within a positive voltage range at a predetermined cycle. Furthermore, the main-body driving unit 21 may be installed in the optical device 130.

[Operation of Optical Device]

First, for example, consideration is given to a case where an applied voltage is low (for example, V=0) and there is a large contact angle θ(V0) of the first liquid 121 to the water-repellent film 123 on the inner wall surface of the container 120. In this case, for example, the interface between the first liquid 121 and the second liquid 122 is considered to be in a state shown in FIG. 19A. In addition, in the example shown in FIG. 19A, the volume of the second liquid with low optical transmittance is considered to be lower than that of the first liquid 121 and the liquid's side surface of the first optically transparent member 129 on the light incident side is in contact with the first liquid 121. In this case, the contact region serves as an opening widow 131 through which light passes. Furthermore, in the state shown in FIG. 19A, it is also considered that a large quantity of the incident light Li passes through the optical element 130. In other words, consideration is given to a case where the difference between the light quantity of the incident light Li and the light quantity of the output light LO1 is small.

If a predetermined voltage V1 is applied the volte-applying unit 20 to the optical device 130 in such a state, the first liquid 121 tends to extend over the water-repellent film 123 on the inner wall surface of the container 120 by an electro-wetting phenomenon. Subsequently, the second liquid 121 is pushed toward the first optically transparent member 129 (on the light incident side). As a result, as shown in FIG. 19B, the contact angle θ(V1) of the first liquid 121 becomes smaller than the contact angle θ(V0). Thus, the contact region between the first liquid 121 and the surface of the first optically transparent member 129 on the liquid's side surface, or the inner diameter of the opening window 131, becomes small. In this case, the quantity of the incident light Li passing through the optical element 130 decreases. Thus, the light quantity is limited. In other words, the light quantity of the output light LO2 from the optical element 130 in a state shown in FIG. 19A becomes smaller than the light quantity of the output light LO1.

Furthermore, when a higher voltage is applied, the first liquid 121 pushes the second liquid 122 toward the first optically transparent member 129 (on the light incident side) and the contact angle θ(V2) of the first liquid 121 becomes still smaller. As a result, as shown in FIG. 19C, the second liquid 122 extends and locates between the first liquid 121 and the first optically transparent member 129. The profile of the interface between the first liquid 121 and the second liquid 122 becomes part of a spherical surface formed in the container 120. In such a state, the opening window 131 is closed and the incident Li is then prevented from passing through the optical device 130. In other words, such a state becomes a state of closing a shutter.

When the optical element 130 is used as an optical element having a shutter function, the applied voltage is controlled as described above to close or open the opening window 131. In the present embodiment, as described above, the applied voltage is controlled to adjust the inner diameter (opening diameter) of the opening window 131, so that the optical element 130 configured as shown in FIG. 19 can be also used as one having an aperture function.

As described above, the optical element 130 where the electro-wetting apparatus of the aforementioned embodiment is applied will exert the advantageous effects as described below.

The optical device 130 of the present embodiment is driven by AC voltage from the voltage-applying unit 20, where the voltage varies within a positive voltage range at a predetermined cycle. Thus, the variable range of voltage applied to the optical device 130 is not restricted by the negative withstand voltage (reverse polarity) of the dielectric layer 124 formed on the electrode. Thus, the optical device 130 can be driven within a wide variable voltage range.

In the present embodiment, furthermore, the first liquid 121 is deformed while principally retaining a rotationally-symmetrical shape. It becomes possible to provide the optical device 130 with an aperture or shutter function while the opening shape thereof is an almost perfect circle. Like the usual aperture or shutter, the opening shape may not be formed into a perfect circle when a plurality of pinnate members of the aperture or shutter is moved to change the opening diameter, the opening shape is hardy formed into a perfect circle but a polygonal shape (for example, a hexagonal shape). For example, when image shooting or the like is performed in a so-called soft focus state in which the focus of the lens is intentionally shifted, this opening shape will be reflected on an image. However, the use of the optical device of the present embodiment can realize a soft focus state in which the opening shape can be extremely close to a perfect circle.

In this embodiment, just as in the case of the aforementioned varifocal lens, a metal oxide formed by anodizing the first electrode 125 is used as a dielectric layer 124 to be placed between the first electrode 125 and the first liquid 121. Thus, the following advantageous effects will be obtained.

In addition, the dielectric layer 124 can be formed thinner than one obtained by a method of forming a thin film under vacuum. Thus, it facilitates the use of a material with higher dielectric constant, so that a drive voltage for changing the profile of the interface between the first liquid 121 and the second liquid 122 to a desired shape can be extensively reduced.

Furthermore, in the present invention, the dielectric layer 124 can be formed by a more simple manufacturing method, compared with one which has been used in the past. Thus, the dielectric layer with a uniform film thickness can be formed with higher precision than before. Thus, variation in deformation of the interface profile due to variation in film thickness of the dielectric layer 124 can be prevented. Therefore, it becomes possible to control the aperture or shutter mechanism with high precision. Furthermore, even if there are a small number of pinhole defects in the electrode, dielectric breakdown does not occur as long as the substrate or the container 120 is made of an insulating material. Such a defect will be no problem. In addition, the dielectric layer 124 formed by anodization does not cause dielectric breakdown until being held at the formation voltage. Thus, the dielectric breakdown strength of the resulting dielectric layer 124 can be increased sufficiently.

6. FIFTH EMBODIMENT

Next, an exemplary configuration of a zoom lens using a lens having the same configuration as that of the varifocal lens of the first embodiment will be described.

[Configuration of Zoom Lens]

FIG. 20 is a schematic cross-sectional diagram illustrating an example of the configuration of a zoom lens according to an embodiment of the invention. The zoom lens 135 includes two varifocal lenses 140 and 160. Each of these varifocal lenses 140 and 160 has the same configuration as that of one described in the first embodiment, for example one of those illustrated in FIG. 7, FIGS. 9 to 11, and FIG. 13.

The varifocal lens 140 (first varifocal lens section) includes a lens main body 140a and a voltage-applying unit 20. The lens main body 140a is formed such that a second optically transparent member 148 and a first optically transparent member 149, which are made of glass or the like, are liquid-tightly placed on the opposite open ends 150A and 150B of a container 150 in cylindrical shape or the like, respectively. Furthermore, a first liquid 141 with conductivity or polarity and a second liquid body 142 with insulation properties are held in the lens main body 140a.

The first liquid 141 may be, for example, an electrolyte solution, such as a salt solution, an aqueous sodium sulfate ($Na_2SO_4$) solution, or an ionic liquid. On the other hand, for example, the second liquid 142 may be silicone oil. In this embodiment, the materials of the respective liquids are selected so that the refractive index of the first liquid 141 will be lower than that of the second liquid 142.

In the present embodiment, the first electrode 145 is formed while extending over the inner wall surface, the open end 150B, and the outer wall surface of the container 150. In addition, the first electrode 145 may be made of an anodizable valve metal, such as aluminum, tantalum, niobium, hafnium, or titanium. In this case, the end of the first electrode 145 facing the open end 150A of the container 150 is separately placed from the open end 12A. The surface of an electrode region, where the first electrode 145 is formed on the inner wall surface of the container 150, is anodized to form a dielectric layer (first conductive layer) 144 made of a metal oxide.

The dielectric layer 144 formed on the inner wall surface of the container 150 and the liquid's side surface of the first optically transparent member 149 are coated with a water-repellent film (first liquid-repellent film) 143. In the present embodiment, just as in the case of the varifocal lens of the first embodiment, it is preferable that the water-repellent film 143 may have a sufficiently small film thickness, for example about 5 nm but not more than 10 nm. Furthermore, to make the water-repellent film 143 thinner, the material thereof may be preferably prepared using a reactive water-repellent coating material such as a fluorine-based silane coupling agent.

On the other hand, a second electrode 147 in ring shape or the like is formed on the inner surface of the second optically transparent member 148 facing the open end 150A of the container 150. In other words, the second electrode 147 is arranged between the second optically transparent member 148 and the open end 150A of the container 150. For example, the second electrode 147 is formed such that it extends over the outer peripheral end of the second optically transparent member 148 and the near-periphery part of the side wall thereof on the liquid's side. However, when the second electrode 147 is made of an optically transparent conductive material, the shape of the second electrode 147 may not be a ring but a disk to allow the second electrode 147 to extend over the whole surface of the second optically transparent member 148 on the liquid's side.

In this embodiment, furthermore, the second electrode 147 and the second optically transparent member 148 on the liquid's side are covered and attached with a hydrophilic film 146, a so-called hydrophilic coat. Furthermore, when the second optically transparent member 148 is made of glass and the surface thereof on the liquid's side is cleaned to retain its hydrophobicity, the hydrophilic film 146 may not be formed thereon.

Furthermore, the voltage-applying unit 20 (first voltage-applying unit) is connected to the first electrode 145 formed on the external side wall surface of the container 150 and the second electrode 147 formed around the outer periphery of the second optically transparent member 148. In addition, the voltage-applying unit 20 is connected to the main-body driving unit 21 installed in an optical apparatus such as an imaging apparatus provided with a zoom lens 135. In addition, the voltage-applying unit 20 and the main-body driving unit 21 may have the same configurations as those of the first embodiment (see FIG. 8), respectively. In other words, the varifocal lens 140 is driven by AC voltage (for example, a voltage signal shown in FIG. 3 or FIG. 4) that varies within a positive voltage range at a predetermined cycle. Here, the main-body driving unit 21 may be installed in the varifocal lens 140.

Another varifocal lens 160 (second varifocal lens section) includes a lens main body 160a and a voltage-applying unit 20. The lens main body 160a is formed such that a fourth optically transparent member 168 and a third optically transparent member 169, which are made of glass or the like, are liquid-tightly placed on the opposite open ends of a container 170 in cylindrical shape or the like, respectively. Furthermore, a third liquid 161 with conductivity or polarity and a fourth liquid body 162 with insulation properties are held in the lens main body 160a.

The third liquid 161 may be, for example, an electrolyte solution, such as a salt solution, an aqueous sodium sulfate ($Na_2SO_4$) solution, or an ionic liquid. On the other hand, for example, the fourth liquid 162 may be silicone oil. In this embodiment, the materials of the respective liquids are selected so that the refractive index of the third liquid 161 will be lower than that of the fourth liquid 162.

In the present embodiment, the third electrode 165 is formed while extending over the inner wall surface, the open end 170B, and the outer wall surface of the container 170. In addition, the third electrode 165 may be made of an anodizable valve metal, such as aluminum, tantalum, niobium, hafnium, or titanium. In this case, the end of the third electrode 165 facing the open end 170A of the container 170 is separately placed from the open end 170A. The surface of an electrode region, where the third electrode 165 is formed on the inner wall surface of the container 170, is anodized to form a dielectric layer (second inductive layer) 164 made of a metal oxide.

The dielectric layer 164 formed on the inner wall surface of the container 170 and the liquid's side surface of the third optically transparent member 169 are coated with a water-repellent film (second liquid-repellent film) 163. In the present embodiment, just as in the case of the varifocal lens of the first embodiment, it is preferable that the water-repellent film 163 may have a sufficiently small film thickness, for example about 5 nm but not more than 10 nm. Furthermore, to make the water-repellent film 163 thinner, the material thereof may be preferably prepared using a reactive water-repellent coating material such as a fluorine-based silane coupling agent.

On the other hand, a fourth electrode 167 in ring shape or the like is formed on the inner surface of the fourth optically transparent member 168 facing the open end 170A of the container 170. In other words, the fourth electrode 167 is arranged between the fourth optically transparent member 168 and the open end 170A of the container 170. For example, the fourth electrode 167 is formed such that it extends over the outer peripheral end of the fourth optically transparent member 168 and the near-periphery part of the side wall thereof on the liquid's side. However, when the fourth electrode 167 is made of an optically transparent conductive material, the shape of the fourth electrode 167 may not be a ring but a disk to allow the fourth electrode 167 to extend over the whole surface of the fourth optically transparent member 168 on the liquid's side.

In this embodiment, furthermore, the fourth electrode 167 and the fourth optically transparent member 168 on the liquid's side are covered and attached with a hydrophilic film 166, a so-called hydrophilic coat. Furthermore, when the fourth optically transparent member 168 is made of glass and the surface thereof on the liquid's side is cleaned to retain its hydrophobicity, the hydrophilic film 166 may not be formed thereon. Furthermore, in the present invention, the varifocal lens 140 and the varifocal lens 160 are arranged so that the second optically transparent member 148 of the varifocal lens 140 and the fourth optically transparent member 168 of the varifocal lens 160 can be opposite to each other.

Furthermore, the voltage-applying unit 23 (second voltage-applying unit) is connected to the third electrode 165 formed on the external side wall surface of the container 170 and the fourth electrode 167 formed around the outer periphery of the fourth optically transparent member 168. In addition, the voltage-applying unit 23 is connected to the main-body driving unit 24 installed in an optical apparatus such as an imaging apparatus provided with the zoom lens 135 of the present embodiment. In addition, the voltage-applying unit 23 and the main-body driving unit 24 may have the same configurations as those of the first embodiment (see FIG. 8), respectively. In other words, the varifocal lens 160 is driven by AC voltage (for example, a voltage signal shown in FIG. 3 or FIG. 4) that varies within a positive voltage range at a predetermined cycle. Here, the main-body driving unit 24 may be installed in the varifocal lens 160.

As described above, the zoom lens 135 of the present embodiment includes two varifocal lenses 140 and 160. Therefore, the zoom lens 135 includes two interfaces between the conductive liquid (first and third liquid) and the insulating liquid (second and fourth liquids).

[Operation of Zoom Lens]

First, as shown in FIG. 20, consideration is given to a case where the first liquid 141 of the varifocal lens 140 is in a convex form and the third liquid 161 of the varifocal lens 160 is in a hollow shape. For example, such a state can be produced by setting voltage V11 applied to the varifocal lens 140 to a comparatively lower level (for example, V11=0) and setting voltage V21 applied to the varifocal lens 160 to a comparatively higher level (V21>V11).

In this state, the degree of an electro-wetting phenomenon generated on the water-repellent film 143 of the container 150 of the varifocal lens 140 is comparatively low. Thus, the contact angle θ (V11) of the first liquid 141 to the water-repellent film 143 in the varifocal lens 140 becomes comparatively large. On the other hand, in the varifocal lens 160, an electro-wetting phenomenon generated on the water-repellent film 163 of the container 170 becomes comparatively strong. Therefore, the wettability of the third liquid 161 to the water-repellent film 163 by the electro-wetting phenomenon can be increased. Thus, the contact angle θ (V21) of the third liquid 161 to the water-repellent film 163 becomes comparatively small.

In such a state, light Li is incident on the varifocal lens 140 from the first optically transparent member 149 of the varifocal lens 140. As the varifocal lens 140 is a concave lens, a bundle of incident light rays is widened and then output from the lens. The light which has passed through the varifocal lens 140 is then incident on the varifocal lens 160 while widening the bundle of light rays. As the varifocal lens 160 is a convex lens, for example, the incident light is output as a widened bundle of rays in parallel. Subsequently, the light output from the varifocal lens 160 is concentrated by an optical lens 136 to form an image on an imaging surface 137.

Next, voltages applied to the respective varifocal lenses 140 and 160 are changed to deform the profile of the interface between the conductive liquid and the insulating liquid in each varifocal lens. Specifically, for example, a voltage V12 applied to the varifocal lens 140 is set to a comparatively high level, while a voltage V22 applied to the varifocal lens 160 is set to a comparatively low level (for example, V22=0). Here, the profile of the interface between the conductive liquid and the insulating liquid in each varifocal lens is illustrated in FIG. 21. Here, the structural components of the zoom lens shown in FIG. 21 are represented by the same reference numerals as those of the structural components of the zoom lens shown in FIG. 20.

In this case, the degree of an electro-wetting phenomenon generated on the water-repellent film 143 of the container 150 of the varifocal lens 140 is comparatively high. The electro-wetting phenomenon causes an increase in wettability of the first liquid 141 to the water-repellent film 143. Thus, the contact angle θ (12) of the first liquid 141 to the water-repellent film 143 becomes comparatively small. On the other hand, in the varifocal lens 160, the degree of an electro-wetting phenomenon generated on the water-repellent film 163 of the container 170 is comparatively low. Thus, the contact angle θ (V22) of the third liquid 161 to the water-repellent film 163 becomes comparatively large. As a result, in the state of FIG. 21, the first liquid 141 of the varifocal lens 140 is in a concave shape, while the third liquid 161 of the varifocal lens 160 is in a convex shape.

In such a state, light Li is incident on the varifocal lens 140 from the first optically transparent member 149 of the varifocal lens 140. As the varifocal lens 140 is a convex lens, a bundle of incident light rays is converged and then output from the lens. The light which has passed through the varifocal lens 140 is then incident on the varifocal lens 160 while narrowing the bundle of light rays. As the varifocal lens 160 is a concave lens, for example, the incident light is output as a narrowed bundle of rays in parallel. Subsequently, the light output from the varifocal lens 160 is concentrated by an optical lens 136 to form an image on an imaging surface 137.

In the present embodiment, as described above, the voltages applied to the varifocal lenses 140 and 160 are controlled to adjust the focal distances of the lenses, respectively. Therefore, for example, the state shown in FIG. 20 may be designed as a wide-angle lens and the state shown in FIG. 21 may be designed as a telescopic lens. Namely, the magnification of the zoom lens 135 can be controlled by voltage control with sufficient accuracy.

As described above, the zoom lens 135 where the electro-wetting apparatus of the aforementioned embodiment is applied will exert the advantageous effects as described below.

Both the varifocal lens 140 and the varifocal lens 160 in the zoom lens 135 of the present embodiment is driven by AC voltages from the voltage-applying units 20 and 23, respectively. In each case, the voltage varies within a positive voltage range at a predetermined cycle. Thus, the variable range of voltage applied to each of the varifocal lenses 140 and 160 is not restricted by the negative withstand voltage of the dielectric layer formed on the electrode. Thus, each of the varifocal lenses 140 and 160 can be driven within a wide variable voltage range.

In this embodiment, just as in the case of the first to fourth embodiments as described above, a metal oxide formed by anodizing the electrode is used as a dielectric layer to be placed between the electrode and the conductive liquid. Thus, the following advantageous effects will be obtained. In addition, the dielectric layer can be formed thinner than one obtained by a method of forming a thin film under vacuum. In addition, the film thickness of the dielectric layer can be further reduced. Thus, it facilitates the use of a material with higher dielectric constant, so that a drive voltage for changing the profile of the interface between the conductive liquid and the insulating liquid to a desired shape can be extensively reduced.

Furthermore, in an embodiment, the dielectric layer can be formed by a more simple manufacturing method, compared with one which has been used in the past. Thus, the dielectric layer with a uniform film thickness can be formed with higher precision than before. Thus, variation in deformation of the interface profile due to variation in film thickness of the dielectric layer can be prevented and the zoom function of the zoom lens can be controlled with high precision. Furthermore, even if there are a small number of pinhole defects in the electrode, dielectric breakdown does not occur as long as the substrate or the container is made of an insulating material. Such a defect will be no problem. In addition, the dielectric layer formed by anodization does not cause dielectric breakdown until being held at the formation voltage. Thus, the dielectric breakdown strength of the resulting dielectric layer can be increased sufficiently.

Modified Example 6

Examples shown in FIGS. 20 and 21 are those illustrating a combination of the varifocal lenses of the aforementioned embodiment as a zoom lens 135. Alternatively, three or more varifocal lenses may combined together to provide three or more interfaces between the conductive liquid and the insulating liquid. Alternatively, two varifocal lens may be integrated together to form two interfaces in one container. In Modified Example 6, a zoom lens having two interfaces in one container will be described.

In the case of forming two interfaces between the conductive liquid and the insulating liquid in one container, for example, a conductive or polar liquid is arranged on each of the opposite open ends of a container in the shape of a cylinder, mortar bowl, or the like and an insulating liquid is placed between the liquids on the opposite open ends. In addition, electrodes for applying voltages to the conductive or polar electrodes on the opposite open ends may be separated from each other and individually subjected to voltage control.

Figure 22:
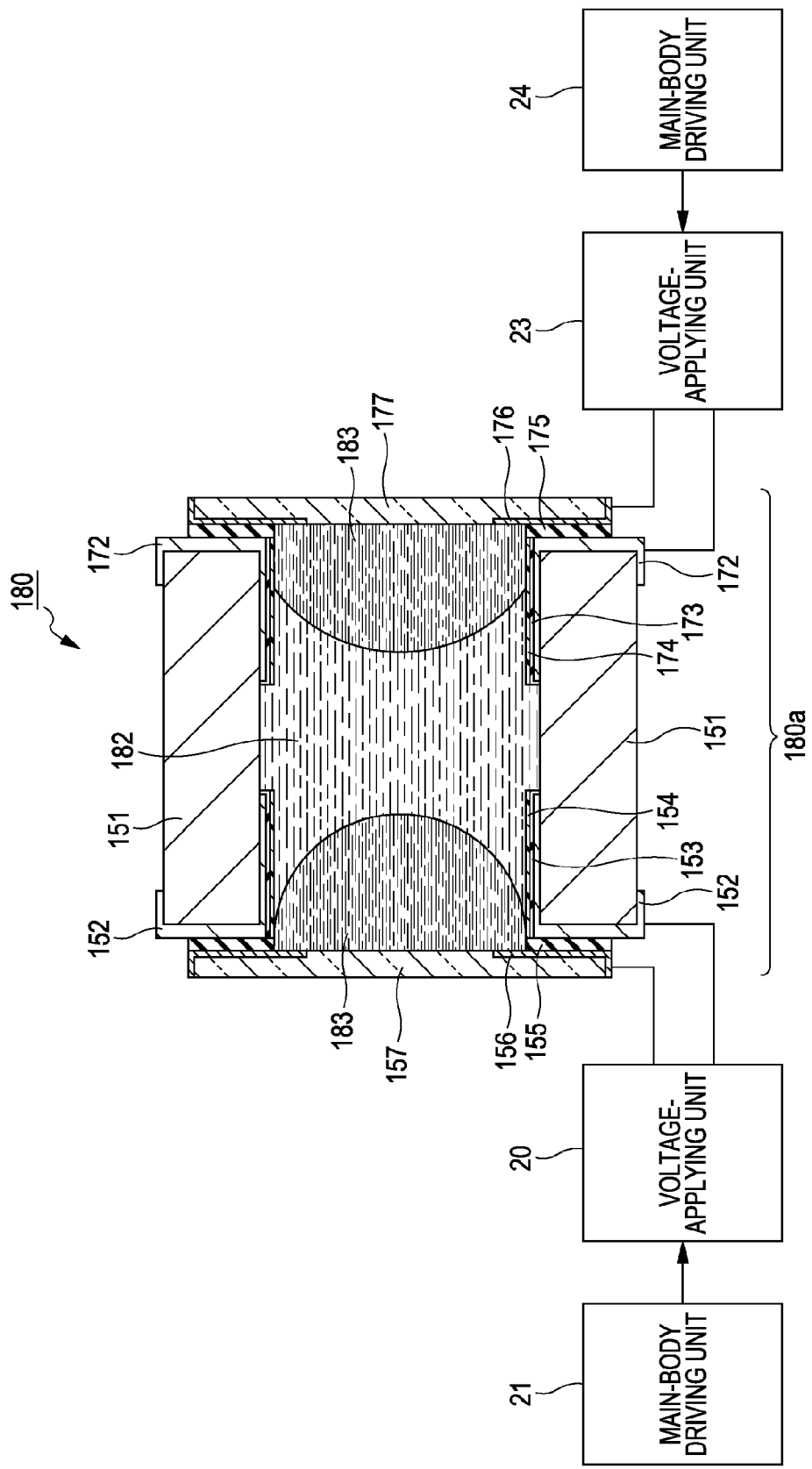
FIG. 22 is a schematic cross-sectional diagram illustrating a zoom lens of Modified Example 6.

FIG. 22 is a diagram schematically illustrating the configuration of the zoom lens of Modified Example 6. The zoom lens 180 of this example includes a lens main body 180*a* and two voltage-applying units 20 and 23.

The lens main body 180*a* is formed such that a first optically transparent member 156 and a second optically transparent member 177, which are made of glass or the like, are liquid-tightly placed on the opposite open ends of a container 151 in cylindrical shape or the like, respectively. Furthermore, a first liquid 181 and a third liquid 183 each having conductivity or polarity and a second liquid 182 having insulation properties are held in the lens main body 180*a*. In addition, the second liquid 182 is placed between the first liquid 181 and the third liquid 183 in the lens main body 180*a*.

In the zoom lens 180 of Modified Example 6, a first electrode 152 is formed on an area that extends part of the inner wall surface, an open end, and part of the outer wall surface of the container 151 on the side of the first optically transparent member 157. A conductive layer 153 (first conductive layer) having predetermined dielectric constant is formed by anodizing the liquid's side surface of the first electrode 152, or an electrode region on the inner wall surface of the container 151. Furthermore, the dielectric layer 153 is coated with a water-repellent film (first liquid-repellent film) 154.

In addition, a second electrode 156 in ring shape or the like is formed on the liquid's side surface of the first optically transparent member 157. An insulating member 155 is placed between the first electrode 152 and the second electrode 156. The first electrode 152 and the second electrode 156 are connected to the voltage-applying unit 20 (first voltage-applying unit). In addition, the voltage-applying unit 20 is connected to a main-body driving unit 21 of an optical apparatus, such as an image pick-up apparatus, on which the zoom lens 180 of Modified Example 6 is mounted. Here, the main-body driving unit 21 may be installed in the zoom lens 180.

In the zoom lens 180 of Modified Example 6, a third electrode 172 is formed on an area that extends part of the inner wall surface, an open end, and part of the outer wall surface of the container 151 on the side of the second optically transparent member 177. A conductive layer 173 (second conductive layer) having predetermined dielectric constant is formed by anodizing the liquid's side surface of the first electrode 172, or an electrode region on the inner wall surface of the container 151. Furthermore, the dielectric layer 173 is coated with a water-repellent film (first liquid-repellent film) 174.

In addition, a fourth electrode 176 in ring shape or the like is formed on the liquid's side surface of the second optically transparent member 177. An insulating member 175 is placed between the third electrode 172 and the fourth electrode 177. The third electrode 172 and the fourth electrode 177 are connected to the voltage-applying unit 23 (second voltage-applying unit). In addition, the voltage-applying unit 23 is connected to a main-body driving unit 24 of an optical apparatus, such as an image pick-up apparatus, on which the zoom lens 180 of Modified Example 6 is mounted. Here, the main-body driving unit 21 may be installed in the zoom lens 180. In addition, the voltage-applying units 20 and 23 and the main-body driving units 21 and 24 of Modified Example 6 may have the same configurations as those of the first embodiment (see FIG. 8), respectively, respectively.

In the zoom lens 180 of Modified Example 6, voltage applied between the first electrode 152 and the second electrode 156 by the voltage-applying unit 20 is controlled, so that the curvature of the interface between the first liquid 181 and the second liquid 182 can be freely controlled. On the other hand, voltage applied between the third electrode 172 and the third electrode 176 by the voltage-applying unit 23 is controlled, so that the curvature of the interface between the second liquid 182 and the third liquid 183 can be freely controlled. In this case, the signal zoom lens 180 is provided with two deformable interfaces. In other words, a zoom lens can be constructed of a single varifocal lens.

The zoom lens 180 of Modified Example 6 also includes two voltage-applying units 20 and 23, so that the zoom lens 180 can be driven at a low voltage within a wider variable range of voltages. In Modified Example 6, furthermore, a dielectric layer placed between the conductive or polar liquid and the electrode may be a metal oxide prepared by anodizing the surface of the electrode. Therefore almost the same advantageous effects as those described in the aforementioned fifth embodiment will be obtained.

7. SIXTH EMBODIMENT

Figure 23:
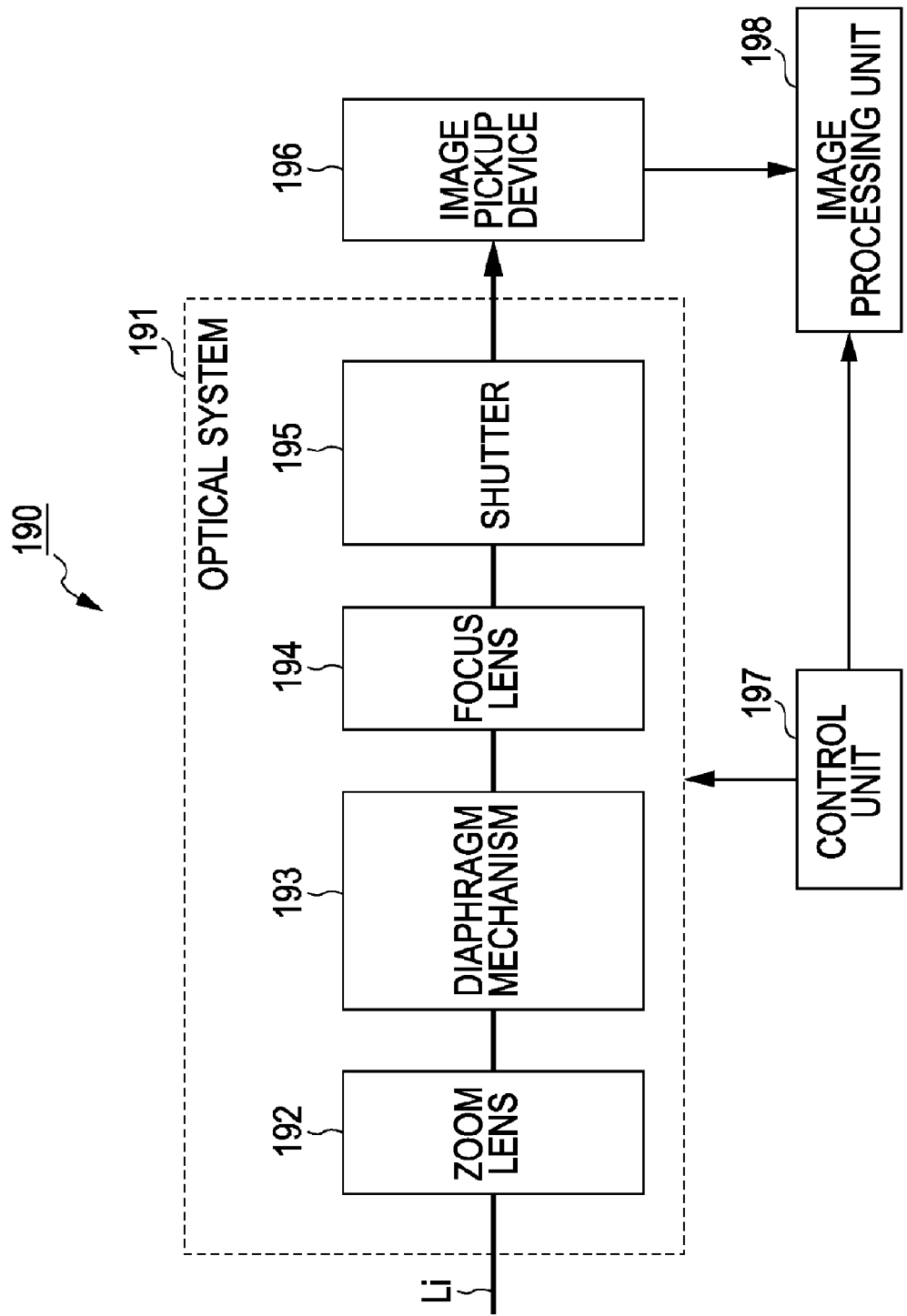
FIG. 23 is a schematic cross-sectional diagram illustrating an image pick-up apparatus according to a sixth embodiment.

Next, an example of a varifocal lens that employs the electro-wetting apparatus according to the aforementioned embodiment will be described with reference to the attached drawings. FIG. 23 is a diagram schematically illustrating the imaging apparatus of the present embodiment.

The imaging apparatus 190 mainly includes an optical system 191, a solid-state imaging device 196, an image processing unit 198, and a control unit 197. Here, the solid-state imaging device 196 converts light entered through the optical system 191 into electric signals to obtain image data. The image processing unit 198 performs predetermined processing on the obtained image data. The control unit 197 controls the movements of the respective structural components. Furthermore, the solid-state imaging device 196 may be a charge coupled device (CCD) device, a complementary metal oxide semiconductor (CMOS) device, or the like. Each of these devices includes a plurality of photoelectric convertor that converts incident optical energy into electric charges, a charge accumulator for accumulating the charges, and a change transporter for transporting and sending out the charges.

In this embodiment, furthermore, the optical system 171 mainly includes a zoom lens 192, an aperture mechanism 193, a focus lens 194, and a shutter 195 and these structural components are arranged in this order from the side on which light Li is incident. In this embodiment, the aforementioned optical device using the electro-wetting phenomenon is used as at least one of the zoom lens 192, the aperture mechanism 193, the focus lens 194, and the shutter 195.

In other words, the optical device, which is at least one of the zoom lens 192, the aperture mechanism 193, the focus lens 194, and the shutter 195, is configured as follows: The optical device includes a first liquid with conductivity or polarity and a second liquid body with insulation property, which are held between a pair of optically transparent member. The optical device includes a first electrode that applies voltage to the first liquid through a dielectric layer and a second electrode that is electrically connected to the first liquid. Furthermore, the optical device includes a voltage-applying unit that allows the optical device to be driven by AC voltage that varies within a positive voltage range at a predetermined cycle. Here, the dielectric layer is formed from a metal oxide by anodizing the first electrode.

More specifically, for example, the zoom lens 192 may be one described in the fifth embodiment (FIG. 20) or Modified Example (FIG. 22). For example, each of the aperture function 193 and the shutter 195 may be the optical device described in the fourth embodiment (FIG. 19). Furthermore, the focus lens 194 may be a varifocal lens such as any one of those described in the first embodiment (FIG. 7), Modified Examples 1 to 3 (FIGS. 9 to 11), and Modified Example 5 (FIG. 13).

The image pick-up apparatus of the present embodiment having the above configuration will exert advantageous effects as described below.

In the present embodiment, at least one of the zoom lens 192, the aperture mechanism 193, the focus lens 194, and the shutter 195 is driven by the application of AC voltage from the voltage-applying unit, where the voltage varies within a positive voltage range at a predetermined cycle. Thus, the variable range of voltage applied to any of these optical devices is not restricted by the negative withstand voltage of the dielectric layer and any of these optical devices can be driven within a wider variable voltage range. In addition, at least one of the zoom lens 192, the aperture mechanism 193, the focus lens 194, and the shutter 195 can be controlled with higher accuracy than before.

In addition, in at least one of the zoom lens 192, the aperture mechanism 193, the focus lens 194, and the shutter 195, a metal oxide film formed by anodizing the first electrode is used as a dielectric layer to be placed between the first electrode and the first liquid. Therefore, it allows the optical apparatus to be manufactured more simply, while attaining a remarkable reduction in drive voltage. Furthermore, the container forming the first electrode is made of an insulating material, so that any influence of pinhole defects can be avoided and the dielectric breakdown strength of the dielectric layer can be increased sufficiently.

8. SEVENTH EMBODIMENT

Next, an example of a light modulator where the electro-wetting apparatus of the above embodiment is applied will be described.

[Configuration of Light Modulator]

Figure 24:
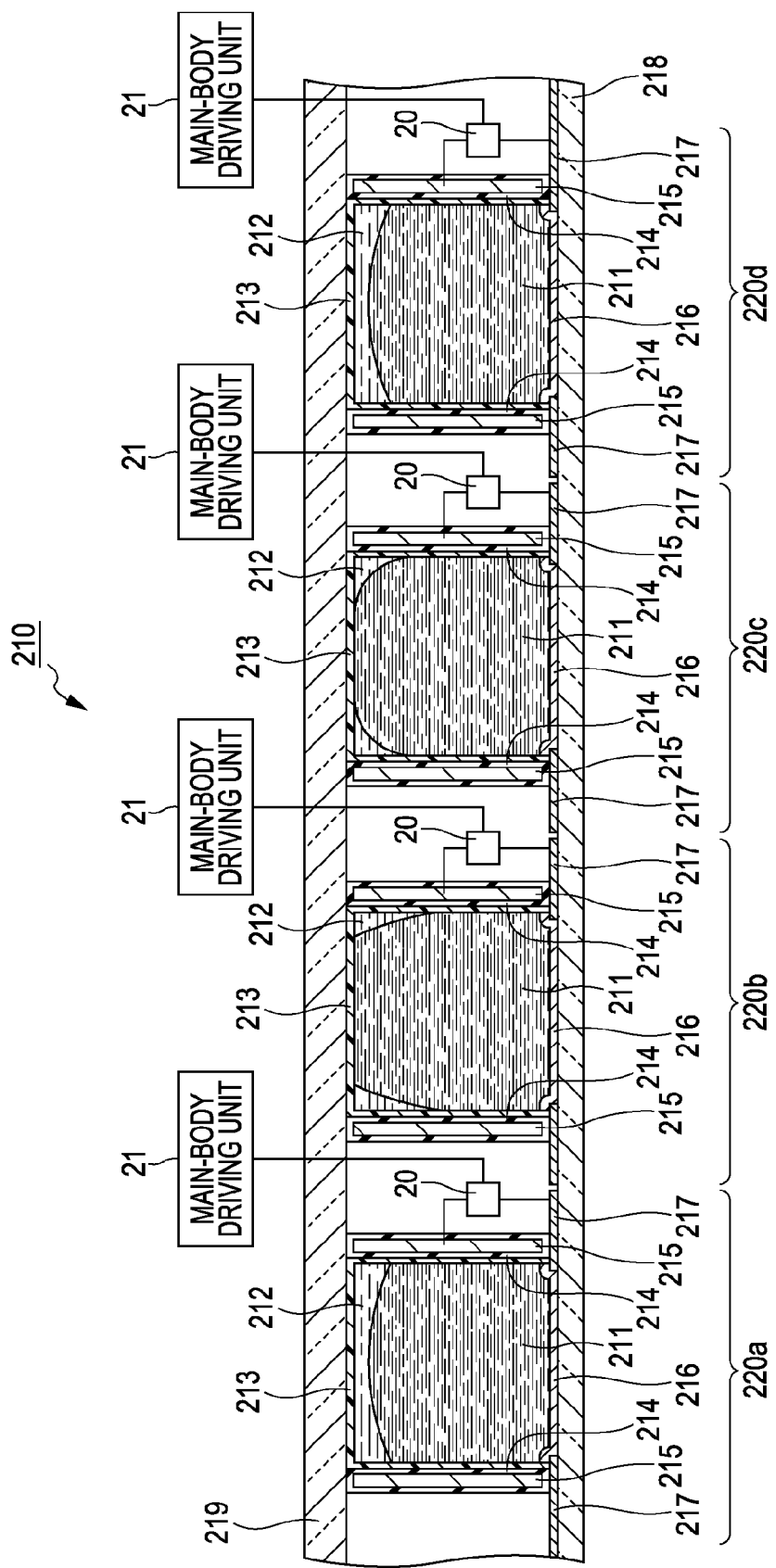
FIG. 24 is a schematic cross-sectional diagram illustrating the configuration and operation of a light modulator according to a seventh embodiment.

FIG. 24 is a diagram schematically illustrating a schematic cross-sectional diagram of the main part of the light modulator according to the present embodiment. The light modular 210 includes a plurality of light modulating devices each having the same configuration as that of the optical device (FIG. 19) provided with a shutter function such as one described in the fifth embodiment. Furthermore, in the example shown in FIG. 24, light modulating devices 220a, 22b, 220c, 220d, . . . , and so on are arranged in one direction and the cross-sectional view thereof is illustrated. Alternatively, for example, a plurality of light modulating devices may be also arranged in the direction perpendicular to the sheet of FIG. 24, thereby giving a two-dimensional, parallel arrangement of light modulating devices.

The light modulator 210 mainly includes a first optically transparent member 219 in plate shape, a second optically transparent member 219 in plate shape, and a plurality of light modulating devices 220a, 22b, 220c, 220d, . . . , and so on arranged between the optically transparent members.

The container 215 of each light modulating device is formed of a cylindrical metal remember or the like. In this embodiment, the container 215 is also used as a first electrode. In addition, the material of the first electrode (container) 215 may be an anodizable valve metal, such as aluminum, tantalum, niobium, hafnium, or titanium. However, the present embodiment is not limited to such a configuration of the light modulating device. Alternatively, the first electrode 215 may be formed on the partial surface of a cylindrically formed container made of an insulating member or the like.

Furthermore, a first liquid 211 with conductivity or polarity and a second liquid body 212 with insulation property are held in each of the light modulating devices 220a, 220b, . . . , and so on. In addition, one of the first liquid 211 and the second liquid 212 may be made of a material having lower optical transparency than that of the other. In the example shown in FIG. 24, the materials of the first liquid 211 and the second liquid 212 are selected so that the optical transparency of the second liquid 212 will be smaller than that of the first liquid 211. Furthermore, in the example shown in FIG. 24, the second liquid 212 is poured in the container so that it will be placed near the first optically transparent member 219.

The first liquid 211 may be, for example, an electrolyte solution, such as a salt solution, an aqueous sodium sulfate ($Na_2SO_4$) solution, or an ionic liquid. On the other hand, for example, the second liquid 212 may be silicone oil.

Furthermore, in the present embodiment, the whole surface of each first electrode 215 is coated with a dielectric layer (anodized film) 214 made of a metal oxide by anodization. One of the opposite open ends of the first electrode (container) 215 is sealed with the first optically transparent member 219 using epoxy resin or the like.

Furthermore, a water-repellent film (liquid-repellent film) 213 is laminated on the inner wall surface of the first electrode 215 and the liquid's side surface of the first optically transparent member 219. Here, it is preferable that the water-repellent film 213 may have a sufficiently small film thickness, for example about 5 nm but not more than 10 nm, just as in the case of any of the aforementioned embodiments. Furthermore, the material of the water-repellent film 213 may be preferably prepared using a reactive water-repellent coating material such as a fluorine-based silane-coupling agent.

On the other hand, for example, a plurality of second electrodes 217 in ring shape and a plurality of hydrophilic films 216 are formed on the respective predetermined positions on the surface of the second optically transparent member 218. In addition, the other of the opposite open ends of the first electrode (container) 215 is sealed with the second optically transparent member 218 via the hydrophilic film 116 or the second electrode 117 in ring shape or the like to liquid-tightly keep the inside of each light modulating device. As described above, each of the light modulating devices includes a first electrode 215 that applies voltage to the first liquid 211 through a dielectric layer 214 and a second electrode 217 that is electrically connected to the first liquid 211.

The first electrode 215 and the second electrode 217 of each light modulating device are connected to the voltage-applying unit 20. Here, for example, the voltage-applying unit 20 may be arranged between the first optically transparent member 219 and the second optically transparent member 218 or may be arranged on the outside of these optically transparent members. If the voltage-applying unit 20 is arranged on the outside of the optically transparent member of the voltage-applying unit 20, the conductive members of the first electrode 215 and the second electrode 217 are pulled out and then connected to the voltage-applying unit 20. Therefore, in FIG. 24, there is shown an example in which the voltage-applying unit 20 is arranged between the first optically transparent member 219 and the second optically transparent member 218.

In addition, the voltage-applying unit 20 is connected to a main-body driving unit 21 (driving section). In the example shown in FIG. 24, the main-body driving unit 21 is placed on the outside of the first optically transparent member 219 and the second optically transparent member 218. Here, both the voltage-applying unit 20 and the main-body driving unit 21 may have the same configurations as those of the first embodiment (see FIG. 8), respectively. In other words, each of light modulating device in the light modulator 210 is driven by AC voltage (for example, a voltage signal shown in FIG. 3 or FIG. 4) that varies within a positive voltage range at a predetermined cycle. Here, the voltage control of each of the light modulating devices is performed individually.

Furthermore, the main-body driving unit 21 may modulate voltages to be applied to the respective light modulating devices 220a, 220b, . . . , and so on depending on signals of information about image, character, or the like. For example, if an active device array substrate, which can be used in a related-art liquid display apparatus, is used as a second optically transparent member 218, it is possible to apply an appropriate voltage to each electrode depending on information about image, character, or the like by selecting a scan line or a signal line. Here, the active device array substrate may be a substrate on which switching active devices such as thin film transistors (TFTs) and pixel electrodes, scan lines, and signal lines which can be connected to the switching active devices are arranged in matrix.

[Operation of Light Modulator]

In the light modulator 210 of the present invention, voltages applied to the first electrode 215 and the second electrode 217 of each light modulating device are changed depending on an input information signal to deform the profile of the interface between the first liquid 211 and the second liquid 212 in each light modulating device. As a result, the quantity of light transmitting through both the first liquid 211 and the second liquid 212 can be controlled every light modulating device in response to the input information signal.

More specifically, in a state that a comparatively higher voltage is applied between the first electrode 215 and the second electrode 217, the contact angle of the first liquid 211 to the water-repellent film 213 formed on the inner wall surface of the first electrode 215 becomes comparatively small. As a result, it becomes a state in which the second liquid 212 with small optical transparency is being arranged between the first liquid 211 and the water-repellent film 213 on the surface of the first optically transparent member 219. In other words, the interface between the first liquid 211 and the second liquid 212 partially retains a spherical shape and the second liquid 212 with small optical transparency acts as a so-called single light shielding film on the first optically transparent member 219. In this case, light passing through this light modulating device can be shaded. In the example shown in FIG. 24, therefore, the light modulating elements 220a and 220d are kept in such a state.

In contrast, in a state that a comparatively lower voltage is applied between the first electrode 215 and the second electrode 217, the contact angle of the first liquid 211 to the water-repellent film 213 formed on the inner wall surface of the first electrode 215 becomes comparatively large. Therefore, the first liquid 211 pushes the second liquid 212 and the second liquid 212 is then pressed on the inner wall surface of the first electrode 215. As a result, the first liquid 211 is brought into contact with the water-repellent film 213 on the surface of the first optically transparent member 219, followed by causing an opening in the middle of the light modulating element, allowing part of light rays to pass through the opening. In the example shown in FIG. 24, therefore, the light modulating elements 220b and 220c are kept in such a state.

In this way, by controlling the voltage to be applied between the first electrode 215 and the second electrode 217, the degree of pressing the second liquid 212 against the liquid's side surface of the first optically transparent member 219 can be changed. In other words, by controlling the voltage to be applied between the first electrode 215 and the second electrode 217, the size of the opening formed on the first optically transparent member 219 of the light modulating device can be controlled. In the present embodiment, therefore, a voltage to be applied to each of light modulating elements 220a, 220b, 220c, . . . , and so on is controlled depending on an input information signal, so that the quantity of light passing through each of the light modulating devices can be controlled. Therefore, each of the light modulating elements 220a, 220b, 220c, . . . , and so on can be designed as one pixel to provide a light modulator 210 applicable to a display apparatus.

The light modulator of the present embodiment having the above configuration will exert advantageous effects as described below.

In the present embodiment, to drive each light modulating device in the light modulator 210, the voltage-applying unit 20 applies an AC voltage that varies within a positive voltage range at a predetermined cycle to each of the light modulating devices. Therefore, a variable range in voltage applied to each light modulating device in the light modulator 210 is not restricted by the negative withstand voltage of the dielectric layer, thereby driving the light modulator 210 within a wider variable voltage range.

Furthermore in each of the light modulating device in the light modulator 210, a metal oxide film formed by anodizing the first electrode 215 is used as a dielectric layer 214 to be placed between the first electrode 215 and the first liquid 211. In the present invention, therefore, the manufacturing method can be more simplified, the dielectric layer 214 can be formed thinner than one obtained by a method of forming a thin film under vacuum. In addition, a material with higher dielectric constant can be easily used as a dielectric layer 214. Thus, a drive voltage for changing the profile of the interface between the first liquid 211 and the second liquid 212 to a desired shape can be extensively reduced.

Furthermore, in this embodiment, the dielectric layer 214 with a uniform film thickness can be formed with a degree of precision that has not been achieved to date. Thus, variation in deformation of the interface profile due to variation in film thickness of the dielectric layer can be prevented and each of the light modulating devices can be controlled with high precision. Furthermore, when the container is formed from an insulating material and a first electrode made of a valve metal film is formed on the surface of the container, even if there are a small number of pinhole defects in the electrode, dielectric breakdown does not occur as long as the substrate 101 is made of an insulating material. Such a defect will be no problem. In addition, the dielectric layer 214 formed by anodization does not cause dielectric breakdown until being held at the formation voltage. Thus, the dielectric breakdown strength of the resulting dielectric layer 214 can be increased sufficiently.

9. EIGHTH EMBODIMENT

Next, an example of a display apparatus where the electro-wetting apparatus of the above embodiment is applied will be described. In this embodiment, an example in which a display apparatus is constructed using the light modulator 210 described in the above seventh embodiment will be described.

Figure 25:
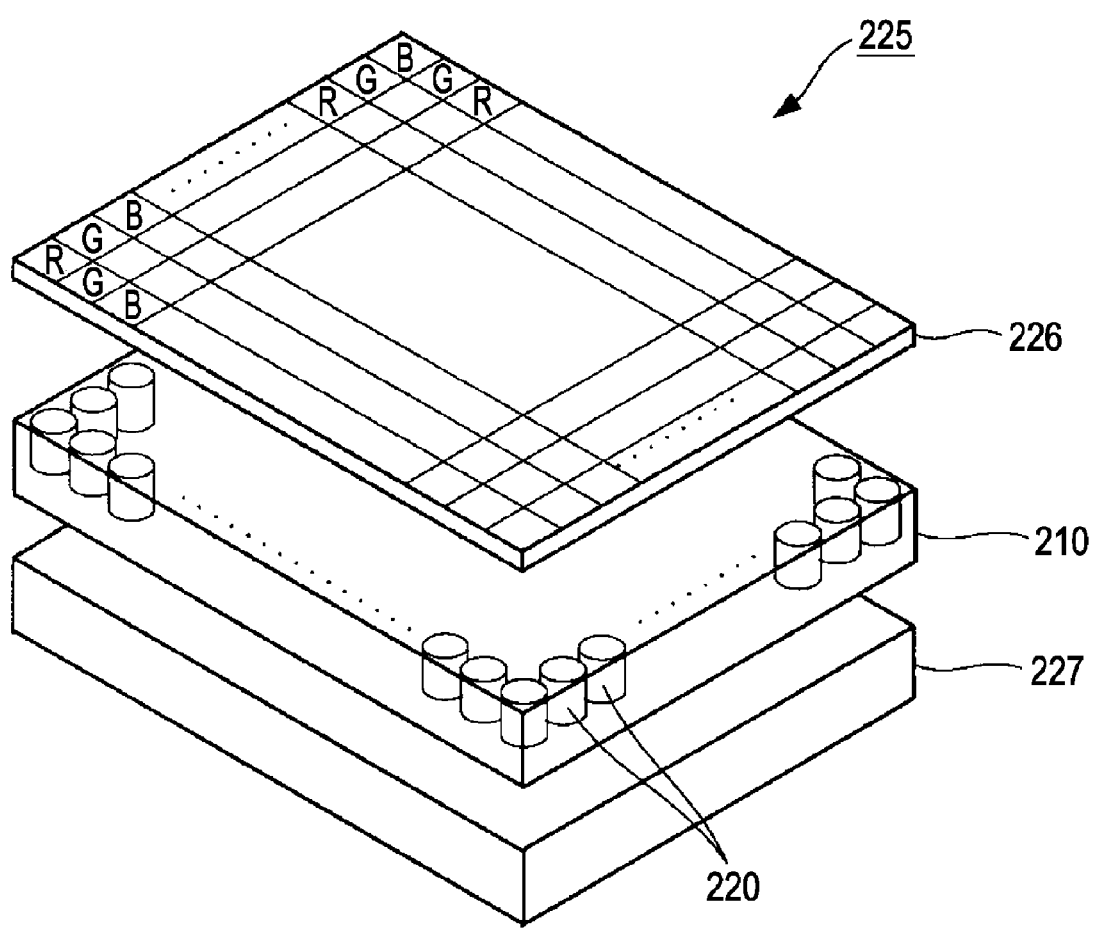
FIG. 25 is a schematic perspective diagram illustrating the configuration of a display apparatus according to an eighth embodiment.

FIG. 25 is a schematic diagram illustrating the configuration of the display apparatus according to the present embodiment. The display apparatus mainly includes a light modulator 210 (light modulator), a light source unit 227 (light source) arranged on one side (back side) of the light modulator 210, and a color filter 226 arranged on the other side (front side) thereof The light modulator 210 includes a plurality of light modulating devices 220 in two-dimensional arrangement which correspond to the respective pixels. The color filter 226 includes a plurality of segments corresponding to the respective pixels, or the respective light modulating devices 220. For example, each segment may be classified as one of segments of three primary color filters: red filter (R), green filter (G), and blue filter (B). In addition, an arrangement pattern of segments of the color filter 226 corresponding to the light modulating device 220 may be a square lattice pattern as shown in FIG. 25. Alternatively, it may be a stripe arrangement, a delta arrangement, or the like.

Furthermore, the surface of the light source unit 227 on the output side (facing the light modulating devices 210) may be provided with an optical sheet or the like having a function of extending a view angle or preventing coloring by correcting a lightwave phase difference, a function of diffusing incident light, a function of improving brightness, and so on. Furthermore, in the case of a display apparatus 225 that performs black and white representation, a color filter 226 may be omitted.

The display apparatus 225 of the present embodiment having the above configuration will exert advantageous effects as described below.

The display apparatus 225 of the present embodiment uses the light modulator 210 using an electro-wetting phenomenon, so that it can be driven within a wide variable voltage range. It becomes possible to control the light modulating device with higher precision than before and gradient control can be performed more precisely. Thus, the display apparatus 225 having good display characteristics can be provided.

The light modulator 210 of the display apparatus 225 according to the present embodiment uses a metal oxide film as a dielectric layer which is placed between the conductive liquid and one of the electrodes and formed by anodization of such an electrode. In the present embodiment, therefore, the manufacturing method for each of the structural components can be easily performed. In addition, a drive voltage can be remarkedly reduced more than before. Furthermore, the container forming one of electrodes is made of an insulating material, so that any influence of pinhole defects can be avoided and the dielectric breakdown strength of the dielectric layer can be increased sufficiently.

10. NINTH EMBODIMENT

Next, an example of a strobe apparatus where the electro-wetting apparatus of the above embodiment is applied will be described.

[Configuration of Strobe Apparatus]

Figure 26:
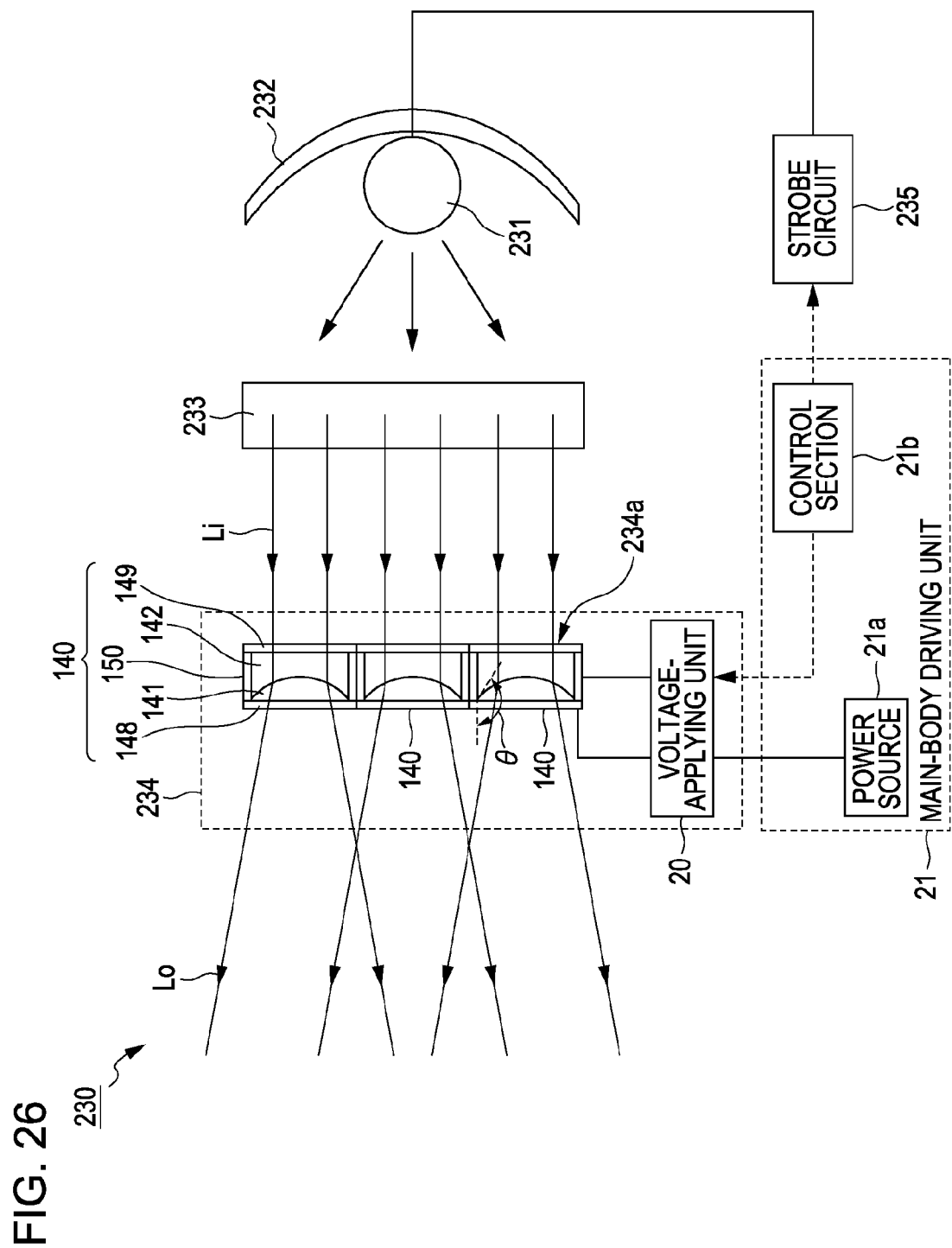
FIG. 26 is a schematic cross-sectional diagram illustrating a strobe apparatus according to a ninth embodiment.
Figure 27:
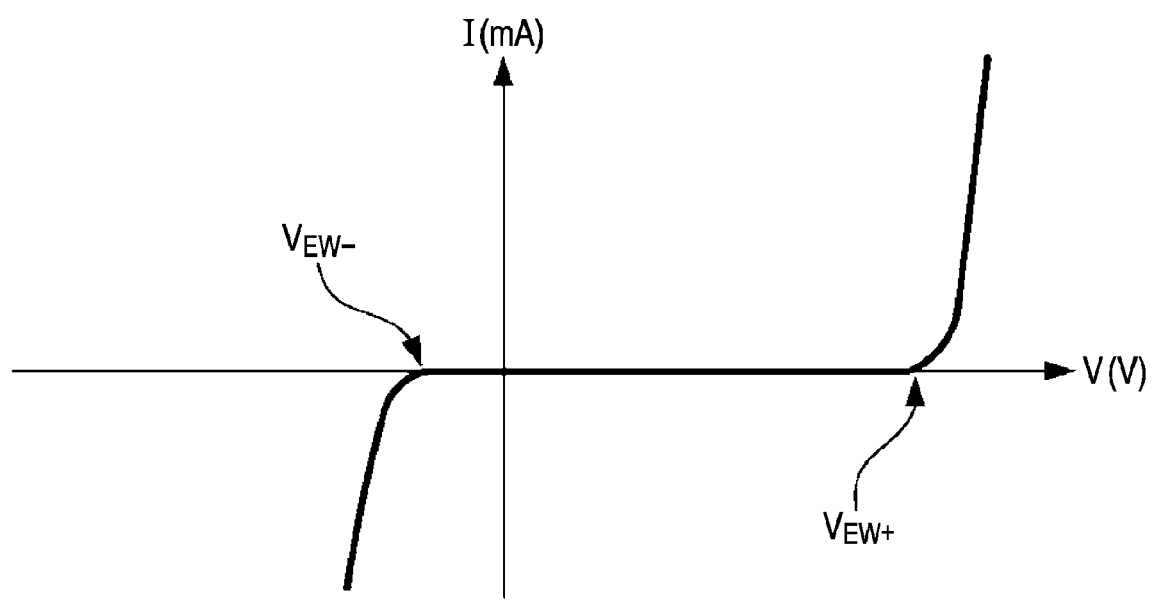
FIG. 27 is a graphic diagram illustrating the insulation properties of the dielectric layer formed by anodization.

FIG. 26 is a schematic diagram illustrating the configuration of the strobe apparatus according to the present embodiment. The strobe apparatus 230 (strobe circuit section) mainly includes a flash discharge tube (light source) 231, a reflector 232, an optical prism 233, a light diffusing device 234, a strobe circuit 235, and a main-body driving unit 21.

The optical prism 233 controls distribution of light emitted from the flash discharge tube 231. The strobe circuit 235 controls the emission of light from the flash discharge tube 231. Furthermore, the operation of the strobe circuit 235 is controlled by a control section (corresponding to the control section 21*b* in FIG. 8) of the main-body driving unit 21.

The light diffusing device 234 is an optical device using an electro-wetting phenomenon. The light diffusing device 234 outputs light at a predetermined irradiation angle by diffusing incident light Li through the optical prism 233 (output light Lo in FIG. 26). The light diffusing device 234 includes a device main-body unit 234*a* and a voltage-applying unit 20. The device main-body unit 234*a* includes a plurality of optical devices 140 in array arrangement. In addition, in the example shown in FIG. 26, only three optical devices 140 are illustrated for simplifying the description thereof.

In the present invention, furthermore, the optical device 140 is one having the same configuration as that of the varifocal lens 140 (see FIG. 20) described in the fifth embodiment. Thus, the description about the configuration of the optical device 140 is omitted here. In the present embodiment, furthermore, each of optical devices 140 in both the first electrode 145 and the second electrode 147 (both not shown in FIG. 26) is connected to a voltage-applying unit 20.

In addition, the voltage-applying unit 20 and the main-body driving unit 21 may have the same configurations as those of the first embodiment (see FIG. 8). In other words, the optical device 140 is driven by AC voltage (for example, a voltage signal shown in FIG. 3 or FIG. 4) that varies within a positive voltage range at a predetermined cycle.

[Operation of Strobe Apparatus]

Next, an exemplary operation of the strobe apparatus 230 of the present embodiment will be described. In the following description about the operation, the structural components of the optical device 140 described below will be represented by the same reference numerals as those of the varifocal lens 140 of the fifth embodiment (see FIG. 20).

Furthermore, a first liquid 141 with conductivity or polarity and a second liquid body 142 with insulation property are held in a container 150 of each optical device 140 in the light diffusing device 234. The inner wall surface of the container 150 on the second optically transparent member 148 is provided with a hydrophilic film 146 (not shown in FIG. 26). In addition, the inner wall surface of the container 150 on the first optically transparent member 149 is provided with a water-repellent film (not shown in FIG. 26).

Therefore, the profile of the interface between the first liquid 141 and the second liquid 142 is in a convex shape when observed from the light incident side.

In such a state, when light Li is incident on the light diffusing device 234, the refractive index of the first liquid 141 is smaller than that of the second liquid. Thus, a bundle of light rays passed through the interface is widened and outputted. In the present invention, each of the optical devices 140 has the same configuration, so that the degree of widening the bundle of light rays output from each of the optical elements 14 can be kept constant.

Here, if a voltage applied from the voltage-applying unit 20 to the light diffusing device 234 is changed, the contact angle θ of the first liquid 141 to the water-repellent film 143 is changed due to an electro-wetting phenomenon. Thus, the profile of the interface between the first liquid 141 and the second liquid 142 can be changed. In addition, if the profile of the interface between the first liquid 141 and the second liquid 142 is changed, the degree of widening the bundle of light rays output from each of the optical devices 70 can be changed. In other words, a change in voltage applied to the light diffusing device 234 leads to a change in angle of irradiation of light emitted from a strobe device 230. Therefore, in the strobe apparatus 230 of the present embodiment, voltage control allows the irradiation angle of light emitted from the strobe apparatus to be controlled with high precision.

The strobe apparatus 230 of the present embodiment having the above configuration will exert advantageous effects as described below.

In the present embodiment, when the voltage-applying unit 20 applies a voltage to the light diffusing device 234, the voltage-applying unit 20 applies an AC voltage that varies within a positive voltage range at a predetermined cycle as shown in FIG. 3 or FIG. 4 to each of the optical devices 140. Therefore, in the present embodiment, a variable range in voltage applied to the strobe apparatus 230 is not restricted by the negative withstand voltage of the dielectric layer, thereby driving the strobe apparatus 230 within a wider variable voltage range.

In addition, in each of the optical devices 140 in the strobe apparatus 230 of the present embodiment, a metal oxide film formed by anodizing the first electrode is used as a dielectric layer to be placed between the first electrode 145 and the first liquid 141. Therefore, it allows the optical device 140 to be manufactured more simply, while attaining a remarkable reduction in drive voltage. Furthermore, the container forming the first electrode 145 is made of an insulating material, so that any influence of pinhole defects can be avoided and the dielectric breakdown strength of the dielectric layer 144 can be increased sufficiently.

In the above description, the aforementioned embodiments of the present invention have been described with respect to a varifocal lens, a droplet dropping apparatus, an optical device provided with an aperture or shutter function, a zoom lens, a light modulator, a display apparatus, and a strobe apparatus, in which the electro-wetting apparatus according to the embodiment of the present invention is employed. However, the present invention is not limited to any of them. Any embodiment of the present invention will be applicable to various kinds of applications as long as they utilize an electro-wetting phenomenon.

For example, any embodiment is applicable to any of various optical apparatuses using a varifocal lens, such as an optical measuring apparatus and an optical reader. In addition, an optical switching device that controls the deflection direction of light can be configured so that one of the first liquid and the second liquid is formed from an optically transparent material and the other of these liquids is formed from a material having high reflectance.

In addition, the electro-wetting apparatus according to the embodiment of the invention is also applicable to a fluid jet apparatus that discharges a liquid using a change in surface profile of a liquid and an inkjet printer using this fluid jet apparatus.

Furthermore, any of the embodiments of the present invention can be applied to a mixer apparatus for minute liquid droplets using a micro-wetting phenomenon, or various chemical measuring apparatuses and biological measuring apparatus using such a mixer apparatus.

Furthermore, for example, the positional control of a plate-shaped member or the like to be mounted on a liquid droplet may be performed using a change in height (thickness) due to a change in surface profile of such a liquid droplet. Thus, for example, it is possible to realize a control apparatus having a goniometer (angle gate) function.

Any embodiment of the present invention may be applied to any of these apparatus using an electro-wetting phenomenon and the same advantageous effects as those of each embodiment will be obtained.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An optical pick-up apparatus, comprising:
a light source unit;
a light-receiving unit;
an objective lens facing an optical recording medium; and
an optical system having a function leading output light from said light source unit to said objective lens and a function of condensing light reflected from said optical recording medium to said light-receiving unit, wherein said optical system is provided with a varifocal lens including:
a pair of optically transparent members;
a first liquid having optical transparency in addition to conductivity or polarity while being held between said pair of optically transparent members;
a second liquid having optical transparency in addition to insulation properties or non-polarity, where the refractive index of said second liquid is different from the refractive index of said first liquid, while being held between said pair of optically transparent members without mixing with said first liquid;

a first electrode and a second electrode that apply voltage to said first liquid while being held between said pair of optically transparent members;

a dielectric layer formed by oxidation of the surface of said first electrode on the side of said liquid; and a voltage-applying unit that applies a voltage signal between said first electrode and said second electrode, where said voltage signal is periodically changed between a first voltage of zero (0) volt or more and a second voltage of larger than said first voltage.

2. An optical recording/reproducing apparatus, comprising:

a light source unit;
a light-receiving unit;
an objective lens facing an optical recording medium;
an optical system;
a driving section that drives said varifocal lens; and
a rotation driving unit that drives said optical recording medium, wherein said optical system has a function leading output light from said light source unit to said objective lens and a function of condensing light reflected from said optical recording medium to said light-receiving unit, and said optical system is provided with a varifocal lens including a pair of optically transparent members, a first liquid having optical transparency in addition to conductivity or polarity while being held between said pair of optically transparent members, a second liquid having optical transparency in addition to insulation properties or non-polarity, where the refractive index of said second liquid is different from the refractive index of said first liquid, while being held between said pair of optically transparent members without mixing with said first liquid, a first electrode and a second electrode that apply voltage to said first liquid while being held between said pair of optically transparent members, a dielectric layer formed by oxidation of the surface of said first electrode on the side of said liquid, and a voltage-applying unit that applies a voltage signal between said first electrode and said second electrode, where said voltage signal is periodically changed between a first voltage of zero (0) volt or more and a second voltage of larger than said first voltage.

3. A zoom lens, comprising:
a first varifocal lens having:
a first optically transparent member and a second optically transparent member;

a first liquid having optical transparency in addition to conductivity or polarity while being held between said first optically transparent member and said second optically transparent member;

a second liquid having optical transparency in addition to insulation properties or non-polarity, where the refractive index of said second liquid is different from the refractive index of said first liquid, while being held between said pair of optically transparent members without mixing with said first liquid;

a first electrode and a second electrode that apply voltage to said first liquid while being held between said first optically transparent member and said second optically transparent member;

a first dielectric layer formed by oxidation of the surface of said first electrode on the side of said liquid; and a first voltage-applying unit that applies a voltage signal between said first electrode and said second electrode, where said voltage signal is periodically changed between a first voltage of zero (0) volt or more and a second voltage of larger than said first voltage, and a second varifocal lens having:
a third optically transparent member and a fourth optically transparent member;

a third liquid having optical transparency in addition to conductivity or polarity while being held between said third optically transparent member and said fourth optically transparent member;

a fourth liquid having optical transparency in addition to insulation properties or non-polarity, where the refractive index of said fourth liquid is different from the refractive index of said third liquid, while being held between said pair of optically transparent members without mixing with said third liquid;

a third electrode and a fourth electrode that apply voltage to said third liquid while being held between said third optically transparent member and said fourth optically transparent member;

a second dielectric layer formed by oxidation of the surface of said third electrode on the side of said liquid; and a second voltage-applying unit that applies a voltage signal between said third electrode and said fourth electrode, where said voltage signal is periodically changed between a first voltage of zero (0) volt or more and a fourth voltage of larger than said third voltage.

4. The zoom lens according to claim 3, wherein
said first varifocal lens and said second varifocal lens are formed in one.

5. An image pick-up apparatus, comprising:
an optical system;
an imaging device that converts incident light entered through said optical system into an electric signal; and
a control section for controlling said optical system, wherein
said optical system includes a zoom lens, a varifocal lens, and an optical device having an aperture or shutter mechanism, where
at least one of said zoom lens, said varifocal lens, and said optical device includes:

a pair of optically transparent members, a first liquid having optical transparency in addition to conductivity or polarity while being held between said pair of optically transparent members, a second liquid having optical transparency in addition to insulation properties or non-polarity, where the refractive index of said second liquid is different from the refractive index of said first liquid, while being held between said pair of optically transparent members without mixing with said first liquid, a first electrode and a second electrode that apply voltage to said first liquid while being held between said pair of optically transparent members, a dielectric layer formed by oxidation of the surface of said first electrode on the side of said liquid, and a voltage-applying unit that applies a voltage signal between said first electrode and said second electrode, where said voltage signal is periodically changed between a first voltage of zero (0) volt or more and a second voltage of larger than said first voltage.

* * * * *